US012093962B2

(12) United States Patent
Patel et al.

(10) Patent No.: US 12,093,962 B2
(45) Date of Patent: *Sep. 17, 2024

(54) INTERMEDIARY COMMUNICATIONS OVER NON-PERSISTENT NETWORK CONNECTIONS

(71) Applicant: PayRange Inc., Portland, OR (US)

(72) Inventors: Paresh K. Patel, Portland, OR (US); Christopher M. Sokol, Portland, OR (US)

(73) Assignee: PAYRANGE INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,672

(22) Filed: Oct. 18, 2022

(65) Prior Publication Data

US 2023/0222506 A1 Jul. 13, 2023

Related U.S. Application Data

(63) Continuation of application No. 16/748,727, filed on Jan. 21, 2020, now Pat. No. 11,475,454, which is a
(Continued)

(51) Int. Cl.
*G06Q 20/40* (2012.01)
*G06Q 20/18* (2012.01)
(Continued)

(52) U.S. Cl.
CPC ........... *G06Q 20/405* (2013.01); *G06Q 20/18* (2013.01); *G06Q 20/32* (2013.01); *G06Q 20/322* (2013.01);
(Continued)

(58) Field of Classification Search
CPC ...... G06Q 20/405; G06Q 20/18; G06Q 20/32; G06Q 20/322; G06Q 20/3226;
(Continued)

(56) References Cited

U.S. PATENT DOCUMENTS 4,374,557 A 2/1983 Sugimoto et al.
5,479,602 A 12/1995 Baecker et al.
(Continued)

FOREIGN PATENT DOCUMENTS

AU 2015327722 A1 4/2017
CA 2844231 C 4/2020
(Continued)

OTHER PUBLICATIONS

Nurel "Recent Developments in Wireless Network Systems", Izmir Institute of Technology, Sep. 2001, 280 pages (Year: 2001).*
(Continued)

*Primary Examiner* — James D Nigh
(74) *Attorney, Agent, or Firm* — MORGAN, LEWIS & BOCKIUS LLP

(57) ABSTRACT

A mobile device with a first transceiver, a second transceiver, one or more processors, and memory bridges communications between an offline retail machine with a short-range communication capability and a remote server by obtaining via the first transceiver a single-use request code from an information packet broadcast by the offline retail machine; transmitting via the second transceiver the single-use request code to a remote server; obtaining via the second transceiver from the remote server a grant token including the single-use request code; detecting a trigger condition for initiating provision of a product or service by the offline retail machine; and in response to detecting the trigger condition, initiating performance of the provision of the product or service by transmitting the grant token to the offline retail machine via the first transceiver.

18 Claims, 47 Drawing Sheets

Related U.S. Application Data continuation-in-part of application No. 15/406,492, filed on Jan. 13, 2017, now Pat. No. 10,719,833, which is a continuation of application No. 14/335,762, filed on Jul. 18, 2014, now Pat. No. 9,547,859, which is a continuation of application No. 14/214,644, filed on Mar. 14, 2014, now Pat. No. 8,856,045, which is a continuation-in-part of application No. 29/477,025, filed on Dec. 18, 2013, now Pat. No. Des. 755,183, said application No. 16/748,727 is a continuation-in-part of application No. 16/029,483, filed on Jul. 6, 2018, now Pat. No. 10,963,905, which is a continuation of application No. 14/611,065, filed on Jan. 30, 2015, now Pat. No. 10,019,724, said application No. 16/748,727 is a continuation-in-part of application No. 15/956,741, filed on Apr. 18, 2018, now Pat. No. 11,983,692, which is a continuation-in-part of application No. 15/893,514, filed on Feb. 9, 2018, now Pat. No. 11,966,895, which is a continuation of application No. PCT/US2017/015676, filed on Jan. 30, 2017, and a continuation-in-part of application No. 14/641,236, filed on Mar. 6, 2015, now abandoned, which is a continuation-in-part of application No. 14/320,534, filed on Jun. 30, 2014, now abandoned, which is a continuation-in-part of application No. 14/214,644, filed on Mar. 14, 2014, now Pat. No. 8,856,045, which is a continuation-in-part of application No. 29/477,025, filed on Dec. 18, 2013, now Pat. No. Des. 755,183, said application No. 15/956,741 is a continuation-in-part of application No. 15/435,228, filed on Feb. 16, 2017, now Pat. No. 11,205,163, which is a continuation-in-part of application No. 14/458,192, filed on Aug. 12, 2014, now Pat. No. 9,875,473, which is a continuation-in-part of application No. 14/456,683, filed on Aug. 11, 2014, now Pat. No. 9,256,873, which is a continuation of application No. 14/335,762, filed on Jul. 18, 2014, now Pat. No. 9,547,859, which is a continuation of application No. 14/214,644, filed on Mar. 14, 2014, now Pat. No. 8,856,045, which is a continuation-in-part of application No. 29/477,025, filed on Dec. 18, 2013, now Pat. No. Des. 755,183.

(60) Provisional application No. 61/917,936, filed on Dec. 18, 2013, provisional application No. 62/486,951, filed on Apr. 18, 2017, provisional application No. 62/081,492, filed on Nov. 18, 2014, provisional application No. 62/296,543, filed on Feb. 17, 2016.

(51) Int. Cl.

| | |
|---|---|
| *G06Q 20/32* | (2012.01) |
| *G06Q 20/36* | (2012.01) |
| *G06Q 20/38* | (2012.01) |
| *G06Q 30/06* | (2023.01) |
| *G07F 9/00* | (2006.01) |
| *G07F 9/02* | (2006.01) |
| *G06Q 20/20* | (2012.01) |
| *H04W 4/80* | (2018.01) |
| *H04W 8/00* | (2009.01) |
| *H04W 76/15* | (2018.01) |
| *H04W 88/04* | (2009.01) |
| *H04W 88/06* | (2009.01) |

(52) U.S. Cl.
CPC ....... *G06Q 20/3226* (2013.01); *G06Q 20/327* (2013.01); *G06Q 20/3278* (2013.01); *G06Q 20/36* (2013.01); *G06Q 20/38* (2013.01); *G06Q 20/3821* (2013.01); *G06Q 20/3823* (2013.01); *G06Q 20/3829* (2013.01); *G06Q 20/386* (2020.05); *G06Q 20/40* (2013.01); *G06Q 20/4015* (2020.05); *G06Q 30/06* (2013.01); *G07F 9/002* (2020.05); *G07F 9/023* (2013.01); *G06Q 2220/00* (2013.01)

(58) Field of Classification Search
CPC .. G06Q 20/327; G06Q 20/3278; G06Q 20/36; G06Q 20/38; G06Q 20/3821; G06Q 20/3823; G06Q 20/40; G06Q 20/401; G06Q 20/3255; G06Q 20/202; G06Q 30/06; G06Q 2220/00; G07F 9/0002; G07F 9/023; G07F 9/001; H04W 4/80; H04W 8/005; H04W 76/15; H04W 88/04; H04W 88/06
USPC .......................................................... 705/71
See application file for complete search history.

(56) References Cited

U.S. PATENT DOCUMENTS

| | | |
|---|---|---|
| 5,844,808 A | 12/1998 | Konsmo et al. |
| 5,854,994 A | 12/1998 | Canada et al. |
| 5,880,733 A | 3/1999 | Horvitz et al. |
| 5,892,900 A | 4/1999 | Ginter et al. |
| 5,955,718 A | 9/1999 | Levasseur |
| 6,056,194 A | 5/2000 | Kolls |
| 6,390,269 B1 | 5/2002 | Billington |
| 6,462,644 B1 | 10/2002 | Howell |
| 6,505,095 B1 | 1/2003 | Kolls |
| 6,584,309 B1 | 6/2003 | Whigham |
| 6,594,759 B1 | 7/2003 | Wang |
| 6,743,095 B2 | 6/2004 | Cole et al. |
| 6,793,134 B2 | 9/2004 | Clark |
| 6,810,234 B1 * | 10/2004 | Rasanen ............... H04W 88/02 455/414.1 |
| 6,840,860 B1 | 1/2005 | Okuniewicz |
| 7,085,556 B2 | 8/2006 | Offer |
| 7,110,954 B2 | 9/2006 | Yung et al. |
| 7,127,236 B2 | 10/2006 | Khan |
| 7,131,575 B1 | 11/2006 | Kolls |
| 7,455,223 B1 | 11/2008 | Wilson |
| 7,458,510 B1 | 12/2008 | Zhou |
| 7,464,867 B1 | 12/2008 | Kolls |
| 7,493,288 B2 | 2/2009 | Biship et al. |
| 7,513,419 B1 | 4/2009 | Crews et al. |
| 7,672,680 B1 | 3/2010 | Lee et al. |
| 7,690,495 B1 | 4/2010 | Kolls |
| 7,721,958 B2 | 5/2010 | Belfer et al. |
| 7,848,980 B2 | 12/2010 | Carlson |
| 7,962,369 B2 | 6/2011 | Rosenberg |
| 7,965,693 B2 | 6/2011 | Jiang et al. |
| 7,983,670 B1 | 7/2011 | Elliott |
| 8,020,763 B1 | 9/2011 | Kowalchyk |
| 8,059,101 B2 * | 11/2011 | Westerman ......... G06F 3/04883 345/173 |
| 8,157,167 B2 | 4/2012 | Cost et al. |
| 8,201,736 B2 | 6/2012 | Majer |
| 8,255,323 B1 | 8/2012 | Casey et al. |
| D669,899 S | 10/2012 | Cheng et al. |
| 8,346,670 B2 | 1/2013 | Hasson et al. |
| 8,356,754 B2 | 1/2013 | Johnson et al. |
| 8,376,227 B2 | 2/2013 | Hammad et al. |
| 8,396,589 B2 | 3/2013 | Katzenstein Garibaldi |
| 8,412,626 B2 | 4/2013 | Hirson et al. |
| 8,438,066 B1 | 5/2013 | Yuen |
| 8,479,190 B2 | 7/2013 | Sueyoshi et al. |
| 8,489,140 B2 * | 7/2013 | Weiner .................. G06Q 20/40 455/454 |
| 8,496,168 B1 | 7/2013 | Miller et al. |
| 8,514,775 B2 | 8/2013 | Frecassetti et al. |
| 8,517,766 B2 | 8/2013 | Golko et al. |
| 8,548,426 B2 | 10/2013 | Smith |
| 8,577,734 B2 | 11/2013 | Treyz |

(56) References Cited

U.S. PATENT DOCUMENTS

| | | | |
|---|---|---|---|
| 8,583,496 B2 | 11/2013 | You et al. |
| 8,596,528 B2 | 12/2013 | Fernandes et al. |
| 8,596,529 B1 | 12/2013 | Kolls |
| 8,600,899 B1 | 12/2013 | Davis |
| 8,606,702 B2 | 12/2013 | Ruckart |
| 8,615,445 B2 | 12/2013 | Dorsey et al. |
| 8,645,971 B2 | 2/2014 | Carlson et al. |
| 8,700,530 B2 | 4/2014 | Smith |
| 8,707,276 B2 | 4/2014 | Hill et al. |
| 8,712,893 B1 | 4/2014 | Brandmaier |
| 8,761,809 B2 | 6/2014 | Faith et al. |
| 8,769,643 B1 | 7/2014 | Ben Ayed |
| 8,788,341 B1 | 7/2014 | Patel |
| 8,794,734 B2 | 8/2014 | Drummond |
| 8,810,430 B2 | 8/2014 | Proud |
| 8,819,659 B2 | 8/2014 | Ramer et al. |
| 8,831,677 B2 | 9/2014 | Villa-Real |
| 8,838,481 B2 | 9/2014 | Moshfeghi |
| 8,840,016 B1 | 9/2014 | Schott et al. |
| 8,850,421 B2 | 9/2014 | Proud |
| 8,856,045 B1* | 10/2014 | Patel .................. G06Q 20/401 |
| | | | 705/79 |
| 8,881,975 B1 | 11/2014 | Matthews |
| 8,898,620 B2 | 11/2014 | Eizenman et al. |
| 8,903,737 B2 | 12/2014 | Cameron et al. |
| 8,958,846 B2 | 2/2015 | Freeny, Jr. |
| 8,976,947 B2 | 3/2015 | Joyce et al. |
| 9,001,047 B2 | 4/2015 | Forstall |
| 9,037,492 B2 | 5/2015 | White |
| 9,047,639 B1 | 6/2015 | Quintilian et al. |
| 9,092,768 B2 | 7/2015 | Breitenbach et al. |
| 9,098,961 B1 | 8/2015 | Block et al. |
| 9,210,247 B2 | 12/2015 | Vance et al. |
| 9,262,771 B1 | 2/2016 | Patel |
| 9,272,713 B1 | 3/2016 | Dvoskin et al. |
| 9,395,888 B2 | 7/2016 | Schiplacoff et al. |
| 9,424,603 B2 | 8/2016 | Hammad |
| 9,483,763 B2 | 11/2016 | Van Os |
| 9,547,859 B2 | 1/2017 | Patel |
| 9,659,296 B2 | 5/2017 | Patel |
| 9,875,473 B2 | 1/2018 | Patel |
| 9,898,884 B1 | 2/2018 | Arora et al. |
| 9,922,370 B2 | 3/2018 | Kobres et al. |
| 10,121,318 B2 | 11/2018 | LeMay et al. |
| 10,163,292 B1 | 12/2018 | Romero |
| 10,210,501 B2 | 2/2019 | Low et al. |
| 10,217,151 B1 | 2/2019 | Greiner et al. |
| 10,304,057 B1 | 5/2019 | Powell |
| 10,380,573 B2 | 8/2019 | Lin et al. |
| 10,410,194 B1 | 9/2019 | Grassadonia |
| 10,423,949 B2* | 9/2019 | Lyons .................. G06Q 20/40 |
| 10,438,208 B2 | 10/2019 | Patel et al. |
| 10,467,604 B1 | 11/2019 | Dorsch et al. |
| 10,528,944 B2 | 1/2020 | Khan |
| 10,719,833 B2 | 7/2020 | Patel et al. |
| 10,824,828 B2* | 11/2020 | Ostri .................. G06Q 20/3278 |
| 10,891,608 B2 | 1/2021 | Patel |
| 10,891,614 B2 | 1/2021 | Patel |
| 10,977,642 B2* | 4/2021 | Khan .................. G06Q 20/3263 |
| 11,010,759 B1 | 5/2021 | Maeng |
| 11,042,852 B1 | 6/2021 | Wadhwa |
| 11,074,577 B1 | 7/2021 | Soccorsy et al. |
| 11,074,580 B2 | 7/2021 | Patel |
| 11,182,794 B1 | 11/2021 | Aument |
| 11,227,275 B2 | 1/2022 | Van Heerden et al. |
| 11,308,462 B2 | 4/2022 | Berman et al. |
| 11,373,147 B1 | 6/2022 | Moore |
| 11,481,772 B2 | 10/2022 | Patel |
| 11,488,174 B2 | 11/2022 | Patel |
| 11,501,296 B2 | 11/2022 | Patel |
| 11,564,266 B1 | 1/2023 | Kahn |
| 11,935,051 B2 | 3/2024 | Patel |
| 11,961,107 B2 | 4/2024 | Patel |
| 11,966,895 B2 | 4/2024 | Patel et al. |
| 11,966,898 B2 | 4/2024 | Patel |
| 11,966,920 B2 | 4/2024 | Patel |
| 11,966,926 B2 | 4/2024 | Patel et al. |
| 11,972,423 B2 | 4/2024 | Patel |
| 11,938,692 B2 | 5/2024 | Patel |
| 2002/0016740 A1 | 2/2002 | Ogasawara |
| 2002/0152123 A1 | 10/2002 | Giordano et al. |
| 2002/0164953 A1 | 11/2002 | Curtis |
| 2003/0009385 A1 | 1/2003 | Tucciarone |
| 2003/0089767 A1 | 5/2003 | Kiyomatsu |
| 2003/0101096 A1 | 5/2003 | Suzuki et al. |
| 2003/0110097 A1 | 6/2003 | Lei |
| 2003/0130902 A1 | 7/2003 | Athwal |
| 2003/0158891 A1* | 8/2003 | Lei .................. G06Q 20/327 |
| | | | 709/203 |
| 2003/0191811 A1 | 10/2003 | Hashem |
| 2003/0206542 A1 | 11/2003 | Holder |
| 2003/0236872 A1* | 12/2003 | Atkinson ........... G06Q 20/3278 |
| | | | 709/223 |
| 2004/0029569 A1 | 2/2004 | Khan et al. |
| 2004/0049454 A1 | 3/2004 | Kanno et al. |
| 2004/0117262 A1* | 6/2004 | Berger ................ G06Q 20/341 |
| | | | 705/16 |
| 2004/0122685 A1 | 6/2004 | Bunce et al. |
| 2004/0133653 A1 | 7/2004 | Defosse |
| 2005/0021459 A1 | 1/2005 | Bell |
| 2005/0043011 A1 | 2/2005 | Murray |
| 2005/0080510 A1 | 4/2005 | Bates |
| 2005/0101295 A1 | 5/2005 | Rupp |
| 2005/0177798 A1 | 8/2005 | Thomson et al. |
| 2005/0181804 A1 | 8/2005 | Misikangas et al. |
| 2005/0232421 A1 | 10/2005 | Simons et al. |
| 2005/0234776 A1 | 10/2005 | Jacoves |
| 2006/0043175 A1 | 3/2006 | Fu et al. |
| 2006/0052157 A1 | 3/2006 | Walker et al. |
| 2006/0123335 A1 | 6/2006 | Sanchez et al. |
| 2007/0050083 A1 | 3/2007 | Signorelli et al. |
| 2007/0083287 A1 | 4/2007 | Defosse et al. |
| 2007/0095901 A1 | 5/2007 | Illingworth |
| 2007/0119680 A1 | 5/2007 | Saltsov et al. |
| 2007/0159994 A1 | 7/2007 | Brown et al. |
| 2007/0186105 A1 | 8/2007 | Bailey |
| 2007/0187491 A1 | 8/2007 | Godwin et al. |
| 2007/0227856 A1 | 10/2007 | Gopel |
| 2007/0250920 A1 | 10/2007 | Lindsay |
| 2007/0255653 A1 | 11/2007 | Tumminaro |
| 2008/0010190 A1 | 1/2008 | Rackley, III et al. |
| 2008/0010193 A1 | 1/2008 | Rackley III et al. |
| 2008/0033880 A1 | 2/2008 | Fiebiger et al. |
| 2008/0040265 A1 | 2/2008 | Rackley III et al. |
| 2008/0126213 A1 | 5/2008 | Robertson et al. |
| 2008/0141033 A1 | 6/2008 | Ginter et al. |
| 2008/0154727 A1 | 6/2008 | Carlson |
| 2008/0154735 A1 | 6/2008 | Carlson |
| 2008/0163257 A1 | 7/2008 | Carlson et al. |
| 2008/0167017 A1 | 7/2008 | Wentker et al. |
| 2008/0167991 A1 | 7/2008 | Carlson et al. |
| 2008/0183480 A1 | 7/2008 | Carlson et al. |
| 2008/0201226 A1 | 8/2008 | Carlson et al. |
| 2008/0208762 A1 | 8/2008 | Arthur et al. |
| 2008/0249658 A1 | 10/2008 | Walker |
| 2008/0254853 A1 | 10/2008 | Wright et al. |
| 2008/0255947 A1 | 10/2008 | Friedman |
| 2008/0319913 A1 | 12/2008 | Wiechers |
| 2009/0037284 A1 | 2/2009 | Lewis et al. |
| 2009/0076896 A1 | 3/2009 | Dewitt |
| 2009/0099961 A1 | 4/2009 | Ogilvy |
| 2009/0106160 A1* | 4/2009 | Skowronek .......... G06Q 20/327 |
| | | | 705/75 |
| 2009/0119190 A1 | 5/2009 | Realini |
| 2009/0171682 A1 | 7/2009 | Dixon et al. |
| 2009/0287349 A1 | 11/2009 | Mardiks |
| 2009/0288173 A1 | 11/2009 | Mardiks |
| 2009/0303982 A1 | 12/2009 | Blachman et al. |
| 2009/0306818 A1 | 12/2009 | Slagley et al. |
| 2009/0306819 A1* | 12/2009 | Insolia .................. G07F 9/02 |
| | | | 700/231 |
| 2009/0313125 A1 | 12/2009 | Roh et al. |
| 2009/0313132 A1 | 12/2009 | Kenna et al. |
| 2009/0327089 A1 | 12/2009 | Kanno et al. |

(56) References Cited

U.S. PATENT DOCUMENTS

| | | |
|---|---|---|
| 2010/0061294 A1 | 3/2010 | Proctor, Jr. |
| 2010/0082485 A1 | 4/2010 | Lin et al. |
| 2010/0094456 A1 | 4/2010 | Simpkins et al. |
| 2010/0105454 A1 | 4/2010 | Weber et al. |
| 2010/0198400 A1 | 8/2010 | Pascal |
| 2010/0227671 A1 | 9/2010 | Laaroussi et al. |
| 2010/0276484 A1 | 11/2010 | Banerjee |
| 2010/0280956 A1 | 11/2010 | Chutorash |
| 2010/0312692 A1 | 12/2010 | Teicher |
| 2010/0320266 A1 | 12/2010 | White |
| 2010/0329285 A1 | 12/2010 | Stanton |
| 2011/0029405 A1 | 2/2011 | Cronin |
| 2011/0040686 A1 | 2/2011 | Carlson |
| 2011/0125561 A1 | 5/2011 | Marcus |
| 2011/0153436 A1 | 6/2011 | Krampe |
| 2011/0153442 A1 | 6/2011 | Krampe |
| 2011/0153495 A1 | 6/2011 | Dixon et al. |
| 2011/0172848 A1 | 7/2011 | Breitenbach et al. |
| 2011/0178883 A1 | 7/2011 | Granbery |
| 2011/0225067 A1 | 9/2011 | Dunwoody |
| 2011/0238476 A1 | 9/2011 | Carr |
| 2011/0244799 A1 | 10/2011 | Roberts et al. |
| 2011/0251892 A1 | 10/2011 | Laracey |
| 2011/0251910 A1 | 10/2011 | Dimmick |
| 2011/0276636 A1 | 11/2011 | Cheng et al. |
| 2011/0289023 A1 | 11/2011 | Forster et al. |
| 2012/0011024 A1 | 1/2012 | Dorsey et al. |
| 2012/0016731 A1 | 1/2012 | Smith et al. |
| 2012/0029691 A1 | 2/2012 | Mockus et al. |
| 2012/0030047 A1 | 2/2012 | Fuentes |
| 2012/0036045 A1 | 2/2012 | Lowe et al. |
| 2012/0066096 A1 | 3/2012 | Penide |
| 2012/0078735 A1 | 3/2012 | Bauer et al. |
| 2012/0108173 A1 | 5/2012 | Hahm et al. |
| 2012/0136478 A1 | 5/2012 | Anand |
| 2012/0150742 A1 | 6/2012 | Poon et al. |
| 2012/0158172 A1 | 6/2012 | Wencslao |
| 2012/0158528 A1 | 6/2012 | Hsu et al. |
| 2012/0160912 A1 | 6/2012 | Laracey |
| 2012/0197740 A1 | 8/2012 | Grigg et al. |
| 2012/0203666 A1 | 8/2012 | Torossian et al. |
| 2012/0231844 A1 | 9/2012 | Coppinger |
| 2012/0246074 A1 | 9/2012 | Annamalai et al. |
| 2012/0253852 A1 | 10/2012 | Pourfallah |
| 2012/0254631 A1 | 10/2012 | Skillman et al. |
| 2012/0255653 A1 | 10/2012 | Chin |
| 2012/0258773 A1 | 10/2012 | Alvarez Rivera |
| 2012/0276845 A1 | 11/2012 | Wikander |
| 2012/0290472 A1 | 11/2012 | Mullen et al. |
| 2012/0296826 A1 | 11/2012 | Bergdale et al. |
| 2012/0303528 A1 | 11/2012 | Weiner et al. |
| 2012/0316963 A1 | 12/2012 | Moshfeghi |
| 2012/0330764 A1 | 12/2012 | Nahidipour |
| 2012/0330844 A1 | 12/2012 | Kaufman |
| 2013/0030931 A1 | 1/2013 | Moshfeghi |
| 2013/0054016 A1 | 2/2013 | Canter et al. |
| 2013/0054336 A1 | 2/2013 | Graylin |
| 2013/0054395 A1 | 2/2013 | Cyr et al. |
| 2013/0067365 A1 | 3/2013 | Shrufi et al. |
| 2013/0085835 A1 | 4/2013 | Horowitz |
| 2013/0087050 A1 | 4/2013 | Studor et al. |
| 2013/0100886 A1 | 4/2013 | Cherian |
| 2013/0110296 A1 | 5/2013 | Khoo |
| 2013/0117490 A1 | 5/2013 | Harriman |
| 2013/0117738 A1 | 5/2013 | Livingston et al. |
| 2013/0124289 A1 | 5/2013 | Fisher |
| 2013/0126607 A1* | 5/2013 | Behjat .................. G06Q 20/326 235/375 |
| 2013/0143498 A1 | 6/2013 | Niemi |
| 2013/0166448 A1 | 6/2013 | Narayanan |
| 2013/0185150 A1 | 7/2013 | Crum |
| 2013/0191789 A1* | 7/2013 | Calman .................. G06F 3/017 715/863 |
| 2013/0217333 A1 | 8/2013 | Sprigg et al. |
| 2013/0246171 A1* | 9/2013 | Carapelli ............ G06Q 20/325 705/14.51 |
| 2013/0246364 A1 | 9/2013 | Bhavith |
| 2013/0267121 A1 | 10/2013 | Hsu |
| 2013/0267176 A1 | 10/2013 | Hertel et al. |
| 2013/0275303 A1 | 10/2013 | Fiore |
| 2013/0275305 A1 | 10/2013 | Duplan |
| 2013/0278622 A1 | 10/2013 | Sun et al. |
| 2013/0282590 A1 | 10/2013 | Rajarethnam et al. |
| 2013/0297422 A1 | 11/2013 | Hunter et al. |
| 2013/0311379 A1 | 11/2013 | Smith |
| 2013/0311382 A1 | 11/2013 | Fosmark et al. |
| 2013/0331985 A1 | 12/2013 | Felique |
| 2013/0332293 A1 | 12/2013 | Ran |
| 2013/0346305 A1 | 12/2013 | Mendes |
| 2014/0006451 A1 | 1/2014 | Mullis et al. |
| 2014/0012414 A1 | 1/2014 | Pérez et al. |
| 2014/0019367 A1 | 1/2014 | Khan et al. |
| 2014/0025958 A1* | 1/2014 | Calman .................. G06F 21/33 713/189 |
| 2014/0032410 A1 | 1/2014 | Georgiev et al. |
| 2014/0032413 A1* | 1/2014 | Low .................. G07F 9/026 705/44 |
| 2014/0040028 A1 | 2/2014 | King et al. |
| 2014/0040117 A1 | 2/2014 | Jain |
| 2014/0046842 A1 | 2/2014 | Irudayam et al. |
| 2014/0052524 A1 | 2/2014 | Andersen |
| 2014/0052607 A1 | 2/2014 | Park |
| 2014/0064116 A1* | 3/2014 | Linde .................. H04L 67/06 370/252 |
| 2014/0067542 A1 | 3/2014 | Everingham |
| 2014/0074714 A1* | 3/2014 | Melone ............... G06Q 20/322 235/487 |
| 2014/0074723 A1* | 3/2014 | Kamat ................. G06Q 20/202 705/71 |
| 2014/0085046 A1 | 3/2014 | Shin et al. |
| 2014/0085109 A1 | 3/2014 | Stefik |
| 2014/0089016 A1 | 3/2014 | Smullin |
| 2014/0100977 A1 | 4/2014 | Davis |
| 2014/0122298 A1 | 5/2014 | Oyer |
| 2014/0136301 A1 | 5/2014 | Valdes |
| 2014/0136411 A1 | 5/2014 | Cho |
| 2014/0143055 A1 | 5/2014 | Johnson |
| 2014/0143074 A1 | 5/2014 | Kolls |
| 2014/0143137 A1 | 5/2014 | Carlson |
| 2014/0172179 A1 | 6/2014 | Baudin |
| 2014/0180852 A1 | 6/2014 | Kamat |
| 2014/0108108 A1 | 7/2014 | Artman |
| 2014/0188708 A1 | 7/2014 | Govindarajan et al. |
| 2014/0201066 A1 | 7/2014 | Roux et al. |
| 2014/0249995 A1 | 9/2014 | Ogilvy |
| 2014/0278989 A1 | 9/2014 | Calman |
| 2014/0279008 A1 | 9/2014 | Calman |
| 2014/0279101 A1 | 9/2014 | Duplan et al. |
| 2014/0279426 A1 | 9/2014 | Holman et al. |
| 2014/0279537 A1 | 9/2014 | Cicoretti |
| 2014/0279556 A1 | 9/2014 | Priebatsch |
| 2014/0289047 A1 | 9/2014 | Yee |
| 2014/0317611 A1 | 10/2014 | Wojcik et al. |
| 2014/0324627 A1 | 10/2014 | Haver |
| 2014/0337235 A1 | 11/2014 | Van Heerden et al. |
| 2014/0351099 A1 | 11/2014 | Zhu |
| 2014/0361872 A1 | 12/2014 | Garcia et al. |
| 2014/0378057 A1 | 12/2014 | Ramon et al. |
| 2015/0006421 A1 | 1/2015 | Pearson |
| 2015/0051977 A1 | 2/2015 | Lyman |
| 2015/0073980 A1 | 3/2015 | Griffin et al. |
| 2015/0081462 A1 | 3/2015 | Ozvat et al. |
| 2015/0088698 A1 | 3/2015 | Ackerman |
| 2015/0100152 A1 | 4/2015 | Trevino et al. |
| 2015/0105901 A1 | 4/2015 | Joshi et al. |
| 2015/0120546 A1 | 4/2015 | Fernandes |
| 2015/0120555 A1 | 4/2015 | Jung |
| 2015/0149992 A1 | 5/2015 | Wade et al. |
| 2015/0154579 A1 | 6/2015 | Teicher |
| 2015/0169312 A1 | 6/2015 | Patel |
| 2015/0170131 A1 | 6/2015 | Patel |
| 2015/0170132 A1 | 6/2015 | Patel |
| 2015/0170136 A1 | 6/2015 | Patel |

(56) References Cited

U.S. PATENT DOCUMENTS

| | | |
|---|---|---|
| 2015/0178702 A1 | 6/2015 | Patel |
| 2015/0220381 A1 | 8/2015 | Horagan et al. |
| 2015/0235202 A1 | 8/2015 | Zabala |
| 2015/0278811 A1 | 10/2015 | Lalchandani |
| 2015/0287085 A1 | 10/2015 | Windmueller |
| 2015/0302377 A1 | 10/2015 | Sweitzer |
| 2015/0302411 A1 | 10/2015 | Bondesen et al. |
| 2015/0317720 A1 | 11/2015 | Ramaratnam |
| 2015/0332029 A1 | 11/2015 | Coxe |
| 2015/0346994 A1 | 12/2015 | Chanyontpatanakul |
| 2015/0373537 A1 | 12/2015 | Toksvig |
| 2015/0379491 A1 | 12/2015 | Ma et al. |
| 2016/0012465 A1 | 1/2016 | Sharp |
| 2016/0019604 A1 | 1/2016 | Kobayashi |
| 2016/0063476 A1 | 3/2016 | Baldie |
| 2016/0086145 A1 | 3/2016 | Tsutsui |
| 2016/0092859 A1 | 3/2016 | Klingen |
| 2016/0098690 A1 | 4/2016 | Silvia et al. |
| 2016/0132870 A1 | 5/2016 | Xu et al. |
| 2016/0196220 A1 | 7/2016 | Perez et al. |
| 2016/0232515 A1 | 8/2016 | Jhas |
| 2016/0260081 A1 | 9/2016 | Zermeño |
| 2016/0292469 A1 | 10/2016 | Ianni |
| 2016/0335620 A1 | 11/2016 | Lyons et al. |
| 2016/0350744 A1 | 12/2016 | Tang et al. |
| 2017/0006656 A1 | 1/2017 | Nacer et al. |
| 2017/0017958 A1 | 1/2017 | Scott et al. |
| 2017/0193508 A1 | 1/2017 | Patel et al. |
| 2017/0092062 A1 | 3/2017 | Tsutsui |
| 2017/0148009 A1 | 5/2017 | Lafuente |
| 2017/0161728 A1 | 6/2017 | Satyanarayan et al. |
| 2017/0178116 A1 | 6/2017 | Savolainen et al. |
| 2017/0193478 A1 | 7/2017 | Dhurka |
| 2017/0193479 A1 | 7/2017 | Kamat |
| 2017/0330164 A1 | 11/2017 | Suelberg et al. |
| 2018/0005220 A1 | 1/2018 | Laracey |
| 2018/0165908 A1 | 6/2018 | Patel et al. |
| 2018/0197167 A1 | 7/2018 | Ganesan et al. |
| 2018/0240096 A1* | 8/2018 | Patel .............. H04W 76/15 |
| 2018/0276674 A1 | 9/2018 | Ramatchandirane et al. |
| 2018/0293573 A1 | 10/2018 | Ortiz et al. |
| 2018/0315271 A1 | 11/2018 | Gharabegian et al. |
| 2018/0374076 A1 | 12/2018 | Wheeler et al. |
| 2019/0213832 A1 | 7/2019 | Tsutsui |
| 2019/0236586 A1 | 8/2019 | Mei et al. |
| 2019/0244205 A1* | 8/2019 | Fieglein ............ G07F 9/026 |
| 2019/0244465 A1 | 8/2019 | Saunders et al. |
| 2019/0340604 A1 | 11/2019 | Nadella et al. |
| 2020/0387881 A1 | 12/2020 | Smith et al. |
| 2021/0012318 A1 | 1/2021 | Ducoulombier |
| 2021/0056552 A1 | 2/2021 | Murray |
| 2021/0158309 A1 | 5/2021 | Mcginlay et al. |
| 2021/0312440 A1 | 10/2021 | Badalian et al. |
| 2021/0357932 A1 | 11/2021 | Patel |
| 2021/0375094 A1 | 12/2021 | Thomas et al. |
| 2022/0405733 A1 | 12/2022 | Yao et al. |
| 2023/0222507 A1 | 7/2023 | Patel et al. |
| 2023/0274274 A1 | 8/2023 | Patel |
| 2023/0281621 A1 | 9/2023 | Patel |
| 2023/0289811 A1 | 9/2023 | Patel et al. |
| 2023/0297987 A1 | 9/2023 | Patel |

FOREIGN PATENT DOCUMENTS

| | | |
|---|---|---|
| CN | 1561508 A | 1/2005 |
| CN | 103688252 A | 3/2014 |
| CN | 104050747 A | 9/2014 |
| CN | 104603809 A | 5/2015 |
| CN | 204375056 U | 6/2015 |
| CN | 105139196 A | 12/2015 |
| CN | 105989466 A | 10/2016 |
| CN | 106803175 A | 6/2017 |
| CN | 107480975 A | 12/2017 |
| CN | 104680361 B | 5/2018 |
| CN | 207663510 U | 7/2018 |
| CN | 109389755 A | 2/2019 |
| CN | 108367497 B | 6/2021 |
| CN | 108352094 A | 9/2021 |
| CN | 113379401 B | 5/2024 |
| EP | 1571607 A2 | 9/2005 |
| EP | 2061001 A1 | 5/2009 |
| EP | 3901880 A1 | 10/2021 |
| GB | 2504922 A | 2/2014 |
| JP | H1125320 A | 1/1999 |
| JP | 2002-183812 A | 6/2002 |
| JP | 2003-242401 A | 8/2003 |
| JP | 2003-323662 A | 11/2003 |
| JP | 2004-252640 A | 9/2004 |
| JP | 2004310740 A | 11/2004 |
| JP | 2005-526325 T | 9/2005 |
| JP | 2009-259226 A | 11/2009 |
| JP | 2010528716 A | 8/2010 |
| JP | 4586607 B2 | 11/2010 |
| JP | 2012-504273 T | 2/2012 |
| KR | 20130138637 A | 12/2013 |
| KR | 20160076081 A | 6/2016 |
| WO | WO2003/098561 A1 | 11/2003 |
| WO | WO2006/020692 A2 | 2/2006 |
| WO | WO2007/015610 A1 | 2/2007 |
| WO | WO2008/083022 A1 | 7/2008 |
| WO | WO2008/083025 A2 | 7/2008 |
| WO | WO2008/083078 A2 | 7/2008 |
| WO | WO2008/083089 A1 | 7/2008 |
| WO | WO2008/083105 A2 | 7/2008 |
| WO | WO2008/083115 A1 | 7/2008 |
| WO | WO2008/083119 A1 | 7/2008 |
| WO | WO2009/070430 A2 | 6/2009 |
| WO | WO2013/132995 A1 | 9/2013 |
| WO | WO2013/177416 A2 | 11/2013 |
| WO | WO2014/093857 A1 | 6/2014 |
| WO | WO2016/123545 A1 | 8/2016 |
| WO | WO2016158748 A1 | 10/2016 |
| WO | WO2017010936 A1 | 1/2017 |
| WO | WO2017/143079 A1 | 8/2017 |

OTHER PUBLICATIONS

Patel, Notice of Allowance, U.S. Appl. No. 16/681,673, filed Aug. 17, 2022, 21 pgs.

Patel, Notice of Allowance, U.S. Appl. No. 16/934,392, filed Sep. 28, 2022, 2 pp. 5043.

Patel, Notice of Allowance, U.S. Appl. No. 17/529,111, filed Sep. 22, 2022, 9 pp. 5056.

Patel, Notice of Allowance, U.S. Appl. No. 17/654,732, filed Sep. 16, 2022, 8pgs. 5065.

Patel, Office Action, U.S. Appl. No. 15/893,514, filed Sep. 30, 2022, 9pgs.

Patel, Notice of Allownce, U.S. Appl. No. 17/147,305, filed Aug. 31, 2022, 5 pgs.

Hoffman et al., "New options in Wireless payments", Internet World 7.7:37 Penton Media Inc., Penton Business Media, Inc. and their subsidiaries . (Year: 2001 ).

Carton et al., Framework for Mobile Payments Integration, Electronic Journal of Information Systems Evaluation, 15.1: 14-24, Academic Conferences International Limited, January. (Year: 2012).

Apriva LLC Awarded Patent for System and Method for Facilitating a Purchase Transaction using a Customer Device Beacon, Jun. 7, 2017, Global IP News (Year: 2017).

Kumar, Amazon gets Indian patent for auto authentification of mobile transactions, ProQuest document Id:2433007646, Financial Express, Aug. 13 (Year:2020), 2 pgs.

@Robocopy Es, posted Oct. 11, 2014, retrieved Feb. 13, 2018, <URL:https://twitter.com/robocopyes> 2 pgs.

Adams, How can stationary kiosks thrive in a mobile world?, Amerian Banker, 2012.

Balan et al., mFerio: the design and evaluation of a peer-to-peer mobile payment system, Jun. 2009, 14 pgs.

Balfe et al., e-EMV: emulating EMV for internet payments with trusted computing Technologies, Oct. 2008, 12 pgs.

(56) References Cited

OTHER PUBLICATIONS

Bing, Bing Images Search: "dongle", http://www.bing.com/images/search?q=dongle&FORM+HDRSC2, Dec. 5, 2013, 8 pgs.
Carlson, Specification, U.S. Appl. No. 60/871,898, filed Dec. 26, 2006, 169 pgs.
Frolick, Assessing M-Commerce Opportunities, Auerbach Publications Inc., Information Systems Management, Spring 2004.
Google, Chromecast, htttp://www.google.com/intl/devices/chromecast/, Dec. 12, 2013, 4 pgs.
How to Pay the New Way, youtube, Apr. 5, 2018, 4 pgs.
How will Apple's new mobile wallet Passbook impact other mobile wallets?, posted Jun. 13, 2012, retrieved Feb. 13, 2018 from <URL:https://www.quora.com/How-will-Apples-new-mobile-wallet-Passbook-impact-other-mobile-wallets>, 5 pgs.
Kadambi et al., Near-Field Communication-based Secure Mobile Payment Service, Aug. 2009, 10 pgs.
Madlmayr et al., Near Field Communication Based Mobile Payment System, Austrian Research Funding Agency, Project 811408, Mar. 6, 2008, 13 pgs.
Novotny, Applying RFID technology in the retail industru-benefits and concerns from the consumer's perspective, Institute of Economic Science, Eszterhazy Karoly College, Eger, Hungary, Retail Technologies for the 21 Century, innovation and competitiveness in the retail industry, 2015.
Nurel, Recent Developments in Wireless Network Systems, Izmir Institute of Technology, Sep. 2001, 280 pgs.
Patel, Office Action, U.S. Appl. No. 14/320,534, Mar. 2, 2018, 26 pgs.
Patel, Final Office Action, U.S. Appl. No. 14/320,534, filed Apr. 16, 2015, 21 pgs.
Patel, Final Office Action, U.S. Appl. No. 14/320,534, filed Nov. 30, 2016, 24 pgs.
Patel, Final Office Action, U.S. Appl. No. 14/321,717, filed Jun. 18, 2015, 22 pgs.
Patel, Final Office Action, U.S. Appl. No. 14/321,724, filed Oct. 8, 2015, 19 pgs.
Patel, Final Office Action, U.S. Appl. No. 14/321,724, filed Dec. 13, 2017, 22 pgs.
Patel, Final Office Action, U.S. Appl. No. 14/321,733, filed Nov. 14, 2014, 11 pgs.
Patel, Final Office Action, U.S. Appl. No. 14/335,762, filed Jun. 9, 2016, 15 pgs.
Patel, Final Office Action, U.S. Appl. No. 14/456,683, filed Jun. 8, 2015, 14 pgs.
Patel, Final Office Action, U.S. Appl. No. 14/458,192, filed Sep. 16, 2015, 26 pgs.
Patel, Final Office Action, U.S. Appl. No. 14/458,199, filed Jun. 24, 2015, 8 pgs.
Patel, Final Office Action, U.S. Appl. No. 14/641,236, filed Mar. 11, 2016, 16 pgs.
Patel, Final Office Action, U.S. Appl. No. 14/968,703, filed Feb. 12, 2019, 22 pgs.
Patel, Final Office Action, U.S. Appl. No. 15/435,228, filed Oct. 2, 2020, 24 pgs.
Patel, Final Office Action, U.S. Appl. No. 15/893,514, filed Jul. 22, 2021, 12 pgs.
Patel, Final Office Action, U.S. Appl. No. 15/956,741, filed Oct. 2, 2020, 12 pgs.
Patel, Notice of Allowance, U.S. Appl. No. 14/214,644, filed Jun. 10, 2014, 9 pgs.
Patel, Notice of Allowance, U.S. Appl. No. 14/321,733, filed Jun. 22, 2015, 8 pgs.
Patel, Notice of Allowance, U.S. Appl. No. 14/321,733, filed Feb. 27, 2015, 9 pgs.
Patel, Notice of Allowance, U.S. Appl. No. 14/335,762, filed Oct. 3, 2016, 7 pgs.
Patel, Notice of Allowance, U.S. Appl. No. 14/335,762, filed Mar. 30, 2015, 9 pgs.
Patel, Notice of Allowance, U.S. Appl. No. 14/456,683, filed Oct. 8, 2015, 15 pgs.
Patel, Notice of Allowance, U.S. Appl. No. 14/458,192, filed Oct. 12, 2017, 8 pgs.
Patel, Notice of Allowance, U.S. Appl. No. 14/458,199, filed Jan. 20, 2017, 9 pgs.
Patel, Notice of Allowance, U.S. Appl. No. 14/611,065, filed Mar. 26, 2018, 18 pgs.
Patel, Notice of Allowance, U.S. Appl. No. 14/614,336, filed Dec. 11, 2015, 8 pgs.
Patel, Notice of Allowance, U.S. Appl. No. 14/614,336, filed Nov. 25, 2015, 13 pgs.
Patel, Notice of Allowance, U.S. Appl. No. 14/968,703, filed Jun. 27, 2019, 10 pgs.
Patel, Notice of Allowance, U.S. Appl. No. 15/406,492, filed Mar. 11, 2020, 9 pgs.
Patel, Notice of Allowance, U.S. Appl. No. 15/435,228, filed Aug. 12, 2021, 9 pgs.
Patel, Notice of Allowance, U.S. Appl. No. 15/603,400, filed Dec. 18, 2019, 8 pgs.
Patel, Notice of Allowance, U.S. Appl. No. 15/603,400, filed Jun. 18, 2020, 5 pgs.
Patel, Notice of Allowance, U.S. Appl. No. 15/878,352, filed Oct. 23, 2020, 8 pgs.
Patel, Notice of Allowance, U.S. Appl. No. 16/029,483, filed Dec. 23, 2020, 21 pgs.
Patel, Notice of Allowance, U.S. Appl. No. 16/748,727, filed May 9, 2022, 16 pgs.
Patel, Notice of Allowance, U.S. Appl. No. 16/748,727, filed Jan. 20, 2022, 15 pgs.
Patel, Notice of Allowance, U.S. Appl. No. 16/750,477, filed Jan. 26, 2022, 14 pgs.
Patel, Notice of Allowance, U.S. Appl. No. 16/934,933, filed Mar. 31, 2021, 8 pgs.
Patel, Office Action, U.S. Appl. No. 14/320,534, filed Apr. 8, 2016, 21 pgs.
Patel, Office Action, U.S. Appl. No. 14/320,534, filed Oct. 29, 2014, 18 pgs.
Patel, Office Action, U.S. Appl. No. 14/321,717, filed Dec. 19, 2014, 16 pgs.
Patel, Office Action, U.S. Appl. No. 14/321,724, filed Mar. 13, 2017, 21 pgs.
Patel, Office Action, U.S. Appl. No. 14/321,724, filed May 15, 2015, 19 pgs.
Patel, Office Action, U.S. Appl. No. 14/321,733, filed Aug. 21, 2014, 9 pgs.
Patel, Office Action, U.S. Appl. No. 14/335,762, filed Dec. 10, 2014, 7 pgs.
Patel, Office Action, U.S. Appl. No. 14/335,762, filed Sep. 18, 2015, 13 pgs.
Patel, Office Action, U.S. Appl. No. 14/456,683, filed Jan. 2, 2015, 10 pgs.
Patel, Office Action, U.S. Appl. No. 14/458,192, filed Mar. 23, 2017, 26 pgs.
Patel, Office Action, U.S. Appl. No. 14/458,192, filed Jan. 30, 2015, 24 pgs.
Patel, Office Action, U.S. Appl. No. 14/458,199, filed Jan. 5, 2015, 7 pgs.
Patel, Office Action, U.S. Appl. No. 14/458,199, filed Mar. 28, 2016, 8 pgs.
Patel, Office Action, U.S. Appl. No. 14/611,065, filed Oct. 3, 2016, 19 pgs.
Patel, Office Action, U.S. Appl. No. 14/611,065, filed Jun. 13, 2017, 17 pgs.
Patel, Office Action, U.S. Appl. No. 14/614,336, filed May 27, 2015, 17 pgs.
Patel, Office Action, U.S. Appl. No. 14/641,236, filed Feb. 7, 2018, 19 pgs.
Patel, Office Action, U.S. Appl. No. 14/641,236, filed May 29, 2015, 10 pgs.
Patel, Office Action, U.S. Appl. No. 14/968,703, filed Aug. 7, 2018, 31 pgs.
Patel, Office Action, U.S. Appl. No. 15/406,492, filed Jul. 25, 2019, 16 pgs.

(56) References Cited

OTHER PUBLICATIONS

Patel, Office Action, U.S. Appl. No. 15/435,228, filed Mar. 26, 2020, 21 pgs.
Patel, Office Action, U.S. Appl. No. 15/603,400, filed Jun. 12, 2019, 10 pgs.
Patel, Office Action, U.S. Appl. No. 15/878,352, filed Jan. 24, 2020, 12 pgs.
Patel, Office Action, U.S. Appl. No. 15/893,514, filed Oct. 29, 2020, 17 pgs.
Patel, Office Action, U.S. Appl. No. 15/956,741, filed Apr. 22, 2020, 10 pgs.
Patel, Office Action, U.S. Appl. No. 15/956,741, filed Dec. 27, 2021, 10 pgs.
Patel, Office Action, U.S. Appl. No. 16/029,483, filed Apr. 27, 2020, 28 pgs.
Patel, Office Action, U.S. Appl. No. 16/681,673, filed Dec. 24, 2021, 20 pgs.
Patel, Office Action, U.S. Appl. No. 16/934,933, filed Oct. 28, 2020, 9 pgs.
Patel, Office Action, U.S. Appl. No. 17/216,399, filed Apr. 8, 2022, 14 pgs.
When the Future Feels Worse Than the Past: A Temporal Inconsistency in Moral Judgment, 15 pgs. (Year: 2010) https://citeseerx.ist.psu.edu/viewdoc/download?doi=10.1.1.675.3584&rep=repl&type=pdf.
Pay Range Inc., Communication Pursuant to Article 94(3), EP 14828617.2, Dec. 19, 2017, 6 pgs.
Pay Range Inc., Communication Pursuant to Article 94(3), EP 16706931.9, Jun. 29, 2018, 8 pgs.
Pay Range Inc., Communication Pursuant to Rules 161(1) and 162, EP 14828617.2, Sep. 21, 2016, 2 pgs.
Pay Range Inc., Communication Pursuant to Rules 161(1) and 162, EP 16706931.9, Sep. 21, 2017, 2 pgs.
Pay Range Inc., Communication under Rule 71(3) EPC, EP 14828617.2, filed Nov. 19, 2020, 7 pgs.
PayRange Inc., Communication under Rule 71(3) EPC, EP 17708929.9, Jun. 12, 2020, 7 pgs.
Pay Range Inc., European Search Report, EP 20203134.0, Feb. 9, 2021, 7 pgs.
Pay Range Inc., European Search Report, EP 21165692.1, Sep. 14, 2021, 10 pgs.
Pay Range Inc., IPRP, PCT/US2014/071284, Jun. 21, 2016, 6 pgs.
Pay Range Inc., IPRP, PCT/US2016/015763, Aug. 1, 2017, 7 pgs.
PayRange Inc., IPRP, PCT/US2017/015676, Jul. 31, 2018, 9 pgs.
PayRange Inc., IPRP, PCT/US2017/018194, Aug. 21, 2018, 17 pgs.
Pay Range Inc., IPRP, PCT/US2019/060777, May 11, 2021, 7 pgs.
Pay Range Inc., ISR/WO, PCT/US2014/071284, Mar. 25, 2015, 9 pgs.
PayRange Inc., ISR/WO, PCT/US2016/015763, Apr. 8, 2016, 9 pgs.
PayRange Inc., ISR/WO, PCT/US2017/015676, Apr. 18, 2017, 11 pgs.
Pay Range Inc., ISR/WO, PCT/US2017/018194, Apr. 12, 2017, 10 pgs.
Pay Range Inc., ISR/WO, PCT/US2019/060777, Feb. 6, 2020, 11 pgs.
PayRange Inc., ISR/WO, PCT/US2021/042632, Nov. 17, 2021, 11 pgs.
Pay Range Inc., Notice of Reasons for Rejection, JP 2017-527886, Aug. 29, 2019, 10 pgs.
Pay Range Inc., Notice of Reasons for Rejection, JP 2018-543707, Sep. 4, 2020, 4 pgs.
Pay Range Inc., Notice of Reasons for Rejection, JP 2020-101558, Oct. 7, 2021, 2 pgs.
Pay Range Inc., Summons to Attend Oral Proceedings, EP 14828617.2, Apr. 2, 2020, 12 pgs.
Pay Range New Product Launch, posted at youtube.com Jun. 27, 2015, @ 2016 YouTube, LLC, [online], [site visited Mar. 2, 2016]. Available from Internet, <URL: https://www.youtube.com/watch?v=NTvvV03XFeg., 1 pg.
Smart Vending Machine Demo at TechCrunch Disrupt 2013, posted at youtube.com Dec. 3, 2013, @ 2016 YouTube, LLC, [online], [site visited Mar. 2, 2016]. Available from internet, URL: https://www.youtube.com/watch?v=XEz1H-gxLj8>.
Square Mobile Credit Card Processing for iPhone, iPod, iPad, posted at youtube.com, posting date Apr. 30, 2011, @ 2016 YouTube, LLC, [online], [site visited Mar. 2, 2016]. Available from internet, <URL: https://www.youtube.com/watch?v=v6sKb3CFSKw>.
Raja, A Stochastic Game Theoretic Model for Expanding ATM Services. Https://ieeexplore.ieee.org/stamp/stamp.jsp?tp-&arnumber=7395687, 2015, 8 pgs.
Patel, Non-Final Office Action, U.S. Appl. No. 17/443,802, filed Dec. 23, 2022, 14 pgs.
Patel, Non-Final Office Action, U.S. Appl. No. 15/956,741, filed Feb. 27, 2023, 11 pgs.
Patel et al., U.S. Appl. No. 15/893,514, Notice of Allowance, Apr. 10, 2023, 13 pgs.
Heimerl et al., "Community sourcing: Engaging Local Crowds to Perform Expert Work Via Physical Kiosks", CHI '12: Proceedings of the SIGCHI Conference on Human Factors in Computing Systems, May 2012, pp. 1539-1548, 10 pgs. https://doi.org/10.1145/2207676.2208619.
Planet Laundry Magazine, "Upwardly Mobile", Smartphones and Other Mobile Devices are Increasingly Becoming the Way Your Customers Prefer to Find—and Interact With—Your Business, Oct. 2013, "Magazine pp. 32-33 (PDF pp. 34-35)", 68 pgs.
Patel, Notice of Allowance, U.S. Appl. No. 17/443,802, filed Jun. 28, 2023, 8 pgs.
Patel, Corrected Notice of Allowability, U.S. Appl. No. 17/443,802, filed Jul. 10, 2023, 5 pgs.
Patel, Notice of Allowance, U.S. Appl. No. 17/983,311, filed Jun. 28, 2023, 10 pgs.
EIC 3600 Search Report, STIC, Scientific & Technical Information Center, Date Completed Jun. 12, 2023, 5 pgs.
Patel et al., Notice of Allowance, U.S. Appl. No. 15/893,514, filed Jul. 12, 2023, 13 pgs.
Patel et al., Notice of Allowance, U.S. Appl. No. 17/973,506, filed Jul. 26, 2023, 13 pgs.
Katy Jacob, "Are mobile payments the smart cards of the aughts?", Scientific and Technical Information Center, Report Information from Dialog, Jul. 14, 2023—11:33, ProQuest, Publication Info: Chicago Fed Letter 240: 1-4. Federal Reserve Bank of Chicago. (Jul. 2007), 9 pgs.
Patel et al., Notice of Allowance, U.S. Appl. No. 17/963,170, filed Aug. 4, 2023, 16 pgs.
USA Technologies Announces Cashless Solution to Be Offered by Blackboard Inc., Scientific and Technical Information Center, Report Information from Dialog, Jul. 25, 2023, ProQuest, Publication Info: Business Wire Jul. 18, 2007: NA, 6 pgs.
Patel, Non-Final Office Action, U.S. Appl. No. 18/197,071, Aug. 16, 2023, 9 pgs.
Hossain et al., "Comprehensive Study of Bluetooth Signal Parameters for Localization", Department of Electrical & Computer Engineering National University of Singapore, 5 pgs. Email: {g0500774, Weeseng}@nus.edu.sg
Hands-Free Profile 1.5, Doc. No. HFP1.5_SPEC, Nov. 25, 2005, 93 pgs.
DEX and MDB: A Primer for Vendors | Vending Market Watch, Feb. 7, 2008, 5 pgs. https://www.vendingmarketwatch.com/print/content/10272928.
MDB Protocol V4.2—Multi-Drop Bus—Internal Communication Protocol, MDB / ICP, Version 4.2, Feb. 2011, 313 pgs.
Gruber et al., "The Commodity Vending Machine", Forum Ware International Feb. 2005, 11 pgs.
Michael L. Kasavana, Innovative VDI Standards: Moving an Industry Forward, The Journal of International Management, vol. 4, No. 3, Dec. 2009, 10 pgs.
SDFL Administrative Order 2021-33, Apr. 6, 2021, 5 pgs.
The New York Times by David Poque, In Arrived of 2 iPhones, 3 Lessons, Sep. 17, 2013, 4 pgs. https://www./nytime.com/2013/09/18/technology/personaltech/In-Arrived-of-2-iPhones-3-Lessons.html.

(56) References Cited

OTHER PUBLICATIONS

Cnet, John Thompson, How to use S Beam on your Samsung Galaxy S3, Jun. 21, 2012, 5 pgs. https://www.cnet.com/how-to/how-to-use-s-beam-on-your-samsung-galaxy-s3/.
Iphone, User Guide For iOS 6.1 Software, 156 pgs.
Apple Reports Fourth Quarter Results, Oct. 28, 2013, 4 pgs.
Apple Announces iPhone 5s—The Most Forward—Thinking Smartphone in the World, Sep. 10, 2013, 5 pgs.
Cnet, by Marguerite Reardon, Motion sensing comes to mobile phones, Jun. 11, 2007, 4 pgs.
Multi-Drop Bus—Internal Communication Protocol, MDB / ICP, Version 3, Mar. 26, 2003, 270 pgs.
Weidong Kou, Payment Technologies for E-Commerce, University of Hong Kong Pokfulam Road, Hong Kong, ACM Subject Classification (1998): H.4, K.4.4, J.1, 339 pgs.
Specification for RFID Air Interface, EPC™ Radio-Frequency Identity Protocols, Class-1 Generation-2 UHF RFID, Protocol for Communications at 860 MHz—960 MHz, Version 1.2.0, EPCglobal Inc., Oct. 23, 2008, 108 pgs.
Baier et al., "Principles of Model Checking", The MIT Press Cambridge, Massachusetts, London, England, 2008, 994 pgs.
Patel, Notice of Allowance, U.S. Appl. No. 17/983,311, filed Oct. 4, 2023,11 pgs.
Patel, Non-Final Office Action, U.S. Appl. No. 18/197,070, filed Sep. 17, 2023, 8 pgs.
Patel, Notice of Allowance, U.S. Appl. No. 17/443,802, filed Nov. 1, 2023, 8 pgs.
Patel et al., Notice of Allowance, U.S. Appl. No. 15/893,514, filed Nov. 8, 2023, 13 pgs.
Kevin Werbach et al., "Contracts Ex Machina", Articles, Faculty Scholarship, University of Michigan Law School, The University of Michigan Law School Scholarship Repository, (Year: 2017), 71 pgs. https://repository.law.umich.edu/cgi/viewcontent.cgi?article=2936&context=articles.
Patel et al., Notice of Allowance, U.S. Appl. No. 17/973,506, filed Dec. 7, 2023, 11 pgs.
Bailey, Mobile-phone payment option gains ground, Dialog, STIC, Report Information from Dialog, Nov. 29, 2023, 6 pgs.
Patel, Non-Final Office Action, U.S. Appl. No. 17/973,505, filed Dec. 15, 2023, 14 pgs.
Patel, Notice of Allowance, U.S. Appl. No. 18/197,070, filed Dec. 20 2023, 10 pgs.
"Mobile payment heads to the U.S.", Mobile Internet 6.10:1. Information Gatekeepers, Inc. (Oct. 2004), 2 pgs.
"During the period 2005 to 2009, the total Number of wireless data connections used for retail applications in Europe can be expected to rise from less than 1 million to around 3 million", M2 PressWire, Feb. 28 (Year: 2006), 3 pgs.
Patel, Non-Final Office Action, U.S. Appl. No. 17/973,507, filed Jan. 26, 2024, 9 pgs.
Patel, Notice of Allowance, U.S. Appl. No. 15/956,741, filed Jan. 18, 2024, 18 pgs.
IEEE Standard for Information technology—Telecommunication and information exchange between systems—Local and metropolitan area networks—Specific requirements, Part 15.4: Wireless Medium Access Control (MAC) and Physical Layer (PHY) Specifications for Low-Rate Wireless Personal Area Networks (LR-WPANs), IEEE, The Institute of Electrical and Electronics Engineers, Inc., 3 Park Avenue, New York, NY 10016-5997, USA, Oct. 1, 2003, 679 pgs.
Patel et al., Notice of Allowance, U.S. Appl. No. 17/963,170, filed Dec. 12, 2023, 11 pgs.
Slick self-service options: as staffing remains lean grocers are using advanced self-service checkouts and kiosks to augment customer service, Dialog, STIC, Report Information from Dialog, Nov. 30, 2023, 8 pgs.
Patel, Notice of Allowance, U.S. Appl. No. 18/197,071, filed Jan. 26, 2024, 10 pgs.
Patel, Non-Final Office Action, U.S. Appl. No. 17/985,832, filed Feb. 29, 2024, 10 pgs.
Patel, Non-Final Office Action, U.S. Appl. No. 17/978,894, filed Jan. 17, 2024, 10 pgs.
Mumford, "The Components of credit card vending", Automatic Merchandiser, Oct. 9, 2009, pp. 42-47 (Year: 2009), 7 pgs.
"The benefits of offline vs. online vending machines", retrieved from https://web.archive.org/web/20181109215952/https:// www.parlevelsystems.com/2018/10/23/online-offline-infographic/, Oct. 23, 2018, 2 pgs.) (Year: 2018).
Patel, Notice of Allowance, U.S. Appl. No. 17/973,507, filed May 10, 2024, 10 pgs.
CBM2020-00026 Petition—U.S. Pat. No. 9,659,296, 99 pgs.
IPR2021-00086 Petition—U.S. Pat. No. 9,659,296, 74 pgs.
IPR2023-01186 Institution—U.S. Pat. No. 8,856,045 B1, Entered: Jan. 19, 2024, 23 pgs.
IPR2023-01186 Petition—U.S. Pat. No. 8,856,045, 87 pgs.
IPR2023-01187 Petition—U.S. Pat. No. 10,438,208, 83 pgs.
IPR2023-01188 Petition—U.S. Pat. No. 10,891,608, 83 pgs.
IPR2023-01449 Institution—U.S. Pat. No. 11,481,772 B2, Date: Apr. 12, 2024, 27 pgs.
IPR2023-01449 Petition—U.S. Pat. No. 11,481,772, 96 pgs.
PGR2021-00077 Final Decision—U.S. Pat. No. 10,719,833 B2, Date: Oct. 26, 2022, 60 pgs.
PGR2021-00077 Institution—U.S. Pat. No. 10,719,833 B2, Date: Oct. 28, 2021, 53 pgs.
PGR2021-00077 Petition—U.S. Pat. No. 10,719,833, 102 pgs.
PGR2021-00084 Petition—U.S. Pat. No. 10,891,608, 123 pgs.
PGR2021-00093 Final Decision—U.S. Pat. No. 10,891,614 B2, 70 pgs.
PGR2021-00093 Institution—U.S. Pat. No. 10,891,614 B2, Entered: Dec. 17, 2021, 49 pgs.
PGR2021-00093 Petition—U.S. Pat. No. 10,891,614, 107 pgs.
PGR2022-00035 Petition—U.S. Pat. No. 11,074,580, 102 pgs.
PGR2023-00042 Petition—U.S. Pat. No. 11,481,772, 102 pgs.
PGR2023-00045 Petition—U.S. Pat. No. 11,488,174, 99 pgs.
PGR2023-00050 Petition—U.S. Pat. No. 11,501,296, 103 pgs.
Patel, Non-Final Office Action, U.S. Appl. No. 18/643,965, Jul. 1, 2024, 17 pgs.
W. Zhang and X. L. Zhang, "Design and Implementation of Automatic Vending Machine Based on the Short Massage Payment," 2010 6th International Conference on Wireless Communications Networking and Mobile Computing (WiCOM), Chengdu, China. https://ieeexplore.ieee.org/document/5600192?source=1Oplus (Year: 2010), 4 pgs.
Patel, Non-Final Office Action, U.S. Appl. No. 18/643,971, Jul. 5, 2024, 11 pgs.
Patel, Non-Final Office Action, U.S. Appl. No. 18/643,979, Jul. 18, 2024, 12 pgs.
Patel, Non-Final Office Action, U.S. Appl. No. 18/643,975, Jul. 18, 2024, 12 pgs.
Patel, Notice of Allowance, U.S. Appl. No. 17/973,505, Jul. 17, 2024, 12 pgs.
Patel, Notice of Allowance, U.S. Appl. No. 17/978,894, Jul. 17, 2024, 10 pgs.

* cited by examiner

| Tab | Favorite? | Alert | View to User |
|---|---|---|---|
| All | Yes | No | User can make Hands-free Credit with the connected vending machine |
| All | No | Yes | User needs to launch Mobile Device and then swipe to make transaction manually |
| Favorite | Yes | No | Hands-free transaction will be available to the user via vending machine |
| Favorite | No | No | User is not alerted for the vending machine which is not a favorite machine. Hands-free mode will not work, manual swipe for transaction required by user. |
| Either All or Favorite | Yes | Yes | BUT Hands-free Credit is not available (disabled by module, expired AuthGrant, insufficient balance, or other issue), then user will get an alert so that user can swipe credit manually. |

Figure 3

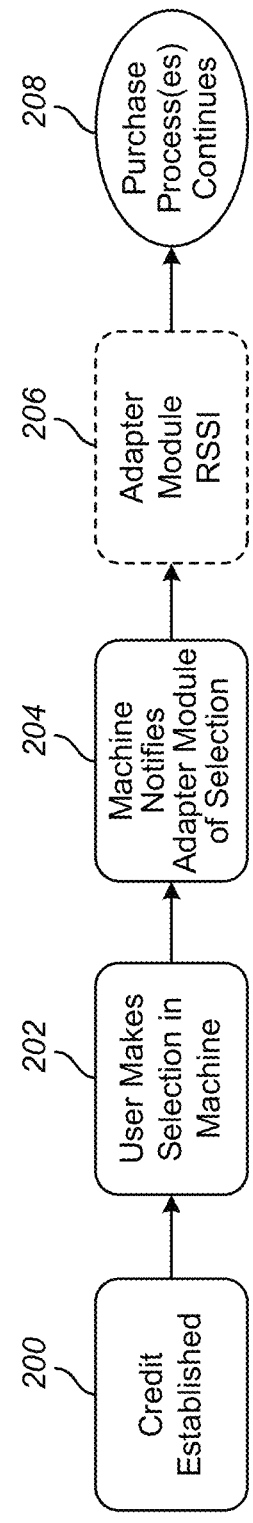

Figure 4

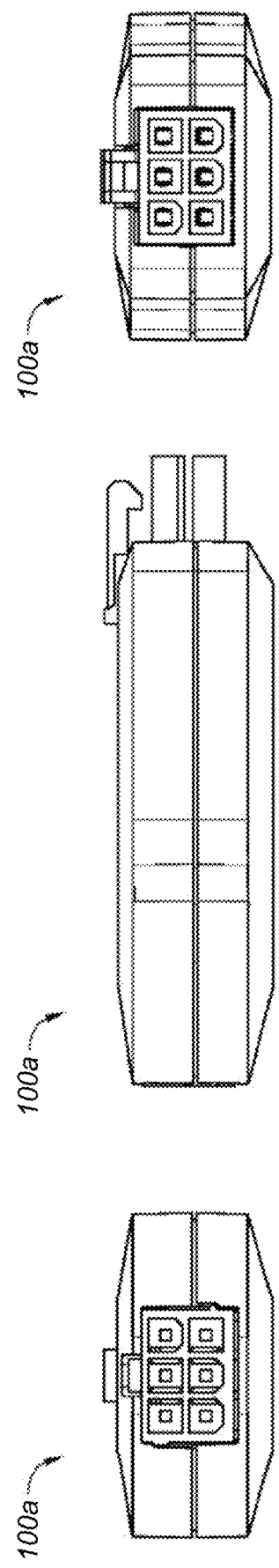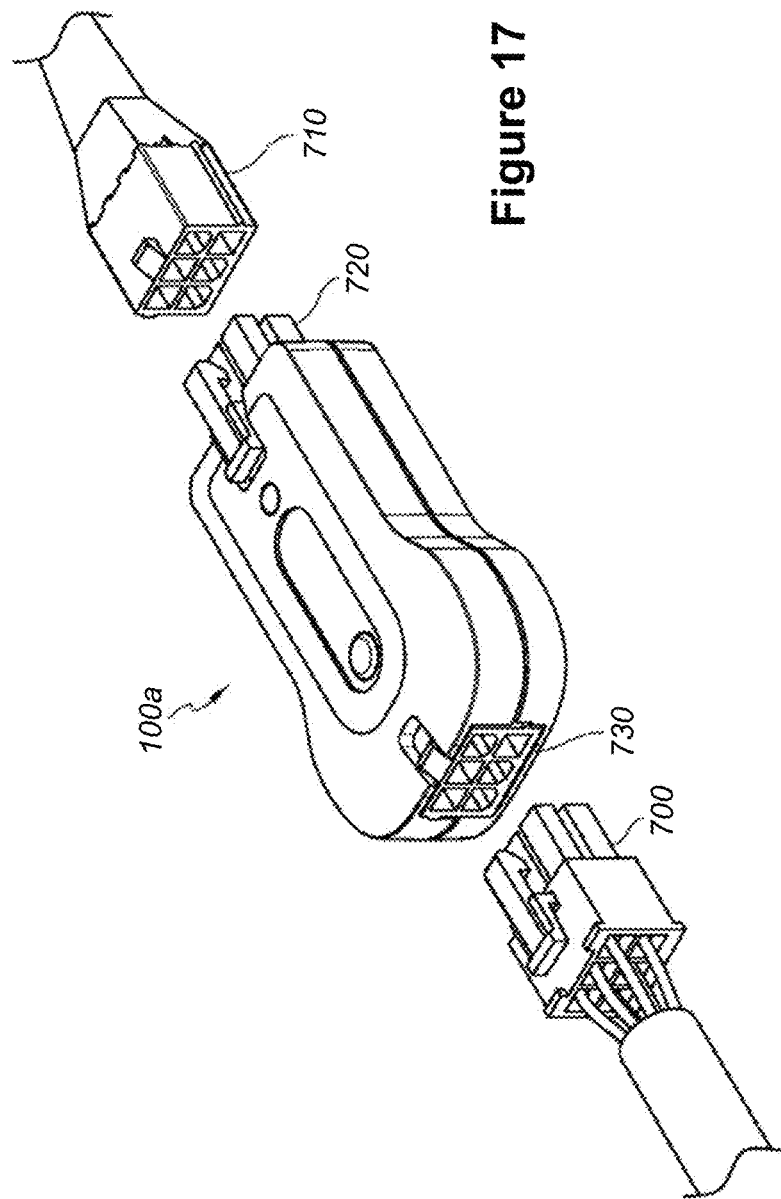

1600

1602 — At a payment module coupled with a payment accepting unit, the payment module including one or more processors, memory, and one or more first communication capabilities:

Obtain, from the payment accepting unit, a first notification indicating completion of a first transaction performed by a first user of a first device at the payment accepting unit and an amount of the first transaction

1604 — In response to receiving the notification:

Generate first transaction information based at least in part on the first notification;

Store the generated first transaction information; and

Send the generated first transaction information to the first device via one of the one or more first communication capabilities (A)

1606 — After sending the first transaction information to the first device and in accordance with a determination that first acknowledgement information is received from the first device within a predetermined time period:

Delete the stored first transaction information generated for the first transaction performed by the first user of the first device

1608 — Encrypting the generated first transaction information; and

The first acknowledgement information is encrypted

Figure 29A

In accordance with a determination that second acknowledgement information has been received from the second device within the predetermined time period: ⎯1618

Delete the stored first transaction information generated for the first transaction performed by the first user of the first device and the stored second transaction information generated for the second transaction performed by the second user of the second device

In accordance with a determination that the second acknowledgement information has not been received from the second device within a predetermined time period; ⎯1620

Maintain the stored first transaction information generated for the first transaction performed by the first user of the first device and the stored second transaction information generated for the second transaction performed by the second user of the second device

Figure 29C

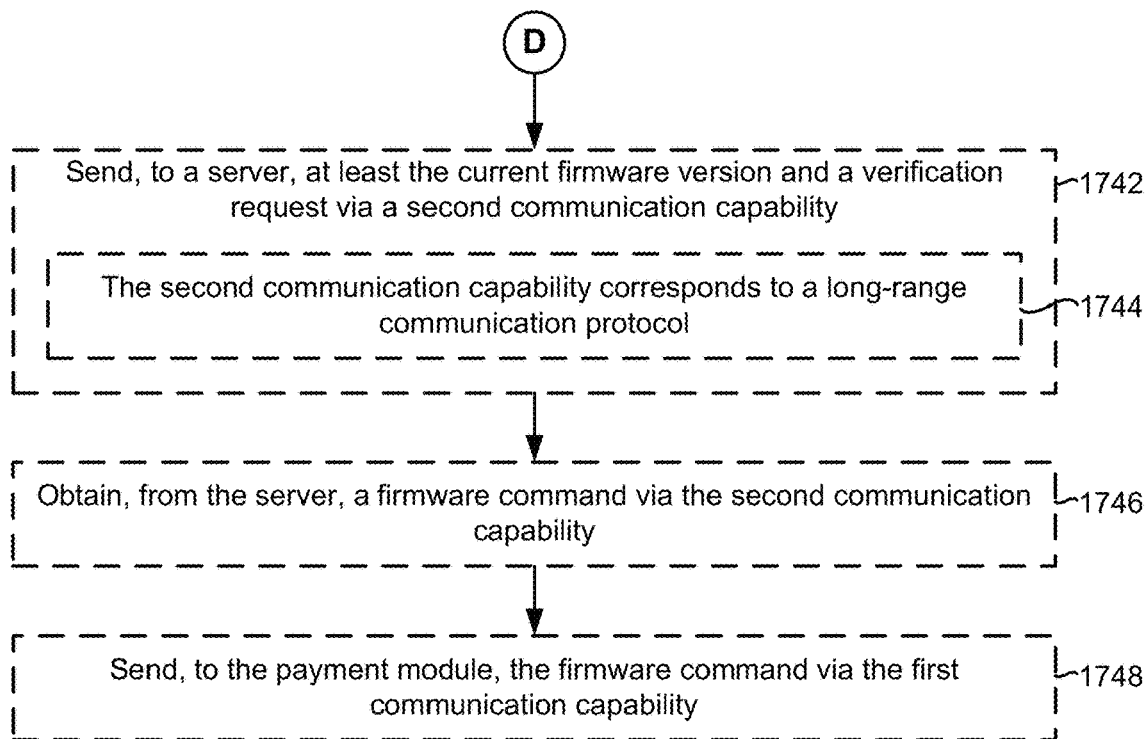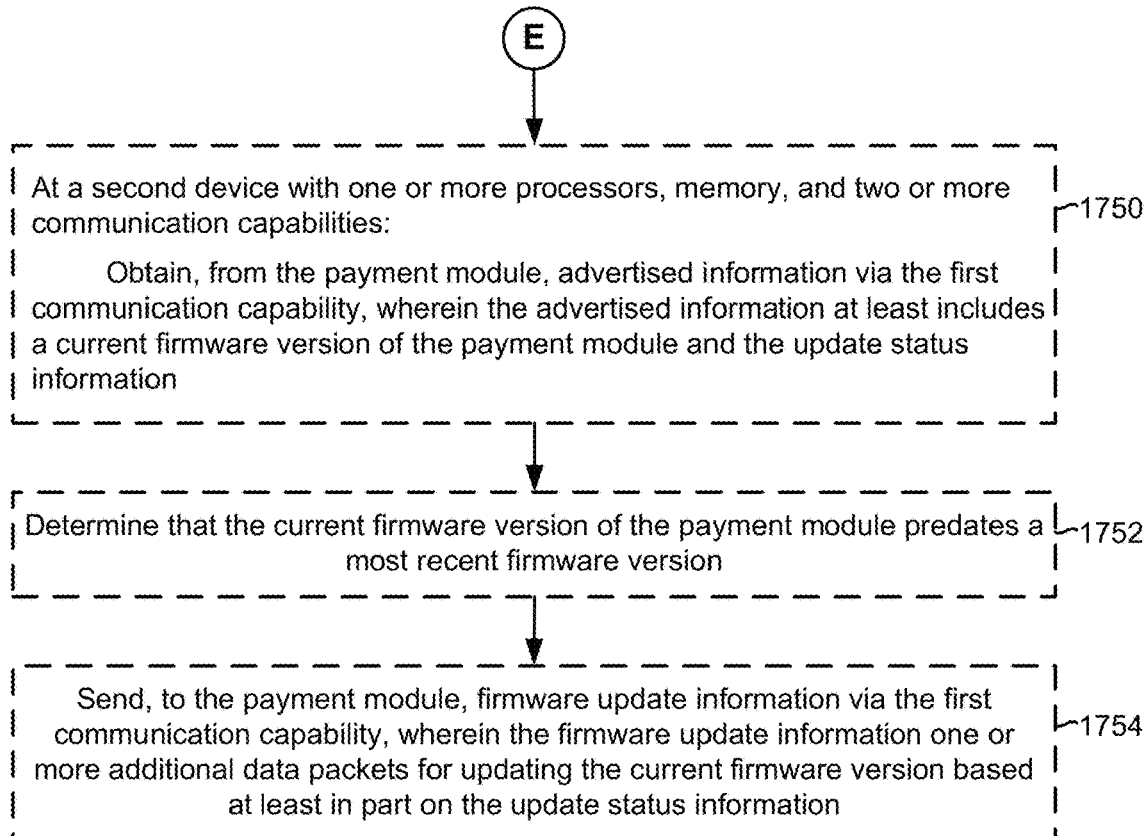
Figure 30D

INTERMEDIARY COMMUNICATIONS OVER NON-PERSISTENT NETWORK CONNECTIONS

PRIORITY CLAIM AND RELATED APPLICATIONS

This application is a continuation of U.S. patent application Ser. No. 16/748,727, filed Jan. 21, 2020 which is a continuation-in-part of U.S. patent application Ser. No. 15/406,492, filed Jan. 13, 2017, which is a continuation of U.S. patent application Ser. No. 14/335,762, filed Jul. 18, 2014, issued as U.S. Pat. No. 9,547,859 on Jan. 17, 2017, which is a continuation of U.S. patent application Ser. No. 14/214,644, filed Mar. 14, 2014, issued as U.S. Pat. No. 8,856,045 on Oct. 7, 2014, which claims priority to U.S. Provisional Patent Application No. 61/917,936, filed Dec. 18, 2013. U.S. patent application Ser. No. 14/214,644 is also a continuation-in-part of U.S. Design patent application Ser. No. 29/477,025, filed Dec. 18, 2013, issued as U.S. Design Pat. No. D755,183 on May 3, 2016, each of which is hereby incorporated by reference in its entirety.

This application is a continuation-in-part of U.S. patent application Ser. No. 16/029,483, filed Jul. 6, 2018, which is a continuation of U.S. patent application Ser. No. 14/611,065, filed Jan. 30, 2015, issued as U.S. Pat. No. 10,019,724 on Jul. 10, 2018, each of which is hereby incorporated by reference in its entirety.

This application is a continuation-in-part of U.S. patent application Ser. No. 15/956,741, filed Apr. 18, 2018, which claims priority to U.S. Provisional Patent Application No. 62/486,951, filed Apr. 18, 2017, each of which is hereby incorporated by reference in its entirety.

U.S. patent application Ser. No. 15/956,741 is also a continuation-in-part of U.S. patent application Ser. No. 15/893,514, filed Feb. 9, 2018, which is a continuation of PCT Patent Application No. PCT/US2017/015676, filed Jan. 30, 2017, which claims priority to U.S. Provisional Application No. 62/289,158, filed Jan. 29, 2016. U.S. patent application Ser. No. 15/893,514 is also a continuation-in-part of U.S. patent application Ser. No. 14/641,236, filed Mar. 6, 2015, which claims priority to U.S. Provisional Application No. 62/081,492, filed Nov. 18, 2014. U.S. patent application Ser. No. 14/641,236 is also a continuation-in-part of U.S. patent application Ser. No. 14/320,534, filed Jun. 30, 2014, which is a continuation-in-part of U.S. patent application Ser. No. 14/214,644, filed Mar. 14, 2014 and issued on Oct. 7, 2014 as U.S. Pat. No. 8,856,045, which claims priority to U.S. Provisional Patent Application No. 61/917,936, filed Dec. 18, 2013. U.S. patent application Ser. No. 14/214,644 is also a continuation-in-part of U.S. Design patent application Ser. No. 29/477,025, filed Dec. 18, 2013 and issued on May 3, 2016 as U.S. Pat. No. D755,183. Each of the aforementioned applications is hereby incorporated by reference in its entirety.

U.S. patent application Ser. No. 15/956,741 is also a continuation-in-part of U.S. patent application Ser. No. 15/435,228, filed Feb. 16, 2017, which claims priority to U.S. Provisional Application No. 62/296,543, filed Feb. 17, 2016 and is a continuation-in-part of U.S. patent application Ser. No. 14/458,192, filed Aug. 12, 2014 and issued on Jan. 23, 2018 as U.S. Pat. No. 9,875,473, which is a continuation-in-part of U.S. patent application Ser. No. 14/456,683, filed Aug. 11, 2014 and issued on Feb. 9, 2016 as U.S. Pat. No. 9,256,873, which is a continuation of U.S. patent application Ser. No. 14/335,762, filed Jul. 18, 2014 and issued on Jan. 17, 2017 as U.S. Pat. No. 9,547,859, which is a continuation of U.S. patent application Ser. No. 14/214,644, filed Mar. 14, 2014 and issued on Oct. 7, 2014 as U.S. Pat. No. 8,856,045, which claims priority to U.S. Provisional Patent Application No. 61/917,936, filed Dec. 18, 2013. U.S. patent application Ser. No. 14/214,644 is also a continuation-in-part of U.S. Design patent application Ser. No. 29/477,025, filed Dec. 18, 2013 and issued on May 3, 2016 as U.S. Pat. No. D755,183. Each of the aforementioned applications is hereby incorporated by reference in its entirety.

FIELD OF THE INVENTION

The present application relates to the field of payment processing systems, and in particular, to a processing system for authenticating vending machine transactions over non-persistent network connections.

BACKGROUND OF THE INVENTION

Vending machines (or "automatic retailing" machines), in the broadest sense, have been around for thousands of years. The first simple mechanical coin operated vending machines were introduced in the 1880s. Modern vending machines stock many different types of products including, but not limited to drinks (e.g., water, juice, coffee, and soda) and edible food products/items (e.g., snacks, candy, fruit, and frozen meals), as well as a wide variety of non-food items. In this fast paced world, vending machines are ubiquitous.

Vending machines are one type of "payment accepting unit" (payment accepting units are also referred to herein generically as "machines"). A payment accepting unit (or machine) is equipment that requires payment for the dispensing of products and/or services. In addition to vending machines, payment accepting units can also be other machines that require payment for the dispensing of a product and/or services including, but not limited to parking meters, toll booths, laundromat washers and dryers, arcade games, kiosks, photo booths, toll booths, transit ticket dispensing machines, and other known or yet to be discovered payment accepting units.

In using a payment accepting unit, a user will (1) approach the payment accepting unit, (2) determine from the face of the payment accepting unit the product (or service) he/she desires, (3) insert payment (e.g., coins, bills, or payment cards), and (4) input his/her selection into the payment accepting unit using a user interface (e.g., a series of buttons, a key pad, touch screen, or other input mechanism using, for example, the column and row at which a product is located). Based on the user's inputted selection, technology within the payment accepting unit provides the desired product (or service) to the user.

As the number of people with Internet-connected mobile devices proliferates, so does the variety of uses for such devices. Mobile payment is a logical extension. There is a large development effort around bringing mobile payment to the retail sector in an effort to not only provide options to the user, but also increased convenience.

SUMMARY

Disclosed herein is a payment processing system or, more specifically, a mobile-device-to-machine payment processing system over a non-persistent network connection with hands-free and manual (sometimes also herein called "swipe" or "swipe-to-pay" mode) modes.

In some implementations, a method of payment processing is performed at a device (e.g., the mobile device 150, FIGS. 5 and 21) with one or more processors, memory, and two or more communication capabilities. The method includes obtaining, from a payment module (e.g., the adapter module 100, FIGS. 5 and 20), advertised information via a first communication capability (e.g., a short-range communication technology/protocol such as BLE), where the advertised information at least includes an authorization code. The method includes sending, to a server (e.g., the server 130, FIGS. 5 and 22), at least the authorization code from the advertised information via a second communication capability distinct from the first communication capability (e.g., a long-range communication technology/protocol such as GSM, CDMA, or Wi-Fi). In response to sending at least the authorization code, the method includes obtaining, from the server, authorization information via the second communication capability, where the authorization information at least includes an authorization grant token. After obtaining the authorization information, the method includes detecting a trigger condition to perform a first transaction with a payment accepting unit (e.g., the payment accepting unit 120 (sometimes also herein called "machine 120") (FIGS. 5 and 19) such as a vending machine or kiosk for dispensing goods and/or services) associated with the payment module. In response to detecting the trigger condition, the method includes sending, to the payment module, the authorization grant token via the first communication capability.

In some implementations, a method of transmitting machine status information is performed at a device (e.g., the mobile device 150, FIGS. 5 and 21) with one or more processors, memory, and two or more communication capabilities. The method includes obtaining, from a payment module (e.g., the adapter module 100, FIGS. 5 and 20), advertised information via a first communication capability (e.g., the short-range communication technology/protocol such as BLE), where the advertised information at least includes status information indicating one or more states of at least one of a payment module and a payment accepting unit associated with the payment module. The method includes sending, to a server (e.g., the server 130, FIGS. 5 and 22), at least the status information from the advertised information via a second communication capability distinct from the first communication capability (e.g., the long-range communication technology/protocol such as GSM, CDMA, or Wi-Fi).

In some implementations, a method of payment processing acknowledgment information is performed at a payment module (e.g., the adapter module 100, FIGS. 5 and 20) coupled with a payment accepting unit (e.g., the payment accepting unit 120 (sometimes also herein called "machine 120") (FIGS. 5 and 19) such as a vending machine or kiosk for dispensing goods and/or services), the payment module including one or more processors, memory, and one or more first communication capabilities. The method includes obtaining, from the payment accepting unit, a first notification indicating completion of a first transaction performed by a first user of a first mobile device (e.g., the mobile device 150, FIGS. 5 and 21) at the payment accepting unit and an amount of the first transaction. In response to receiving the notification, the method includes: generating first transaction information based at least in part on the first notification: storing the generated first transaction information; and sending the generated first transaction information to the first mobile device via one of the one or more first communication capabilities (e.g., the short-range communication technology/protocol such as BLE). After sending the first transaction information to the first mobile device, the method includes: deleting the stored first transaction information generated for the first transaction performed by the first user of the first mobile device in accordance with a determination that first acknowledgement information has been received from the first mobile device within a predetermined time period; and maintaining the stored first transaction information generated for the first transaction performed by the first user of the first mobile device in accordance with a determination that the first acknowledgement information has not been received from the first mobile device within the predetermined time period.

In some implementations, a method of updating firmware is performed at a first device (e.g., the mobile device 150, FIGS. 5 and 21) with one or more processors, memory, and two or more communication capabilities. The method includes obtaining, from a payment module (e.g., the adapter module 100, FIGS. 5 and 20), advertised information via a first communication capability (e.g., the short-range communication technology/protocol such as BLE), where the advertised information at least includes a current firmware version of the payment module. In accordance with a determination that the current firmware version of the payment module satisfies one or more predefined firmware criteria (i.e., indicating that the payment module's firmware needs updating), the method includes sending, to the payment module, firmware update information via the first communication capability, where the firmware update information includes one or more data packets for updating the current firmware version of the payment module.

In some implementations, a device (e.g., the adapter module 100 (FIGS. 5 and 20), the mobile device 150 (FIGS. 5 and 21), the server 130 (FIGS. 5 and 22), or a combination thereof) includes one or more processors and memory storing one or more programs for execution by the one or more processors, the one or more programs include instructions for performing, or controlling performance of, the operations of any of the methods described herein. In some implementations, a non-transitory computer readable storage medium storing one or more programs, the one or more programs comprising instructions, which, when executed by a device (e.g., the adapter module 100 (FIG. 20), the mobile device 150 (FIG. 21), the server 130 (FIG. 22), or a combination thereof) with one or more processors, cause the computer system to perform, or control performance of, the operations of any of the methods described herein. In some implementations, a device (e.g., the adapter module 100 (FIG. 20), the mobile device 150 (FIG. 21), the server 130 (FIG. 22), or a combination thereof) includes means for performing, or controlling performance of, the operations of any of the methods described herein.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE DRAWINGS

FIG. 3 is a table that illustrates the hands-free credit or alert user principle in accordance with some implementations.

FIG. 4 is a flow chart showing the logging received signal strength indicator (RSSI) information in accordance with some implementations.

FIG. 14 is a side view of the in-line dongle adapter module of FIG. 11 in accordance with some implementations.

FIG. 15 is a first end view of a connector receptacle of the in-line dongle adapter module of FIG. 11 in accordance with some implementations.

FIG. 16 is a second end view of a connector receptacle of the in-line dongle adapter module of FIG. 11 in accordance with some implementations.

FIG. 17 is a perspective view taken from the first end of the in-line dongle adapter module of FIG. 11, the connectors and cables between which the in-line dongle adapter module is inserted being shown in broken lines for illustrative purposes in accordance with some implementations.

FIGS. 29A-29C illustrate a flowchart diagram of a method of payment processing acknowledgment in accordance with some implementations.

FIGS. 30A-30D illustrate a flowchart diagram of a method of updating firmware in accordance with some implementations.

Like reference numerals refer to corresponding parts throughout the several views of the drawings.

DETAILED DESCRIPTION OF THE INVENTION

Figure 2:
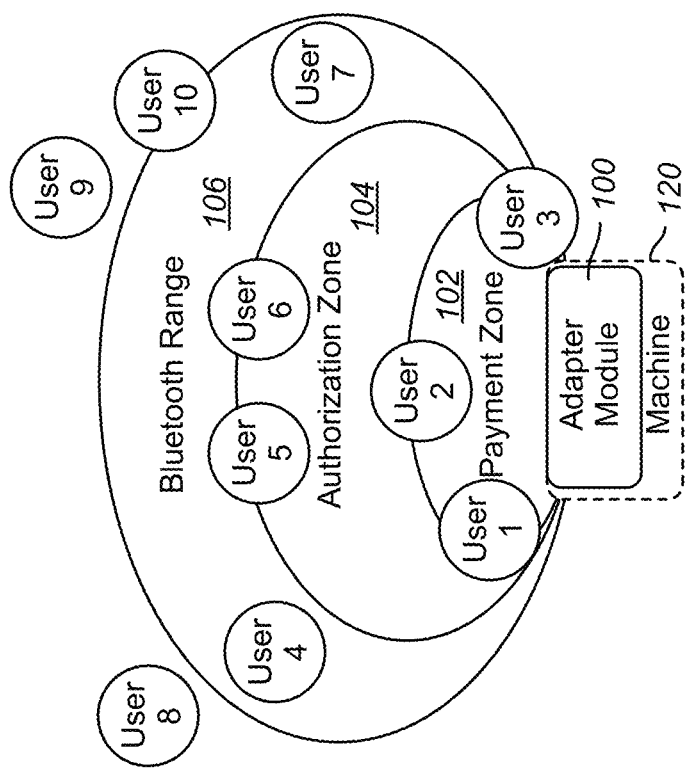
FIG. 2 is a schematic diagram that shows the three zones of FIG. 1 with multiple users therein in accordance with some implementations.

Disclosed herein is a payment processing system or, more specifically, a mobile-device-to-machine payment processing system for processing transactions over a non-persistent network connection. The mobile-device-to-machine payment processing system disclosed herein focuses on the unattended retail space (e.g., a payment accepting unit 120, sometimes also herein called a "machine 120"). More specifically, the mobile-device-to-machine payment processing system disclosed herein allows a user (having a mobile device 150 with a mobile application 140 thereon) to make a cashless purchase from a payment accepting unit 120 (having an adapter module 100 associated therewith).

The mobile-device-to-machine payment processing system described herein can be implemented with one or more of the following features: easy installation feature, a non-persistent network connection feature: a manual (swipe to pay) mode feature: a hands-free mode feature; and a multiple vending transactions (multi-vend) feature.

Easy Installation: Installation is very easy, requires no tools, requires no configuration, and takes as little as 30 seconds. This is accomplished by using an adapter module 100 (sometimes also herein called "payment module 100") such as an in-line dongle (a hardware device with software thereon) design for in-line insertion within a multi-drop bus (MDB) of a payment accepting unit 120 (e.g., a vending machine) (sometimes also herein called "the machine 120"). Installation is as simple as "powering down" (turning off) the machine 120, identifying the "wire" that connects with a payment receiving mechanism (e.g., the coin mechanism), disconnecting the wire (so that there are two loose ends, such as a male connection end or adapter of an MDB and a female connection end or adapter of an MDB), plugging (inserting) the adapter module 100 in serial ("in-line") with the wire (e.g., connecting the MDB female adapter to a male adapter of the adapter module 100 and connecting the MDB male adapter to a female adapter of the adapter module 100), tucking the wire and the installed adapter module 100 back into position, and "powering up" (turning on) the machine 120. Most vending machines made since 1995 have this industry standard MDB technology that would allow this easy 30-second installation. On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Non-persistent Network Connection: Although payment accepting units (or "machines") that accept only cash (e.g., paper currency and coins) may not require a connection (persistent or non-persistent) to a network, traditional payment accepting units that accept cashless payments (e.g., credit cards, debit cards, and alternative mobile device payment methods using, for example, smart phones) require a persistent connection to a network (wired or wireless) to facilitate the cashless payments. In other words, without a persistent (ongoing or accessible on demand) network connection, traditional payment accepting units cannot accept cashless payments. Most traditional payment accepting units that accept cashless payments include the technology to accomplish this persistent network connection that allows them to connect to a remote server. If the network connection to a traditional machine is temporarily interrupted, cashless payments will be temporarily unavailable. If the machine is located in a location where no network connection is available, cashless payments is not possible. In addition to using a mobile device 150 as an intermediary between the payment accepting units 120 and the server 130, the mobile-device-to-machine payment processing system described herein minimizes (i.e., the manual mode) or eliminates (i.e., the hands-free mode) user interaction with the mobile device 150. Further, in some implementations, the mobile-device-to-machine payment processing system described herein facilitates the acceptance of cashless payments without requiring any network connection near the payment accepting unit 120. In some implementations, when the mobile-device-to-machine payment processing system described herein is located in a remote location where network connection is unavailable, the mobile-device-to-machine payment processing system, therefore, can still accept cashless payments.

Manual (Swipe-to-Pay) Mode: Using a "swipe-to-pay" feature (or just "swipe") refers to a user's action implemented on his/her mobile device 150 where he/she quickly brushes his/her finger (or other pre-determined interaction) on the mobile device's touch screen 152 (FIGS. 10A-10D) or other input devices associated with the mobile device 150. From the user's perspective, when the user is within range, a pre-installed mobile application 140 automatically connects to the payment accepting unit 120 (e.g., a vending machine). The mobile application 140 might display (on the touch screen 152) a prepaid balance that the user "swipes" to transfer payment to the payment accepting unit 120. The user could observe the transferred funds on the touch screen 152 of the mobile device 150 and/or on the display 122, 124 (FIG. 19) of the payment accepting unit 120. The transaction is completed just as if cash was inserted in the machine 120 with the user inputting his selection on the payment accepting unit 120 and the payment accepting unit 120 dispensing the product or service. After the selection is made, the change is returned to the mobile device 150 and this may be shown on the touch screen 152 of the mobile device 150.

Hands-Free Mode: A "hands-free pay" feature (or just "hands-free") would most likely be used with "favorite" payment accepting units 120 (e.g., a frequently used vending machine at a user's work or school). From the user's perspective, he/she would approach the favorite payment accepting unit 120 and notice that the display 122, 124 (FIG. 19) of the payment accepting unit 120 shows funds available, he/she would select the product or service using the payment accepting unit's input mechanisms (e.g., buttons 126 or a touch screen display 124 shown in FIG. 19), and he/she would retrieve dispensed services or products. It would be that simple. More specifically, when the user is within range, a pre-installed mobile application 140 automatically connects to the payment accepting unit 120 (e.g., a vending machine). The user may leave the mobile device 150 in a pocket, purse, briefcase, backpack, or other carrier. As the user approaches the payment accepting unit 120 and is in approximately "arm's-length" distance (e.g., 3 to 5 feet) of the payment accepting unit 120, the user could observe the transferred funds on the display 122, 124 (FIG. 19) of the payment accepting unit 120. The transaction is completed just as if cash was inserted into the payment accepting unit 120 with the user inputting his/her selection on the payment accepting unit 120 and the payment accepting unit 120 dispensing the product or service. After the selection is made, the change is returned to the mobile device 150. FIG. 3 details when the hands-free mode would be available.

Multiple Vending Transactions (Multi-Vend): Both the manual and hands-free modes could be used multiple times in sequence (implemented, for example, as a loop) so that a user may make multiple purchases. After making his/her first selection and receiving his product (or service), the user would observe that additional funds were available on the display 122, 124 (FIG. 19) on the payment accepting unit 120. He/she could make another selection (or multiple selections) and receive additional product(s) (or service(s)). More specifically, the display 122, 124 (FIG. 19) may reset as if the transaction is complete, but then, because the user is still standing in range, the mobile application 140 would send another credit to the payment accepting unit 120, allowing for a second purchase. When the user walks away, the system clears (e.g., returns unused funds to the application 140 on the mobile device 150).

The features described above, alone or in combination with other features described herein will revolutionize the hundred billion dollar automated retail industry. The hardware is very low cost and there are no reoccurring fees because no cellular connection is required on the machine 120. Using the mobile-device-to-machine payment processing system described herein, operators of machines 120 can increase frequency of visits by purchasers and items sold with each visit.

The mobile-device-to-machine payment processing system described herein may be implemented as an apparatus, system, and/or method for enabling payments to a machine 120 via a mobile device 150. The mobile-device-to-machine payment processing system may be better understood with reference to the drawings, but the shown mobile-device-to-machine payment processing system is not intended to be of a limiting nature.

Definitions

Before describing the mobile-device-to-machine payment processing system and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Figure 1:
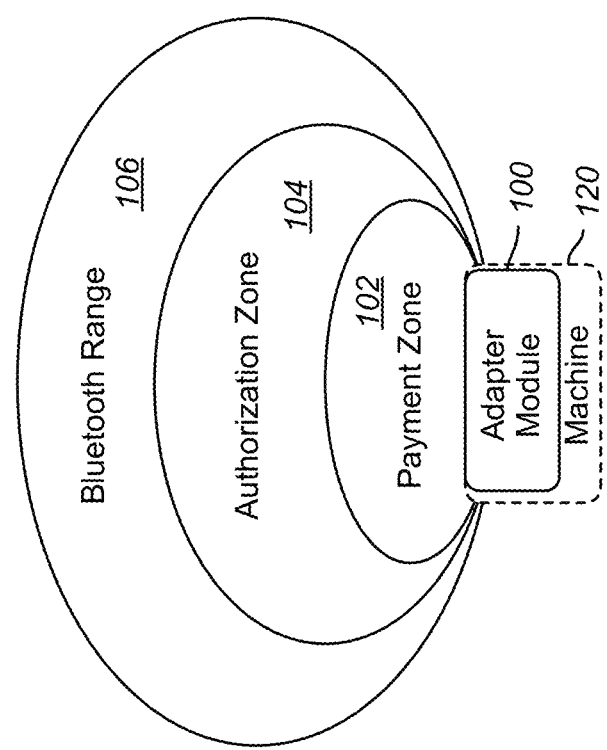
FIG. 1 is a schematic diagram that shows three zones: a "communication zone" (e.g., Bluetooth range), an "authorization zone," and a "payment zone" in accordance with some implementations.
Figure 20:
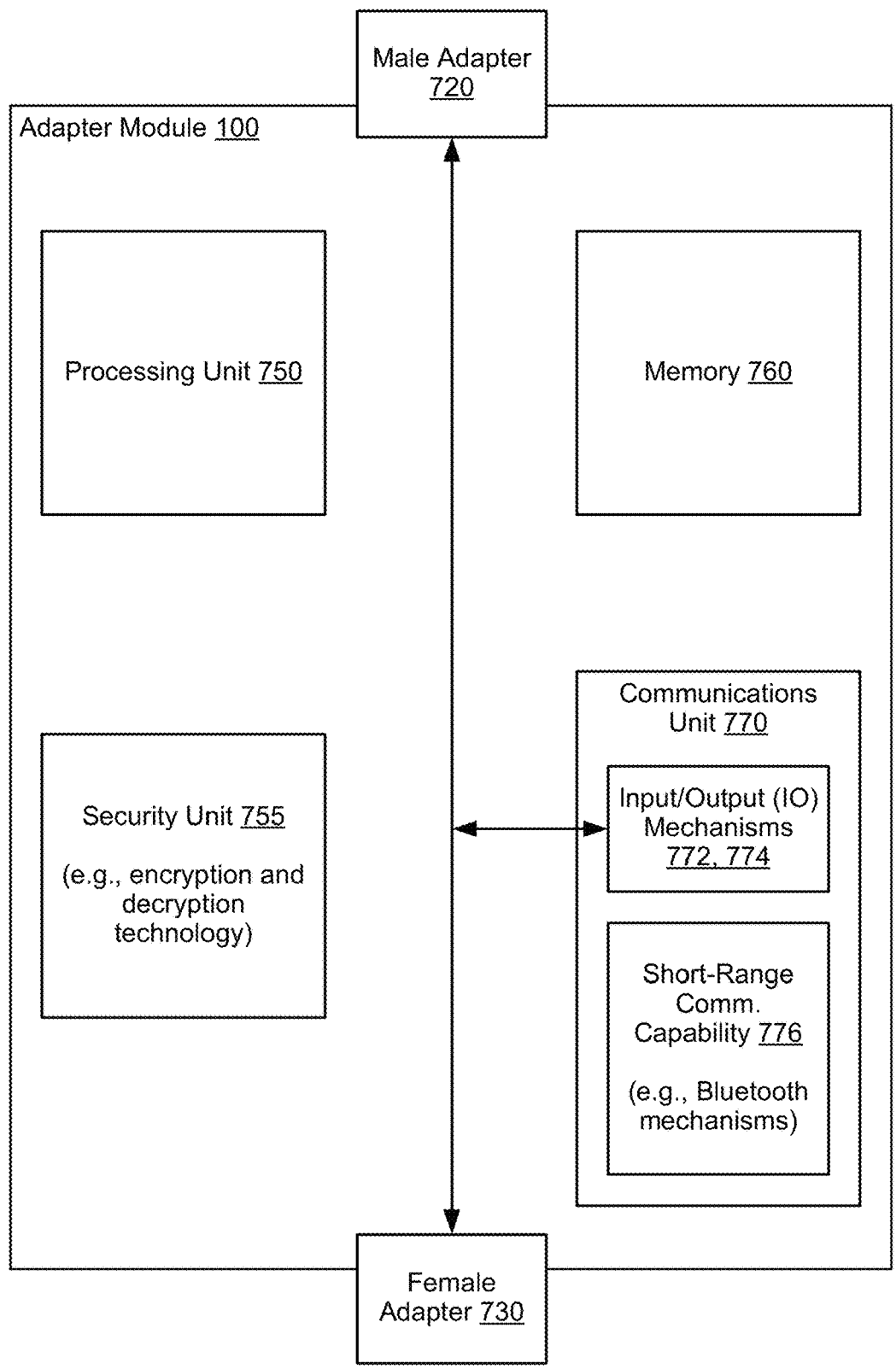
FIG. 20 is a block diagram of an adapter module in accordance with some implementations.

Adapter Module 100: As shown in FIGS. 1 and 2, the adapter module 100 (sometimes also herein called the "payment module 100") is a physical device that is installed in a machine 120 (a payment accepting unit 120). The shown adapter module 100 is an in-line dongle (a hardware device with software thereon) device that may be inserted in-line within a multi-drop bus (MDB) of a machine 120. The adapter module 100 bridges the communication between the machine 120 and a mobile device 150. Although described as a unique component, it should be noted that the adapter module 100 could be implemented as a plurality of devices or integrated into other devices (e.g., components of a machine 120). In its unique component form, the adapter module 100 can be easily inserted into a machine 120 so that the machine 120 is able to perform new features with the assistance of the adapter module 100. FIG. 20 shows components associated with the adapter module 100. As shown in FIG. 20, the communications unit 770 of the adapter module 100 includes short-range communication capability 776 (e.g., Bluetooth mechanisms). The shown example may be divided into multiple distinct components that are associated with each other or the example may be incorporated into or drawn from other technology (e.g., a computer or a payment accepting unit) as long as the components are associated with each other.

Figure 21:
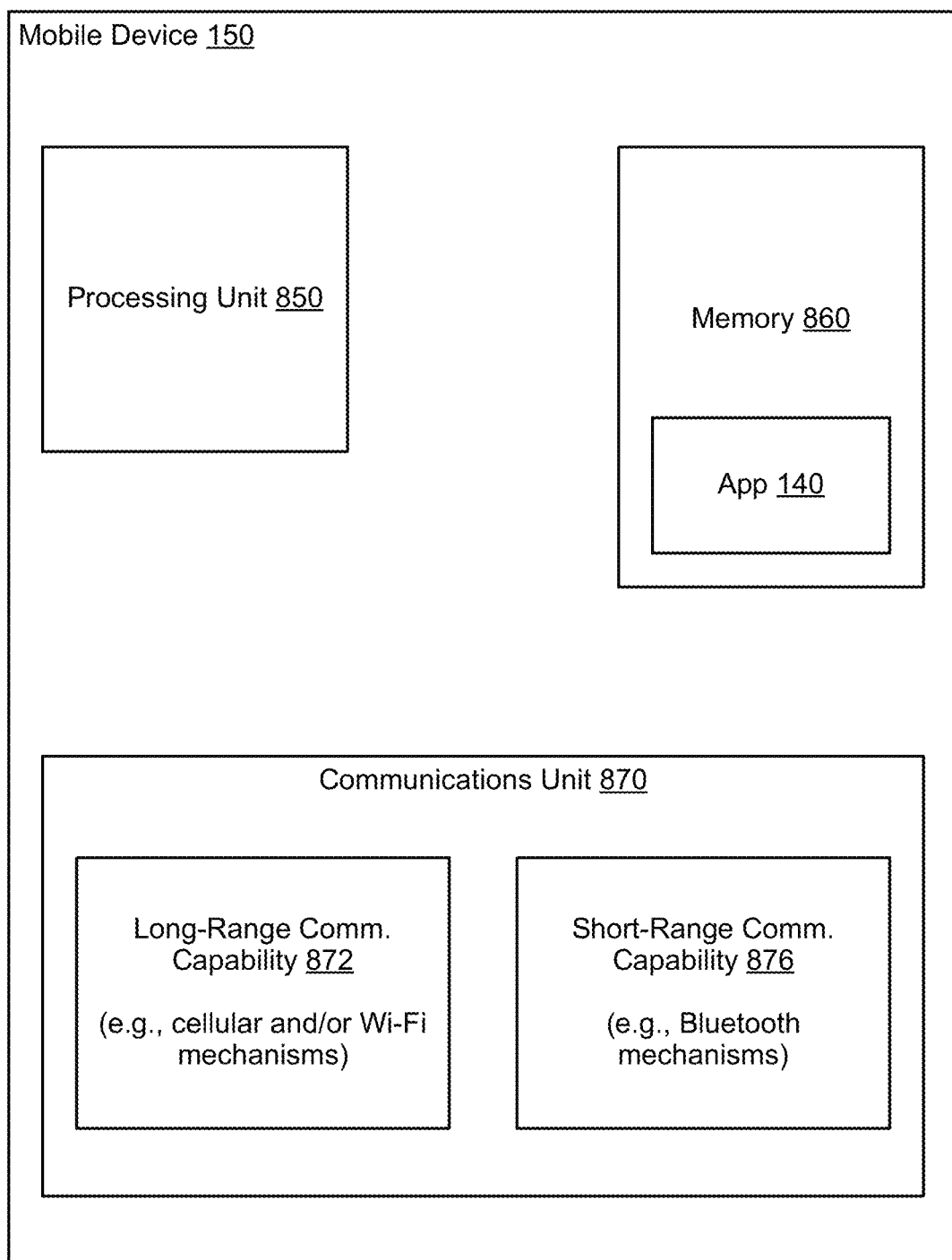
FIG. 21 is a block diagram of a mobile device in accordance with some implementations.

Mobile Device 150 and Application 140 (also referred to as a "mobile application," "mobile app," or "app"): In general, a mobile device 150 may be a user's personal mobile device 150. The mobile device 150 (with a mobile application 140 thereon) acts as a communication bridge between the adapter module 100 (associated with a payment accepting unit 120) and the server 130. The mobile device 150 and the application 140, however, are not "trusted" in that the communications (transmissions) it passes are encrypted. Encrypted (secured) communications are undecipherable (unencryptable, unreadable, and/or unuseable) by the mobile device 150. This keeps the communications passed between the adapter module 100 and the server 130 secured and safe from hacking. Mobile devices include, but are not limited to smart phones, tablet or laptop computers, or personal digital assistants (PDAs), smart cards, or other technology (e.g., a hardware-software combination) known or yet to be discovered that has structure and/or capabilities similar to the mobile devices described herein. The mobile device 150 preferably has an application (e.g., the application 140) running on it. The term "app" is used broadly to include any software program(s) capable of implementing the features described herein. FIGS. 10A-10D show user interfaces for the application 140 displayed by the mobile device 150. It should be noted that the phrase "mobile device" can be assumed to include the relevant app unless specifically stated otherwise. Similarly, it should be noted that an "app" can be assumed to be running on an associated mobile device unless specifically stated otherwise. FIG. 21 shows components associated with the mobile device 150. The shown example may be divided into multiple distinct components that are associated with each other or the example may be incorporated into or drawn from other technology (e.g., the cell phone itself) as long as the components are associated with each other.

Payment Accepting Unit 120 (or Machine 120): A payment accepting unit 120 (or the machine 120) is equipment that requires payment for the dispensing of an product and/or service. Payment accepting units 120 may be vending machines, parking meters, toll booths, laundromat washers and dryers, arcade games, kiosks, photo booths, toll booths, transit ticket dispensing machines, and other known or yet to be discovered payment accepting units 120. Some payment accepting units 120 can accept cashless payments (payments other than cash (paper currency and coins)) by accepting payment from, for example, credit cards, debit cards, and mobile devices.

Network Connections: For purposes of this discussion, a persistent network connection is a wired or wireless communications connection that is ongoing (e.g., a dedicated connection, a dedicated online connection, and/or a hardwired connection) or accessible on demand (e.g., the ability for the machine to make a temporary connection to a server or the ability for the user to contact a server from his mobile device). Typically the persistent network connection has been conducted over "long-range communication technology" or "long-range communication protocol" (e.g., hard-wired, telephone network technology, cellular technology (e.g., GSM, CDMA, or the like), Wi-Fi technology, wide area network (WAN), local area network (LAN), or any wired or wireless communication technology over the Internet that is known or yet to be discovered). Traditionally, machines that accept payment other than cash require a persistent (ongoing or accessible on demand) connection to a network to facilitate payment. This is true for machines that accept, for example, credit cards and debit cards. The payment accepting units 120 described herein do not require a traditional persistent network connection. The user's mobile device 150 acts as a communication bridge between the adapter module 100 and the server 130. Communications between user mobile devices 150 and the servers (e.g., a system management server 130) and/or a funding source server 160) take place using long-range communication technology. Communications between user mobile devices 150 and the adapter module 100 of the payment accepting unit 120 take place using "short-range communication technology" or "short-range communication protocol" (e.g., Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, or any wired or wireless technology that could be used to communicate a small distance (approximately a hundred feet or closer) that is known or yet to be discovered). Therefore, neither the adapter module 100 nor the payment accepting unit 120 requires a traditional persistent long-range wireless network connection. The communications technology shown in the figures may be replaced with alternative like communications technology and, therefore, specific shown communications technologies are not meant to be limiting. For example, Wi-Fi technology could be replaced with another long-range communication technology.

Figure 22:
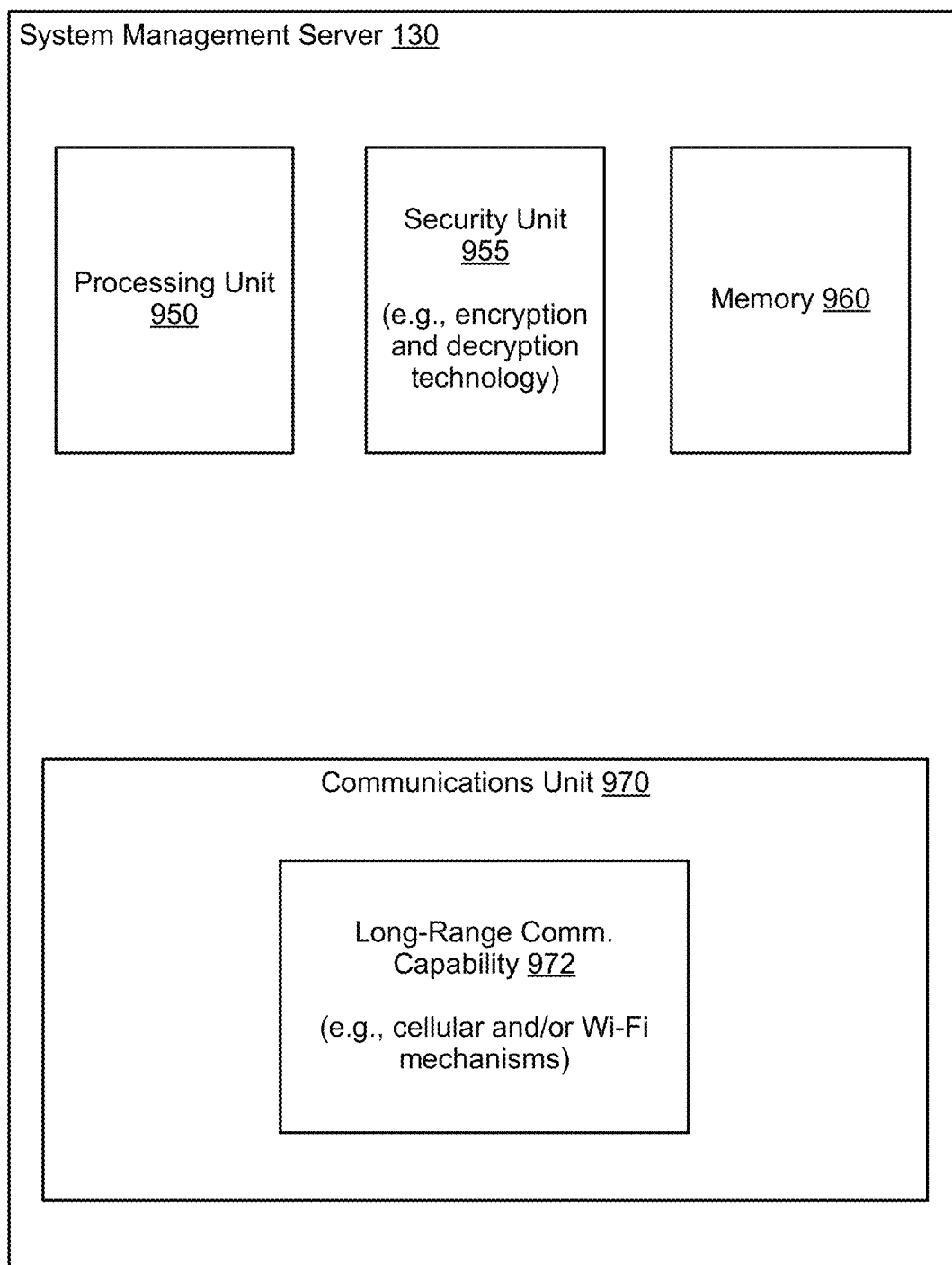
FIG. 22 is a block diagram of a server in accordance with some implementations.

Server: A server is the host processing server that may be operated by the company running the payment processing system. For each user, the server 130 preferably maintains at least one "virtual wallet" having at least one "balance" (which can be $0) of designated funds for which the server 130 keeps an accounting. The balance may represent, for example, "cash" or it may be a "promotional value" that represents funds that may be spent under certain circumstances. If these funds begin to be depleted, the user may be notified (e.g., via the application 140 on the mobile device 150) that additional funds need to be designated and/or transferred. Alternatively, funds from other sources (e.g., the funding source server 160) may be automatically transferred to restore a predetermined balance. The balance may also be increased based on a promotion (e.g., points earned or coupons). As shown in FIG. 22, the server includes appropriate processors 950, memory 960 (which would keep an accounting of the user's balance in a manner similar to a gift card), and communication systems 970. As shown in FIG. 22, the communications unit 970 of the server 130 includes long-range communication capability 972 (e.g., cellular technology and/or Wi-Fi mechanisms). The server 130 also includes a security unit 955 for encrypting and decrypting messages. The server 130 receives an authorization request (sometimes also herein called an "AuthRequest") from the adapter module 100 (via a mobile device 150) and, if funds are available, returns an authorization grant (sometimes also herein called an "AuthGrant" or an "authorization grant token") for funds. FIG. 22 shows components associated with the server 130. The shown example may be divided into multiple distinct components that are associated with each other or the example may be incorporated into or drawn from other technology (e.g., a computer or a main frame) as long as the components are associated with each other.

Advertise Presence: Each adapter module 100 advertises its presence by broadcasting signals (advertising broadcast signals) to mobile devices in the zones 102, 104, 106. Each adapter module 100 can listen to other adapter modules' advertisements.

Received Signal Strength Indicator (RSSI): The adapter module 100 may have a self-calibrating signal strength to determine zone thresholds (e.g., a payment zone threshold and an authentication zone threshold). At the time the user selects an item (product or service) from the payment accepting unit 120, the Received Signal Strength Indicator (RSSI) is logged. At this moment, it is presumed the user is within "arm's-length" (which may be a predetermined length approximating the distance of a user standing in front of a machine for the purpose of making a purchase) from the payment accepting unit 120. A mathematical computation (i.e., In-Range Heuristics) is conducted to derive the optimal RSSI threshold at which point payment should be triggered by an application 140 on a mobile device 150. The threshold may be payment accepting unit specific and can vary over a period of time. This optimal zone threshold is preferably reported to the mobile device 150 during an initial handshake.

In-Range Heuristics: A mathematical computation that determines the RSSI threshold to determine when a user is in the authorization zone 104 and/or the payment zone 102. This computation can take into consideration numerous historical data points as well as transaction specific information such as which the mobile device 150 is being used, payment accepting unit type, among other factors. Preferably the RSSI is logged while the user is making his selection (this is the one time in the entire process that the user definitely will be "in range" (e.g., they will be arm's length from the machine 120 because they are physically interacting with the machine 120). The type of user mobile device 150, accelerometer data (e.g., is the user moving or stationary), and/or other information may also be logged while the user is making his selection. The adapter module 100 can give a reference RSSI for the payment zone 102 for the machine 120, and the application 140 can make a +/− adjustment based on the specific mobile device 150 on which it is installed. Over a period of time, the payment processing system continues to improve itself based on additional data points.

Authorization Request ("AuthRequest:): When a user enters the authorization zone 104, the mobile device 150 notifies the adapter module 100 and the adapter module 100 sends a secured authorization request (e.g., the encrypted authorization request) as a "message" (also referred to as a communication or transmissions) to the server 130 via the mobile device 150. Encryption may be performed by a security unit 755 (FIG. 20) with security technology (e.g., encryption and decryption means) that may be associated with the processing unit 750 and/or the memory 760. Significantly, the AuthRequest is a request for authorization of funds, not a request for authorization of a transaction. The purpose of the funds is irrelevant to the server 130.

Authorization Grant Token ("AuthGrant"): This is a "message" (also referred to as a communication or transmissions) encrypted by the security unit 955 (FIG. 22) with security technology (e.g., encryption and decryption means) of the server 130 with the unique private key corresponding to the adapter module 100. The secured authorization grant (e.g., the encrypted authorization grant) is passed from the server 130 to the adapter module 100 via the mobile device 150 in the form of a message. The mobile device 150, however, is not able to decrypt and/or read the message. The authorization grant is in response to the authorization request. The amount of the funds granted by the AuthGrant may be determined by factors including, but not limited to, the amount of funds available (or, if funds are not available, a mini-loan could be granted), a pre-authorized amount (e.g., set by the server, set by the user during set-up, set by the funding source, or a standard amount), limited by time (e.g., only a certain amount per hour, or a predetermined amount at specific times of the day), limited to the maximum amount of an item on the machine (or enough for two or three items in the machine), or one or more of these and other factors. Significantly, the AuthGrant makes the funds available, but does not authorize a transaction. The AuthGrant may have an associated expiration period in that it may expire if it is not used in a pre-determined time period. The length of time before the AuthGrant expires may be determined by factors including, but not limited to, the trustworthiness of the user (e.g., the user has a long history with the payment processing system or some known provider (e.g., credit card provider, bank, or credit union), the user has a good credit rating, or the user has a large wallet balance), a pre-authorized time period (e.g., set by the server, set by the user during set-up, set by the funding source, or a standard time period), limited by time (e.g., predetermined time periods at specific times of the day such as longer times during breakfast, lunch, and dinner), limited by the machine or the products or services sold in the machine, limited by the number of other users near the machine (e.g., if it is a crowded machine, the AuthGrant may expire faster), or one or more of these and other factors. The AuthGrant remains valid until it expires or some other event occurs to end its validity (e.g., the user cancels it). This means that under normal circumstances the mobile device 150 will hold the AuthGrant authorizing use of funds for a pre-determined time period that will allow the user sufficient time to make a purchase. The authorized amount may be considered to be the "wallet balance" that is held in a virtual "wallet."

Synchronization: Time may be synchronized to the adapter module 100 from the server 130. The server 130 sends time information with encrypted messages and the adapter module 100 uses the time encoded in the messages for synchronization.

The mobile-device-to-machine payment processing system and components thereof may have associated hardware, software, and/or firmware (a variation, subset, or hybrid of hardware and/or software). The term "hardware" includes at least one "processing unit." "processor," "computer," "programmable apparatus," and/or other known or yet to be discovered technology capable of executing instructions or steps (shown as the processing unit 750 in FIG. 20, the processing unit 850 in FIG. 21, and the processing unit 950 in FIG. 22). The term "software" includes at least one "program." "subprogram." "series of instructions," or other known or yet to be discovered hardware instructions or hardware-readable program code. Software may be loaded onto hardware (or firmware) to produce a "machine," such that the software executes on the hardware to create structures for implementing the functions described herein. Further, the software may be loaded onto the hardware (or firmware) so as to direct the mobile-device-to-machine payment processing system (and components thereof) to function in a particular manner described herein or to perform a series of operational steps as described herein. "Hardware" such as the adapter module 100, the mobile device 150, and the payment accepting unit 120 may have software (e.g., programs and apps) loaded thereon. The phrase "loaded onto the hardware" also includes being loaded into memory (shown as the memory 760 in FIG. 20, the memory 860 in FIG. 21, and the memory 960 in FIG. 22) associated with or accessible by the hardware. The term "memory" is defined to include any type of hardware (or other technology)-readable media (also referred to as computer-readable storage medium) including, but not limited to, attached storage media (e.g., hard disk drives, network disk drives, servers), internal storage media (e.g., RAM, ROM, EPROM, FLASH-EPROM, or any other memory chip or cartridge), removable storage media (e.g., CDs, DVDs, flash drives, memory cards, floppy disks, flexible disks), firmware, and/or other known or yet to be discovered storage media. Depending on its purpose, the memory may be transitory and/or non-transitory. Appropriate "messages." "communications," "signals," and/or "transmissions" (that includes various types of information and/or instructions including, but not limited to, data, commands, bits, symbols, voltages, currents, electromagnetic waves, magnetic fields or particles, optical fields or particles, and/or any combination thereof) over appropriate "communication paths." "transmission paths," and other means for signal transmission including any type of connection between two elements on the payment processing system (e.g., the adapter module 100, the mobile device 150, the payment accepting unit 120, hardware systems and subsystems, and memory) would be used as appropriate to facilitate controls and communications.

It should be noted that the terms "programs" and "subprograms" are defined as a series of instructions that may be implemented as software (i.e. computer program instructions or computer-readable program code) that may be loaded onto a computer to produce a "machine," such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. Separate, albeit interacting, programs and subprograms may be associated with the adapter modules 100, the server 130, and the mobile device 150 (including the mobile application 140) and these programs and subprograms may be divided into smaller subprograms to perform specific functions.

The terms "messages," "communications," "signals," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "communications,"

"signals," and/or "transmissions" including, for example, transmitters, receivers, and transceivers. "Communications," "signals," and/or "transmissions" described herein would use appropriate technology for their intended purpose. For example, hard-wired communications (e.g., wired serial communications) would use technology appropriate for hard-wired communications, short-range communications (e.g., Bluetooth) would use technology appropriate for close communications, and long-range communications (e.g., GSM, CDMA, Wi-Fi, or the like) would use technology appropriate for remote communications over a distance. Appropriate security (e.g., SSL or TLS) for each type of communication is included herein. The security units 755 and 955 include technology for securing messages. The security technology may be, for example, encryption/decryption technology (e.g., software or hardware). Although encryption/decryption is discussed primarily as being performed using a unique private key, alternative strategies include, but are not limited to encryption/decryption performed using public/private keys (i.e., asymmetric cryptography), or other encryption/decryption strategies known or yet to be discovered. Appropriate input mechanisms and/or output mechanisms, even if not specifically described, are considered to be part of the technology described herein. The communications unit 770 (shown in FIG. 20) of the adapter module 100 is shown as including appropriate input and output mechanisms 772, 774 that may be implemented in association (e.g., directly or indirectly in functional communication) with male and female adapters 720, 730 of the adapter module 100. The communications unit 870 (shown in FIG. 21) of the mobile device 150 includes mechanisms for both long-range communications (shown as the long-range communication capability 872 such as cellular and/or Wi-Fi mechanisms) for communicating with the server 130 and short-range communications (shown as the short-range communication capability 876 such as Bluetooth mechanisms) for communicating with the adapter module 100.

When used in relation to "communications," "signals," and/or "transmissions," the terms "provide" and "providing" (and variations thereof) are meant to include standard means of provision including "transmit" and "transmitting," but can also be used for non-traditional provisions as long as the "communications," "signals," and/or "transmissions" are "received" (that can also mean obtained). The terms "transmit" and "transmitting" (and variations thereof) are meant to include standard means of transmission, but can also be used for non-traditional transmissions as long as the "communications," "signals," and/or "transmissions" are "sent." The terms "receive" and "receiving" (and variations thereof) are meant to include standard means of reception, but can also be used for non-traditional methods of obtaining as long as the "communications," "signals," and/or "transmissions" are "obtained."

Figure 19:
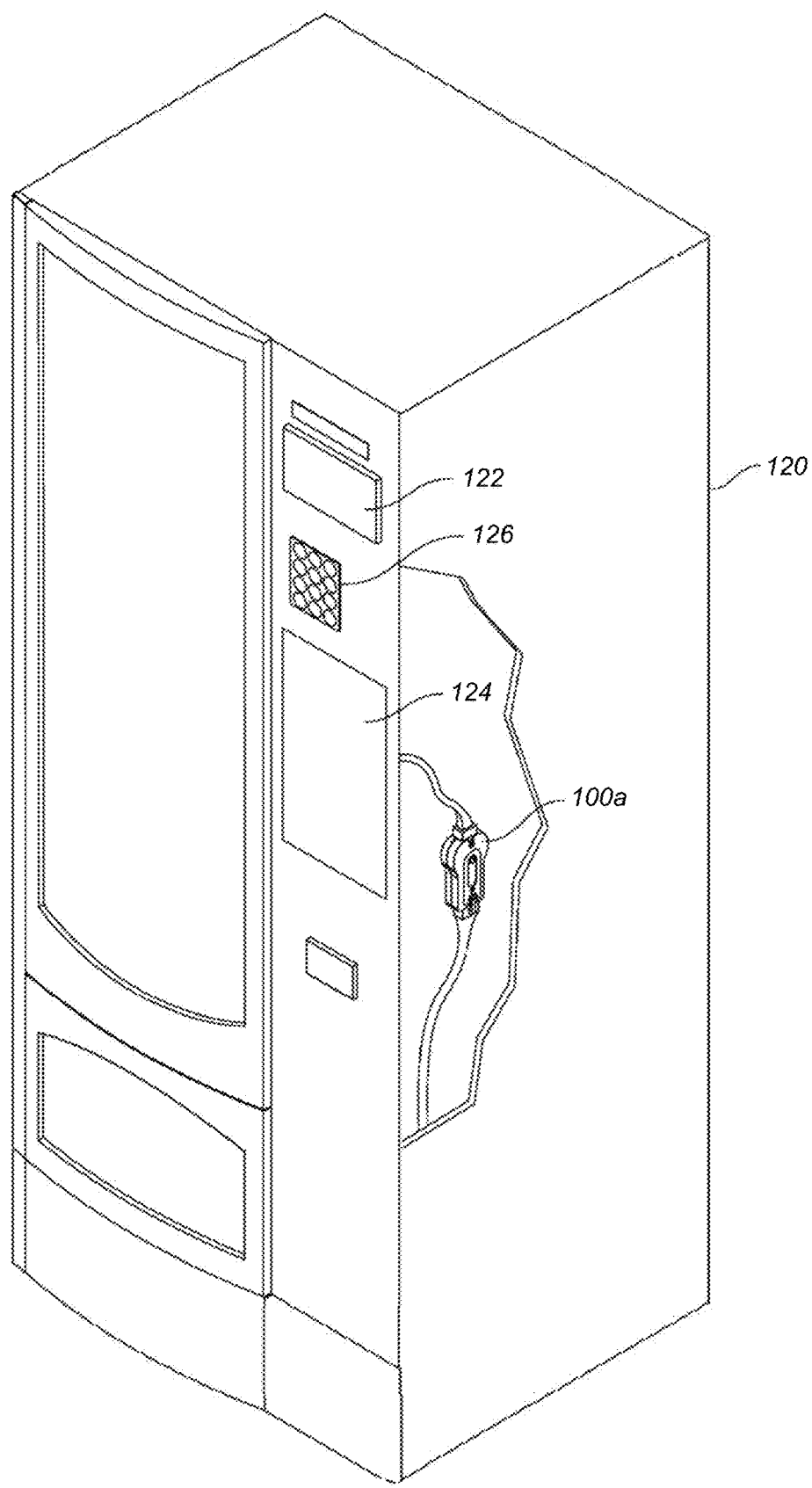
FIG. 19 is a perspective view of the in-line dongle adapter module of FIG. 11 within a vending machine in accordance with some implementations.

The term "associated" is defined to mean integral or original, retrofitted, attached, connected (including functionally connected), positioned near, and/or accessible by. For example, if the user interface (e.g., a traditional display 122 (FIG. 19), a touch screen display 124 (FIG. 19), a key pad 126 (FIG. 19), buttons 126 (FIG. 19, shown as part of the key pad 126), a keyboard (not shown), and/or other input or output mechanism) is associated with a payment accepting unit 120, the user interface may be original to the payment accepting unit 120, retrofitted into the payment accepting unit 120, attached to the payment accepting unit 120, and/or a nearby the payment accepting unit 120. Similarly, adapter modules 100 may be associated with payment accepting units 120 in that the adapter modules 100 may be original to the payment accepting unit 120, retrofitted into the payment accepting unit 120, attached to the payment accepting unit 120, and/or a nearby the payment accepting unit 120.

System Overview

Figure 5:
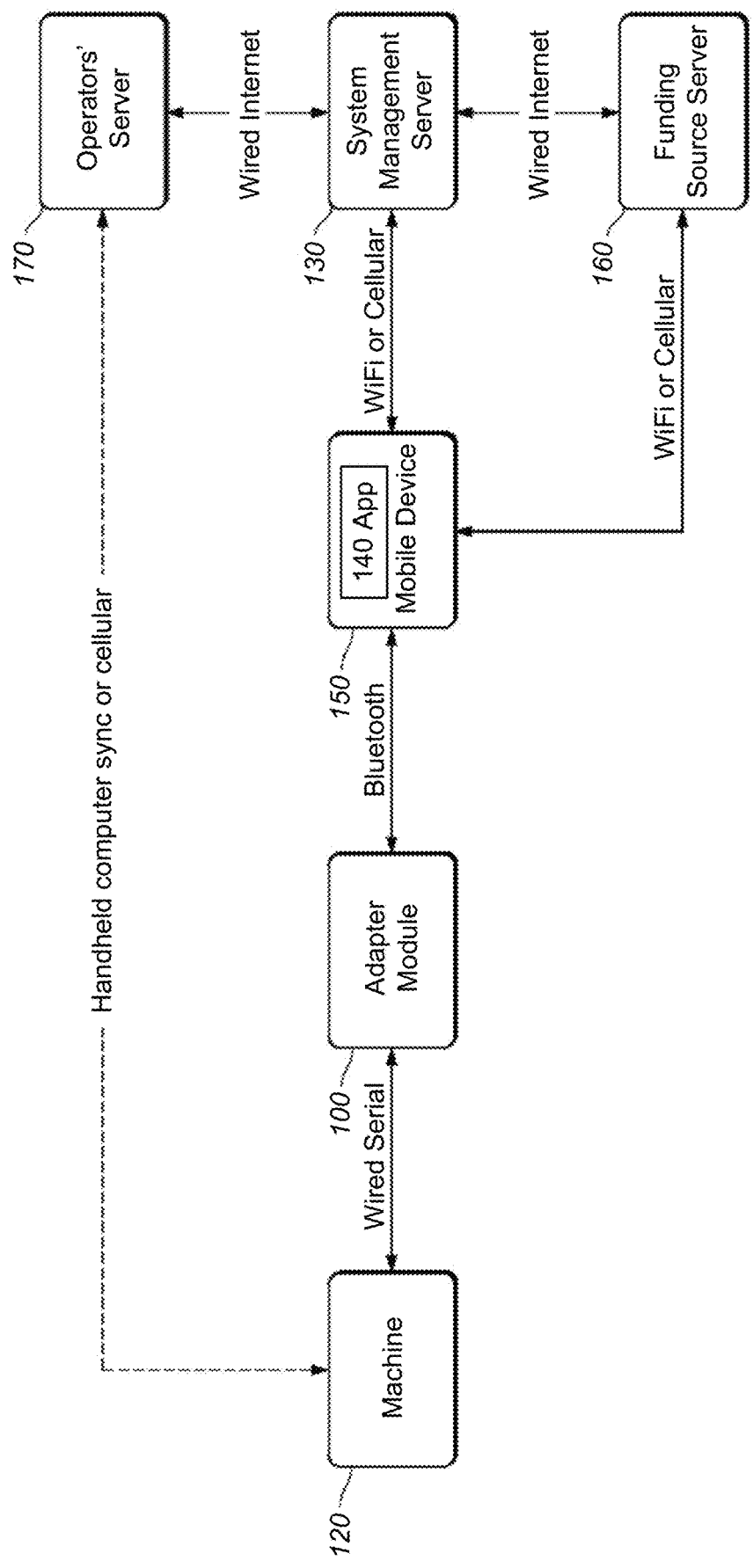
FIG. 5 is a block schematic that shows elements of the payment processing system including, but not limited to, the adapter module, the machine, the mobile device, and servers, as well as communications therebetween in accordance with some implementations.
Figure 6:
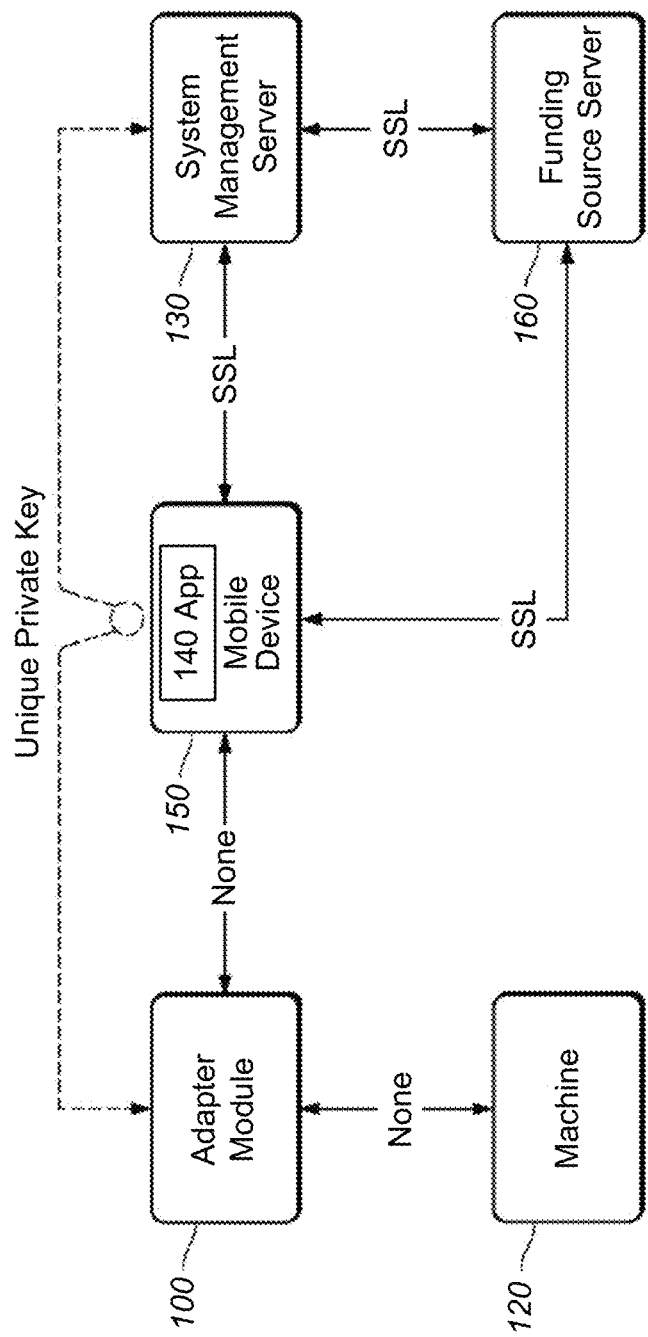
FIG. 6 is a block schematic that shows three areas of encryption used (each is bi-directional) between the adapter module, the machine, the mobile device, and/or servers in accordance with some implementations.
Figure 7:
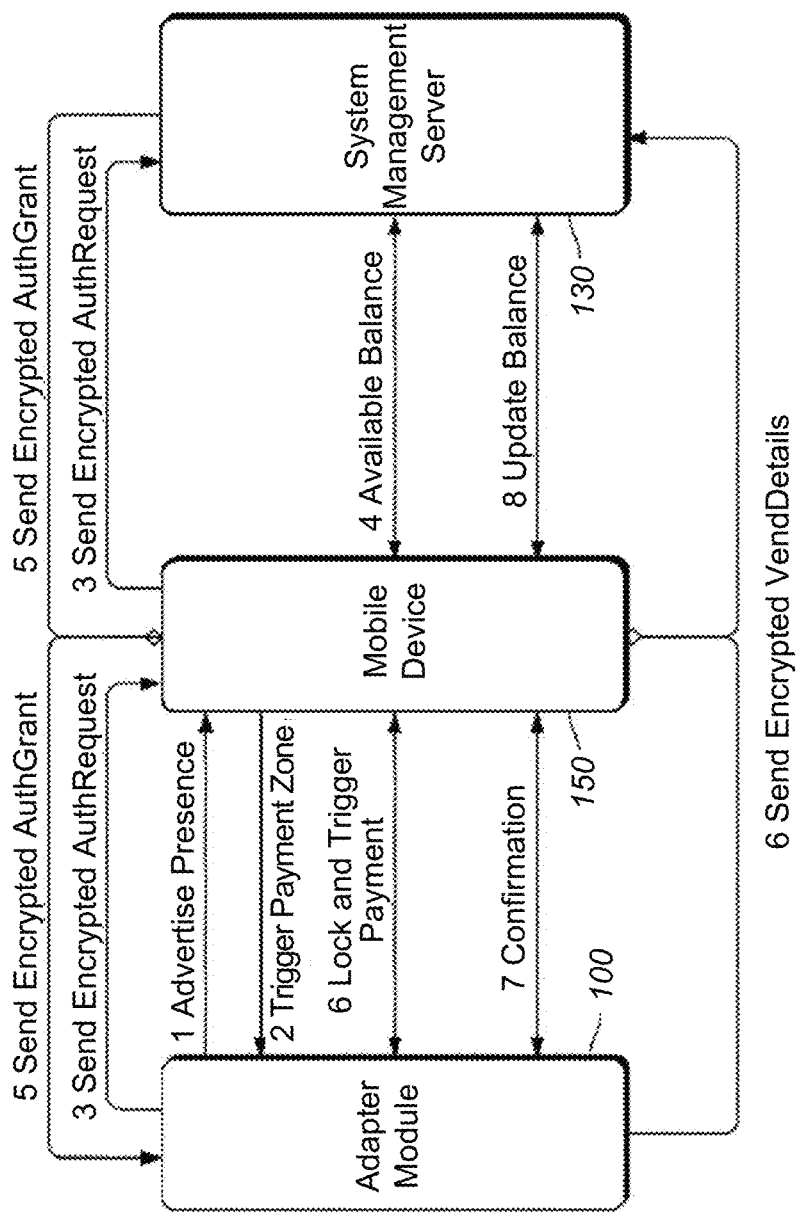
FIG. 7 is a block diagram that shows communications, messaging, vending sequence, and purchase flow between the adapter module, the mobile device, and a system management server in accordance with some implementations.

FIGS. 5, 6, and 7 together show major components of the mobile-device-to-machine payment system and the interactions there-between.

As shown, the adapter module 100 functionally connected bi-directionally to the payment accepting unit 120 via a wired serial connection such that no security is necessary. The adapter module 100 is also functionally connected bi-directionally to the mobile device 150 (and its installed mobile application 140) via short-range communication technology (e.g., a Bluetooth connection). Because the mobile device 150 is not a "trusted" link (e.g., it could be hacked by a user), only secured communications (transmissions) are passed between the adapter module 100 and the mobile device 150. This keeps communications secured and safe from hacking. The mobile device 150 (and its installed mobile application 140) is also functionally connected bi-directionally to a system management server 130 and/or a funding source server 160 via long-range communication technology (e.g., Wi-Fi or Cellular connection) that preferably has appropriate security (e.g., SSL security). Security between the mobile device 150 and the system management server 130 has the advantage of protecting communications from the mobile device 150 to the system management server 130 that may include sensitive data and may not be encrypted. The system management server 130 and the funding source server 160 may be connected via a wired Internet connection with SSL security. The system management server 130 may be connected via a wired Internet connection with SSL security to an operators' server 170. Although not necessary to implement a purchase transaction, for other purposes (e.g., inventory), the operators' server 170 may be connected to the payment accepting unit 120 using a handheld computer sync or a cellular connection.

Also, a unique private key may be used to securely transmit encrypted messages between the adapter module 100 and the system management server 130 (although the encrypted transmissions would most likely be routed through the mobile device 150). The server 130 stores a private key for each adapter module 100, and this key is only known to the adapter module 100 and the server 130. No intermediary is privy to this key (especially not the mobile device 150). When the adapter module 100 and the server 130 communicate messages (e.g., AuthRequest and AuthGrant), the security unit 755 of the adapter module 100 encrypts the message with its private key and passes the message to the mobile device 150. The mobile device 150 (which preferably cannot decrypt the message) passes the encrypted message to the server 130. The server 130 is able to decrypt the message using the security unit 955 of the adapter module 100 and the unique private key. The security unit 955 of the server 130 uses this same unique private key to encrypt messages to the adapter module 100 and sends the message to the mobile device 150 to relay to the adapter module 100 that is able to decrypt the message using the security unit 755 of the adapter module 100 and the unique private key.

FIG. 7 shows specific communications and messaging with a vending sequence (the numbers to the left of the communications and messaging) between the adapter module 100, the mobile device 150, and the system management server 130. These communications are discussed in more detail in the discussion pertaining to the schematic flow diagrams (FIGS. 8A-8G) and the flow charts (FIGS. 9A-9E).

It should be noted that FIGS. 5, 6, and 7 are examples, and are meant to help in the understanding of the mobile-device-to-machine payment system. For example, the shown long-range communications technology may be replaced with alternative long-range communications technology known or yet to be discovered, the shown short-range communication technology may be replaced with alternative short-range communication technology known or yet to be discovered, and the shown security may be replaced with alternative security known or yet to be discovered. The shown connections are meant to be examples, and there may be intermediaries that are not shown. The shown components have been simplified in that, for example, only one mobile device 150 (or machine 120, adapter module 100, or server 130) is shown where many may be included. Finally, the order of the steps may be changed and some steps may be eliminated.

Adapter Module

FIGS. 11-18 show views of adapter module 100a (referred to generally as adapter module 100). Adapter module 100 is a relatively low cost hardware component that is pre-configured to work with the industry standard multi-drop bus (MDB). On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Figure 18:
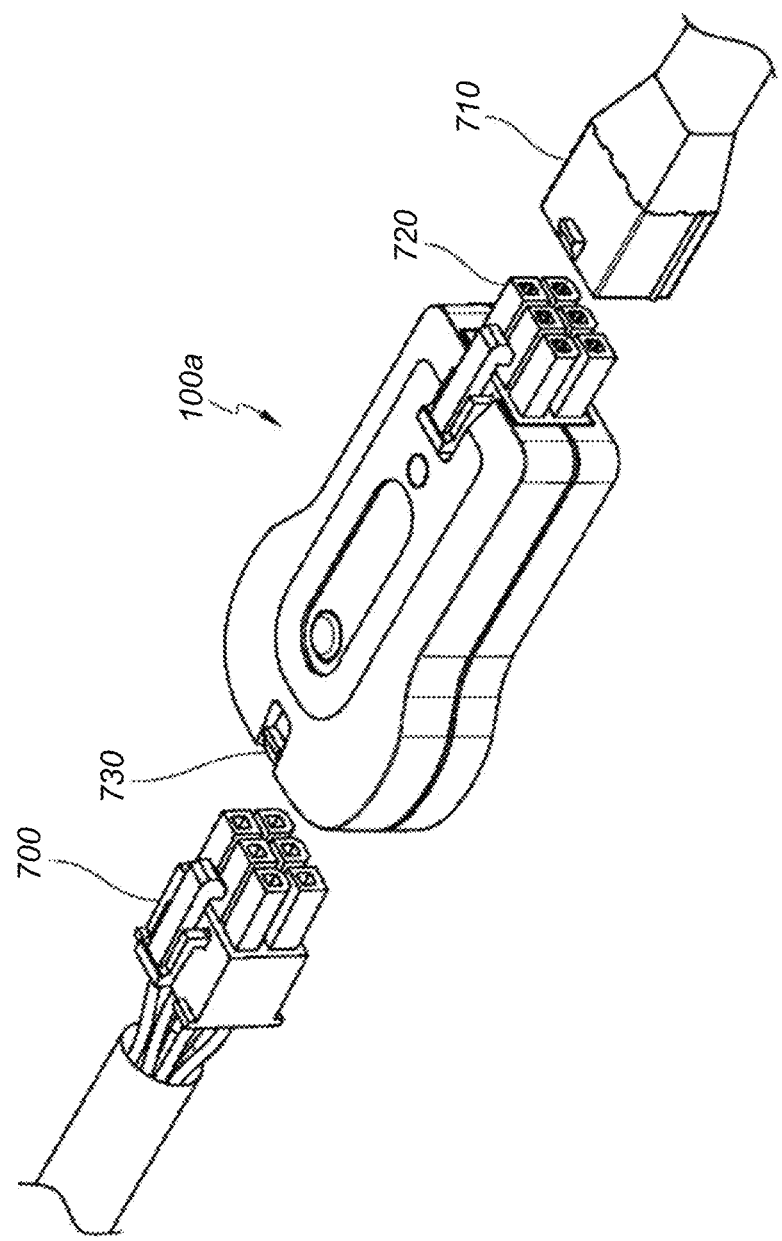
FIG. 18 is a perspective view taken from the second end of the in-line dongle adapter module of FIG. 11, the connectors and cables between which the in-line dongle adapter module is inserted being shown in broken lines for illustrative purposes in accordance with some implementations.

The shown adapter modules 100 are preferably designed to be used as an in-line dongle for in-line insertion within, for example, a MDB of a machine 120. The wire used in MDB technology uses male and female connection ends or adapters to allow the attachment of peripherals. In the case of a vending machine, the wire with the connection ends or adapters would be present to allow the attachment of a payment receiving mechanism (e.g., a coin mechanism). The MDB male and female adapters 700, 710 may be separated (as shown in FIGS. 17-18). The adapter module 100a in FIGS. 11 and 17-18 has a male adapter 720 and a female adapter 730. The adapter module 100a may be plugged (inserted) in serial ("in-line") with the wire. For example, the MDB female adapter 710 may be connected to the male adapter 720 of the adapter module 100 and the MDB male adapter 700 may be connected to the female adapter 730 of the adapter module 100. The resulting in-line configuration is shown in FIG. 19. It should be noted that the adapter modules 100 are designed to allow pass-through communications so that if the mobile-device-to-machine payment processing system is not enabled (e.g., for a particular purchase or simply turned off) the MDB functions as though the adapter module 100 is not there and the machine 120 can function normally.

Hands-Free Mode

Summarily, if it is available, a hands-free mode, from the user's perspective, would allow the user to approach a favorite payment accepting unit 120 and notice that the display (e.g., the displays 122 or 124 shown in FIG. 19) associated with the payment accepting unit 120 shows funds available (e.g., the wallet balance), he would select the product or service using input mechanisms (e.g., buttons 126 or a touch screen display 124 shown in FIG. 19) associated with the payment accepting unit 120, and he would retrieve his dispensed services or products.

During an initial handshake with the mobile device 150 (when the user is within range), the adapter module 100 reports to the mobile device 150 whether or not hands-free mode is available. If it is available, the installed mobile application 140 automatically connects to the payment accepting unit 120 without the user having to interact with the mobile device 150. The user observes that funds are available on the display 122, 124 of the payment accepting unit 120 and completes the purchase transaction as if cash was inserted in the machine 120 by inputting his selection on the payment accepting unit 120. The payment accepting unit 120 dispenses the product or service. After the selection is made, the change is returned to the mobile device 150.

Whether hands-free payment is available is determined by factors including, but not limited to whether if other mobile devices 150 are in range, if other adapter modules 100 are in range, if there are any alerts, if the payment trigger threshold is having wide variances and so deemed unstable, or if the payment accepting unit operator (e.g., a vending machine operator) has opted to disable hands-free mode for the payment accepting unit 120. In the latter instance, operators can disable via a maintenance mobile device 150, as well as through the operators' server 170 and/or the system management server 130.

FIG. 3 is a table that shows considerations, conditions, or factors that may be used to determine whether the hands-free pay feature is available. Starting at the "Favorite?" column, this indicates whether the payment accepting unit 120 is a favorite machine. Preferably the hands-free pay feature is only available for use with "favorite" payment accepting units 120 (e.g., a vending machine at work or school). The "Alert" column has to do with whether there is some reason (e.g., there are too many users in range) that the hands-free pay feature should not work and, if there is such a reason, the user will be notified (alerted) and may be able to use the manual mode to resolve the alert and/or complete the transaction. FIG. 3 shows situations in which a user is or is not able to make hands-free purchases from a machine 120 using a mobile application 140 on his mobile device 150. It should be noted that the shown interface is an example. For example, some of the features could be automated or pre-selected. (It should be noted that the left hand column, the "Tab" column, relates to whether the selected tab on the mobile application 140 is "all" or "favorite." FIGS. 10A-10D all show these tabs. Unlike the other columns in FIG. 3, this column has more to do with the functionality and view of the application 140 than specifically with the hands-free feature. The tabs would allow a user to select whether he wanted to be alerted when he was in range of all payment accepting units 120 or just "favorite" payment accepting units 120 and the application 140 would show the appropriate view.)

Balance Display: An optional feature of the mobile-device-to-machine payment system that is particularly helpful in the hands-free mode (although it may be available in the manual mode and/or in a multiple-vend scenarios) is when the user's mobile device 150 sends "credit" to the payment accepting unit 120 (either via hands-free payment or through a manual swipe), the wallet balance is sent to the payment accepting unit 120 that is then displayed to the user on a display 122, 124 of the machine 120. This is particularly beneficial during hands-free mode when the user does not retrieve the mobile device 150 and, therefore, may not know the balance. Also, in a multiple-vend scenario the user would not have to calculate a remaining balance.

An example of a hands-free, multiple-vend scenario where a balance is displayed by the payment accepting unit 120, follows: The user has $5.00 in his/her virtual wallet as that is the amount that has been authorized (the AuthGrant being stored on the mobile device 150). The user walks up to the payment accepting unit 120 and $5.00 is displayed on the display 122, 124 of the payment accepting unit 120 since hands-free mode was enabled and credit was sent (e.g., via the short-range communication capability) to the payment accepting unit 120. The user makes a selection of $1.50 by interacting (e.g., pressing buttons) with the machine 120. The item (product or service) is dispensed and the "change" is "returned" (e.g., via the short-range communication capability) to the virtual wallet. But since the user is still standing in the payment zone 102, the remaining wallet balance of $3.50 is sent to the payment accepting unit 120 and displayed so that the user can now see that he/she has a $3.50 balance. (It should be noted that the authorized funds may remain on the machine 120 and not be transferred back to the mobile device 150 between transactions.) The user decides to purchase a $1.50 item, and the transaction is completed as usual (e.g., by interacting with the machine 120). Now the user is still standing in the payment zone 102 and he/she sees the wallet balance of $2.00 on the display 122, 124 of the payment accepting unit 120. The user decides that he/she does not wish to purchase anything else and simply walks away. As he/she walks out of the payment zone 102, the credit is cleared from the machine 120, but he/she is left with the knowledge that his wallet balance is $2.00 even though he/she never touched the mobile device 150. Communications between the payment accepting unit 120 and the adapter module 100 (via the mobile device 150) handle the accounting incidental to the transaction. The remaining balance ($2.00) is technically stored on the server 130, and may be reflected on the application 140 on the mobile device 150.

Multiple Distinct Zones

As shown in FIGS. 1-2, the functions performed by the adapter module 100 can be divided into distinct zones: a first "communication zone" (e.g., "Bluetooth range" 106), a second "authorization zone" 104, and a third "payment zone" 102. The payment zone 102 is smaller than or equal to (overlapping completely) the authorization zone 104. Put another way, the payment zone 102 is within or coextensive with the authorization zone 104. The payment zone 102 is a subset of the authorization zone 104 with a ratio of the payment zone 102 to the authorization zone 104 ranging from 0.01:1 to 1:1. It is not necessarily a fixed ratio and can vary between different payment accepting units 120, different mobile devices 150, different users, and over time. While the zones 102, 104, 106 are depicted as having a uniform shape, the zones may not necessarily be uniform (or constant over time) in that the shape can vary. For example, the shape of the Bluetooth range 106 may vary depending on environmental conditions such as obstacles in the room and payment accepting unit 120 door/wall materials.

Bluetooth Range 106 (sometimes also herein called the "communication zone"): The outermost range is the Bluetooth range 106 (shown in FIGS. 1-2). This is the area in which the adapter module 100 is able to broadcast its presence. In most situations, the Bluetooth range 106 is a passive range in that no actual data is exchanged between the mobile device 150 and the adapter module 100. While in the Bluetooth range 106, the mobile device 150 monitors the RSSI (Received Signal Strength Indicator).

Authorization Zone 104: The middle region is the authorization zone 104 (shown in FIGS. 1-2). This is a computed area based on the RSSI. As mentioned, the mobile device 150 monitors the RSSI while it is in the Bluetooth range 106. When the RSSI reaches a certain predetermined threshold based on In-Range Heuristics, the mobile device 150 can be considered to be in the authorization zone 104. In the authorization zone 104 the mobile device 150 establishes a connection to the adapter module 100 (e.g., a Bluetooth connection (FIG. 5) with SSL protection (FIG. 6)) and informs the adapter module 100 of its presence. After a successful handshake with the adapter module 100, the mobile device 150 registers the adapter module 100 and the adapter module 100 requests an authorization to the server 130 via the mobile devices' network connection (e.g., a Wi-Fi or cellular connection (FIG. 5) with SSL protection (FIG. 6)). It is important to note the mobile device 150 and the adapter module 100 have a non-exclusive relationship at this point. The adapter module 100 may collect registrations for all mobile devices 150 that are within the authorization zone 104.

An authorization occurs in preparation for when the user enters the payment zone 102 (shown in FIGS. 1-2). An authorization expires in a set period of time (for example, five minutes), so if the mobile device 150 is still in the authorization zone 104 at the time of expiration, the adapter module 100 submits for and receives another authorization. This will continue for a set number of times (for example, the limit may be three times to limit cases of numerous authorizations for a mobile device that may remain in the authorization zone 104 for an extended period of time without completing a transaction). Should authorization fail (for instance if the limit had been reached) prior to the user entering the payment zone 102, the adapter module 100 will request authorization when the mobile device 150 enters the payment zone 102 (which adds a few seconds to the experience).

Payment Zone 102: As a user enters the payment zone 102, the mobile device 150 establishes exclusive control of the adapter module 100. Once established, any other user in the payment zone 102 is put into a "waiting" status.

In the payment zone 102, the payment can be triggered automatically if the payment processing system has and is in hands-free mode. In such instances, the mobile device 150 is running the application 140 in background mode and will send credit to the payment accepting unit 120 without any explicit user interaction. The user completes the transaction on the payment accepting unit 120 in much the same manner as if cash had been inserted into the payment accepting unit 120 to establish credit. After the user completes the transaction (that may include one or more purchases), details of the transaction are preferably returned to the mobile device 150 and server 130 in separate messages. The message to the server 130 is preferably encrypted with the adapter module's 100 private key (FIG. 6) to ensure data integrity. As shown in FIG. 7, the "private key" coded message (Encrypted VendDetails) is preferably sent via the mobile device 150. The message to the mobile device 150 may be sent solely for the purpose of closing the transaction. The transaction history and balance are updated server-side via the encrypted message sent to the server 130.

The other mode of operation is manual mode. In manual mode, the user launches the mobile device 150 and is able to swipe to send payment to the payment accepting unit 120. The user can also swipe back to cancel the payment. Like in hands-free mode, the purchase transaction is completed on the payment accepting unit 120 in the same manner as if cash were inserted into the payment accepting unit 120. The mobile device 150 is only used to send payment. Selection is made directly on the payment accepting unit 120.

Self-Calibrating Zone Threshold: A key, but optional feature, of the payment processing system is a self-calibrating payment zone RSSI threshold. Because RSSI can vary machine to machine, environment to environment, and device to device, having a fixed threshold at which payment is triggered can be problematic. The approach suggested herein is the creation of a self-calibrating threshold. When the user is interacting with the payment accepting unit 120 (such as when he makes his selection on the payment accepting unit 120), the payment accepting unit 120 notifies the adapter module 100 and the adapter module 100 logs the conditions such as RSSI, type of user mobile device 150, accelerometer data, and other information. It is at this point that it can be ascertained safely that the user is within arm's-length from the payment accepting unit 120 (by necessity the user is arm's-length because he is making some physical interaction with the payment accepting unit 120). This is the only point in the entire transaction in which it can be certain that the user is within arm's-length from the payment accepting unit 120.

FIG. 4 shows a simplified set of steps involved when users enter the payment zone 102. Specifically, FIG. 4 shows that credit is established 200 (this may have been done in the authorization zone 104, but if not it would be handled in the payment zone 102), that the user makes a selection using the machine 202, that the machine notifies the adapter module of the selection 204, that the adapter module (optionally) logs the RSSI 206, and that the purchase process(es) continues 208. Using the historically logged RSSI data, the adapter module 100 calculates one of several "average" RSSI using various mathematical models. This "average" could be a traditional average, a moving average, a weighted average, a median, or other similar summary function. The adapter module 100 could pre-process the historical data before running the function, such as to eliminate top and bottom data points, suspect data points, etc.

Optionally, during the handshake between the mobile device 150 and the adapter module 100, the information transmitted to the adapter module 100 may include, for example, the model of the mobile device 150. Using the received information pertaining to the mobile device models, the adapter module 100 can create multiple payment thresholds, one for each mobile device model. This allows for variances that may be inherent in different types of Bluetooth radios. An alternative to this method is for the adapter module 100 to broadcast a baseline payment zone threshold, and the mobile device 150 can use an offset from this baseline based on its specific model type. The payment zone thresholds (or baseline offsets) can be unique to specific types of mobile devices (e.g., by manufacturer, operating system, or component parts), models of mobile devices, or individual mobile devices (unique to each user).

In a typical scenario in which the payment zone threshold has been calibrated, the adapter module 100 advertises its presence along with the threshold at which it considers any mobile device 150 to be in the authorization zone 104. This is a one-way communication from adapter module 100 to mobile device 150. Once the mobile device 150 enters the authorization zone 104, there is a handshake that is established between the adapter module 100 and the mobile device 150. During this handshake, the mobile device 150 can share its model information with the adapter module 100, and the adapter module 100 can return the payment zone 102 threshold for that specific model.

Optionally, in addition to calibrating the payment zone threshold, the adapter module 100 can apply the self-calibrating model to the authorization zone 104 to calibrate the authorization zone threshold. As with the payment zone thresholds, the authorization zone thresholds can be unique to specific types of mobile devices, models of mobile devices, or individual mobile devices. In this scenario, the adapter module 100 would broadcast multiple thresholds by device type and the mobile device 150 would determine which threshold to apply (or alternatively broadcast a baseline and the mobile device 150 uses an offset based on its device model). Even in this scenario, the authorization zone 104 is a one-way communication.

Optionally, along with the threshold that is calculated (in the payment and/or the authorization zone(s)), a safety margin can be added to minimize scenarios in which a user is within range, but the mobile-device-to-machine payment processing system does not recognize it because the threshold may not have been reached. For example, if the calculated RSSI for an iPhone™ 5 on machine 4567 is −68 db, the mobile-device-to-machine payment processing system may add a safety margin of −5 db, and establish the threshold at −73 db. So when a user's phone is communicating with the adapter module 100 at an RSSI of −73 db or better, the mobile-device-to-machine payment processing system will allow the mobile device 150 to credit the payment accepting unit 120. The safety margin can be set on the server 130 and downloaded to the adapter module 100, or set on the mobile device 150, or set on the adapter module 100 itself.

Optionally, in the payment zone threshold, the mobile device 150 can use other data to determine when to cancel the exclusive control of the payment accepting unit 120, to identify when the user is moving out of the payment zone 102. External data could include accelerometer data from the mobile device 150. Using that data, the mobile device 150 can determine whether the user is standing relatively still in front of the payment accepting unit 120, or if the user is in motion-effectively walking away from the payment accepting unit 120.

Signal Unavailability Adaptation

The mobile-device-to-machine payment processing system described herein uses a mobile device's 150 short-range communication technology (e.g., Bluetooth mechanisms) (shown as short-range communication capability 876 in FIG. 21) and a mobile device's 150 long-range communications technology (e.g., cellular and/or Wi-Fi mechanisms) (shown as long-range communication capability 872 in FIG. 21). The short-range communication capability 876 communicates with the adapter module's 100 short-range communication technology (e.g., Bluetooth mechanisms) (shown as short-range communication capability 776 in FIG. 20). The long-range communication capability 872 communicates with the server's 130 long-range communications technology (e.g., cellular and/or Wi-Fi mechanisms) (shown as long-range communication capability 972 in FIG. 22). The mobile device 150 (with a mobile application 140 thereon) acts as a communication bridge between the adapter module 100 (associated with a payment accepting unit 120) and the server 130. This process is described herein and works properly if there is cellular or Wi-Fi coverage within the payment zone 102.

One option if there is no cellular or Wi-Fi coverage within the payment zone 102 is to determine whether there is cellular or Wi-Fi coverage within the authorization zone 104 or the Bluetooth range 106. If there is, then the sizes of the zones 102, 104, 106 could be adapted and the timing could be adapted. For example, if the mobile devices 150 detected problems with the cellular or Wi-Fi coverage within the payment zone 102, the user could carry his mobile device 150 into the other zones (or the mobile device 150 could use short-range communication technology to communicate with other mobile devices 150 within the authorization zone 104 or the Bluetooth range 106) to determine whether the zones have cellular or Wi-Fi coverage. If they do have coverage, communication between the mobile device 150 and the server 130 can be advanced (conducted earlier when the mobile device 150 is further from the machine 120) or delayed (conducted later when the mobile device 150) is further from the machine 120). This can be thought of as changing the size or shapes of the zones 102, 104, 106. The timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again.

Another option if there is no cellular or Wi-Fi coverage within any of the zones 102, 104, 106 is for the user to obtain authorization while outside of the zones in a place with cellular or Wi-Fi coverage. This may occur, for example, if a user knows that he will be going to a place with a payment accepting unit 120 equipped with an adapter module 100 (perhaps to a favorite payment accepting unit 120) that does not have (or rarely has) cellular or Wi-Fi coverage. A user may also use the mobile application 140 to query payment accepting units 120 in a given range (e.g., within 50 miles) or at a given location (e.g., at a campground or in a particular remote city) to determine whether there is cellular or Wi-Fi coverage within the zones 102, 104, 106. The user can then obtain pre-authorization from the server 130 using the mobile application 140. Again, the timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again. A mobile-device-to-machine payment system having the ability to implement this option would be able to accept cashless payments without requiring any network connection near the payment accepting unit 120. In some implementations, the mobile-device-to-machine payment processing systems described herein is located in a remote location where no signal is available, therefore, can accept cashless payments.

As an example of a situation in which there might be no cellular or Wi-Fi coverage within any of the zones 102, 104, 106 of a particular payment accepting unit 120, the user (a teenager) may be traveling to a remote location to attend summer camp where there is no cellular or Wi-Fi coverage. The camp may have several payment accepting units 120 (e.g., a machine that creates a dedicated "hot spot" that requires payment for use, vending machines, or machines for renting equipment such as bikes, kayaks, or basketballs). The camp facility might notify parents that the mobile-device-to-machine payment system is available. The parents, while at home, could obtain authorization for a particular amount (that could be doled out a certain amount per day or limited to type of machine or location) to be authorized and "loaded" into the user's mobile device 150 and specify that the authorization will not expire for a certain period or until a certain date. Thereafter, while at camp, the user could use the mobile application 140 on his mobile device 150 in a manner similar to those discussed elsewhere herein. Short-range communications may be used for communications between the adapter modules 100 (associated with the machines 120) and users' mobile devices 150.

One subtle but powerful component of the payment processing system described herein is that it requires a long-range communication capability (e.g., an Internet or cellular network connection) only in the authorization zone 104 and only for the time period required to send the AuthRequest and receive the AuthGrant. Once a valid AuthGrant is received by the mobile device 150, the long-range communication capability (e.g., an Internet or cellular network connection) is not required by either the mobile device 150 or the adapter module 100 in the payment zone 102 as long as the AuthGrant is valid (unexpired). This mechanism allows the system to seamlessly handle authenticated transactions in (temporary) offline mode, with the deferred acknowledgement and transaction messages performing the bookkeeping and cleanup when network connection is regained. The alternatives described above provide a unique way to artificially extend the authorization zone to include any location where the mobile device 150 can communicate with the server 130.

Multiple User Resolution

As shown in FIG. 2, in one practical scenario, multiple users are in the zones 102, 104, 106. As shown in FIG. 2, users 1, 2, and 3 are in the payment zone 102 near the machine 120; users 5 and 6 are shown as positioned between the authorization zone 104 and the Bluetooth range 106; users 4 and 7 are in the Bluetooth range 106, user 10 is positioned on the edge of the Bluetooth range 106; and users 8 and 9 are positioned outside of Bluetooth range 106. In some implementations, the mobile-device-to-machine payment processing system manages and resolves issues pertaining to multiple users.

Users 4 and 7 are within the Bluetooth range 106 and the user 10 is either entering or leaving the Bluetooth range 106. Within the Bluetooth range 106 the users' mobile devices 150 are able to see the adapter module's 100 advertisement. In this zone, the mobile device 150 preferably does not initiate a connection. The adapter module 100 is preferably unaware of the users in the Bluetooth range 106. All the adapter module 100 is doing is advertising its presence to any multitude of users that may be in Bluetooth range 106.

The adapter module 100 begins to log users as the users (and their respective mobile devices 150) enter the authorization zone 104 (shown in FIG. 2 as users 5 and 6). At this point, there is a non-exclusive connection initiated by the mobile device 150 to the adapter module 100. It does a handshake (e.g., to exchange information needed to obtain authorization and, optionally, to log information needed for a self-calibrating authorization zone threshold) and the mobile device 150 contacts the server 130 for an authorization (e.g., sending an AuthRequest and receiving an AuthGrant). The adapter module 100 registers all mobile devices 150 that have requested and received AuthGrants. The adapter module 100 continues communicating with any other mobile device 150 that enters the authorization zone 104. After initial contact, the adapter module 100 may provide the mobile device 150 with a deferral delay of when to check back in with the adapter module 100 allowing opportunity for other mobile devices 150 to communicate with the adapter module 100.

If there is only one user in the payment zone 102, a purchase transaction may be performed. If there are multiple users in the payment zone 102, the mobile-device-to-machine payment system must handle the situation.

One optional solution for handling the situation of the multiple users in the payment zone 102 is queuing users in the payment zone 102. Once any mobile device 150 enters the payment zone 102, it establishes exclusivity to a particular mobile device 150 (e.g., in a first-come-first-serve manner). Technically, however, the adapter module 100 is not establishing an exclusive connection to the mobile device 150. The adapter module 100 can still perform a round-robin poll and communicate with and advertise to other mobile devices 150. Instead, the adapter module 100 establishes a queue prioritized by RSSI and time (e.g., who was first and whether the authorization has expired) and it notifies (e.g., alerts) other mobile devices 150 to wait. The earliest valid (unexpired) authorization takes precedence when there is any tie in the RSSI. Otherwise, for example, the strongest average RSSI takes priority. Preferably the queue is not a static measure of the RSSI but an averaged measure over the period of time in the queue. This compensates for a scenario in which a user may be walking around in the queue and then shows up at the payment accepting unit 120 just as the previous user is finishing. If another user was also in the payment zone 102 and stood there the entire time, but may have newer authorization, he could win out.

Anytime that the adapter module 100 cannot determine exactly which user is in the payment zone 102 in front of the payment accepting unit 120, the adapter module 100 will disable hands-free payment. The mobile device 150 will send an alert to the user and he can use swipe to pay (manual mode). All users in payment zone 102 will show "Connected" and the first to swipe payment to the payment accepting unit 120 then locks out other users.

Multiple Module Resolution

In the scenario where there are multiple modules present, determining which payment accepting unit 120 a user is in front of can be a challenge. In some implementations, the mobile-device-to-machine payment processing system described herein allows adapter modules 100 to communicate to other adapter modules 100 in range via Bluetooth. Each user receives authorization grants for specific payment accepting units 120. This means if there are multiple adapter modules 100 within the same authorization zone 104, there will be multiple authorization grants for the user. When the user enters the payment zone 102, it can be difficult to differentiate which payment accepting unit 120 the user is in front of if the payment zones 102 overlap.

To solve this problem, when the user enters the payment zone 102, the adapter modules 100 communicate with each other to determine the RSSI for the particular user (based on the signal from his mobile device 150) to triangulate which adapter module 100 (and the associated payment accepting unit 120) is closer to the user. Optionally, the inter-module communications can restrict the user to establishing an exclusive connection with only one payment accepting unit 120.

Optionally, when the user connects to a payment accepting unit 120, the mobile device 150 can send a communication to the payment accepting unit 120 for momentary display to the user on the display 122, 124 of the payment accepting unit 120. For example, the mobile device 150 can send a communication (e.g., "connected" or "Fred's Mobile Device Connected") to the payment accepting unit's display 122, 124 for a predetermined period of time (e.g., 1-3 seconds) so when the user is in payment zone 102, it is clear which payment accepting unit 120 the user is connected to prior to making a purchase (either in hands-free or manual mode).

In addition, when the user is in manual mode, the mobile device 150 can display (e.g., on the touch screen 152 as shown in FIGS. 10A-10D) a visual indication of the payment accepting unit 120 (e.g., a picture and/or a payment accepting unit ID of the payment accepting unit 120) for visual confirmation. If the user is in manual mode, the user can manually change the payment accepting unit 120.

Descriptive Scenario

FIG. 7, FIGS. 8A-8G, and 9A-9E (as well as other figures) can be used to understand a detailed scenario of the mobile-device-to-machine payment processing system described herein. A flow of communications and steps are loosely described below with reference to these (and other figures). It should be noted that alternative scenarios could include, for example, a modified order of the steps performed.

Prior to vending transactions, a user downloads a mobile application 140 onto his mobile device 150, creates an account, and configures a funding source via, for example, a funding source server 160. A funding source may be, for example, a debit card, a credit card, campus cards, rewards points, bank accounts, payment services (e.g., PayPal™) or other payment option or combination of payment options known or yet to be discovered. The funding sources may be traditional and/or nontraditional payment sources that are integrated into the ecosystem described herein and then used indirectly as a source of funds. Funds from the funding source are preferably held on the server 130 such that when an AuthRequest is received by the server 130, the server 130 can send an AuthGrant authorizing funds for a purchase.

The user can specify one or more "favorite" adapter module(s) 100 (that has a one-to-one relationship to the payment accepting unit 120) that he may visit regularly, such as a vending machine at school or work. Favorite adapter modules 100 appear on a pre-filtered list and allow for additional rich features such as hands-free payment.

Figure 8A:
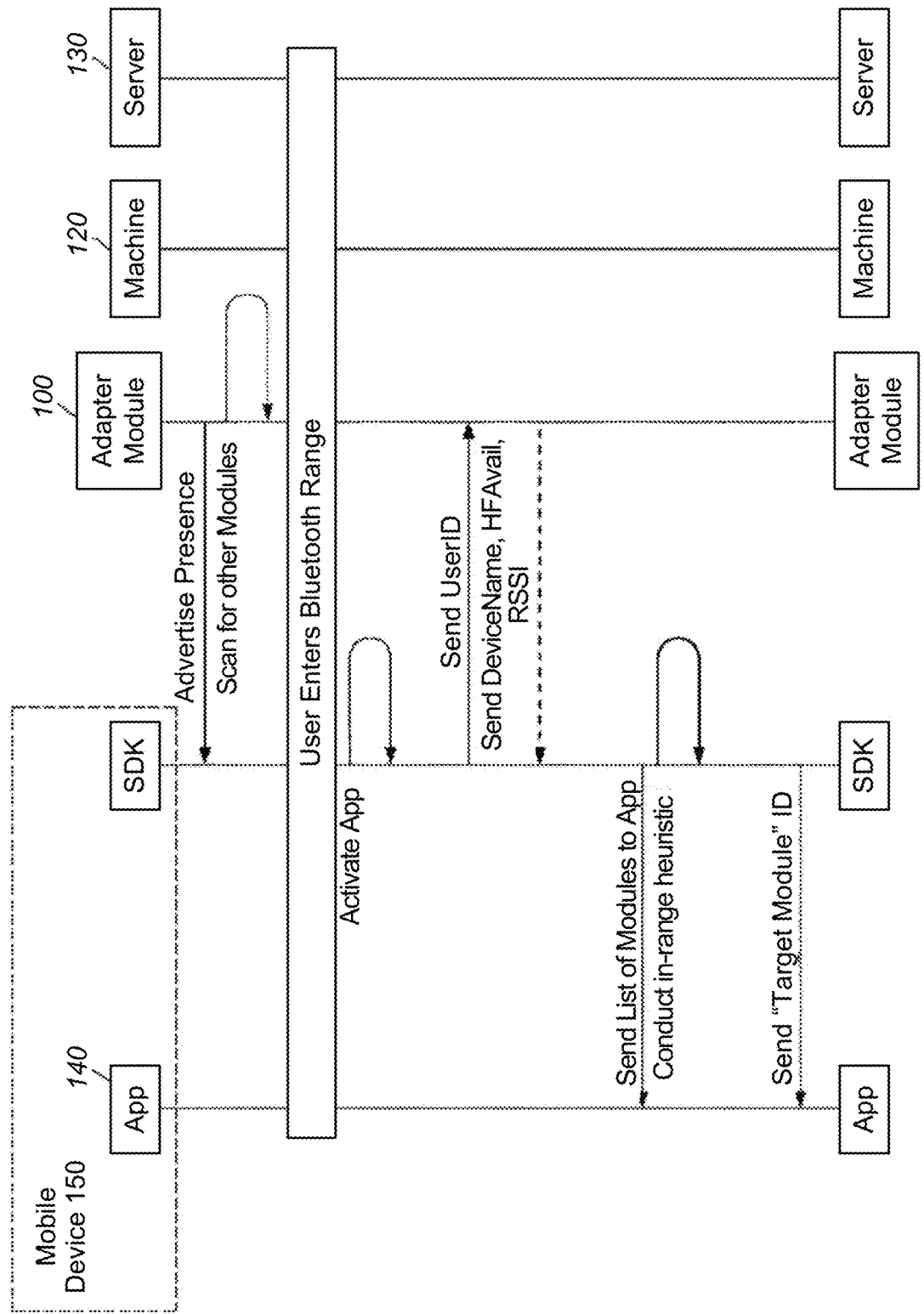
FIG. 8A is a schematic process flow diagram that shows additional elements and features of the payment processing system (e.g., communications, messaging, vending sequence, and purchase flow) when the user enters the "communication zone" (e.g., Bluetooth range) in accordance with some implementations.

The payment accepting unit 120 may be equipped with an adapter module 100 that is constantly advertising its availability via Bluetooth (or other "signals," "communications," and/or "transmissions"). This ongoing advertising and scanning for adapter modules is shown in FIG. 8A. As shown, the mobile device 150 is continuously scanning for any adapter module 100 within Bluetooth (or other "signal," "communication," and/or "transmission") range. When the user is within range of that adapter module 100, the mobile device 150 tracks and monitors the signal strength until a predetermined "authorization zone" threshold is achieved.

Figure 8B:
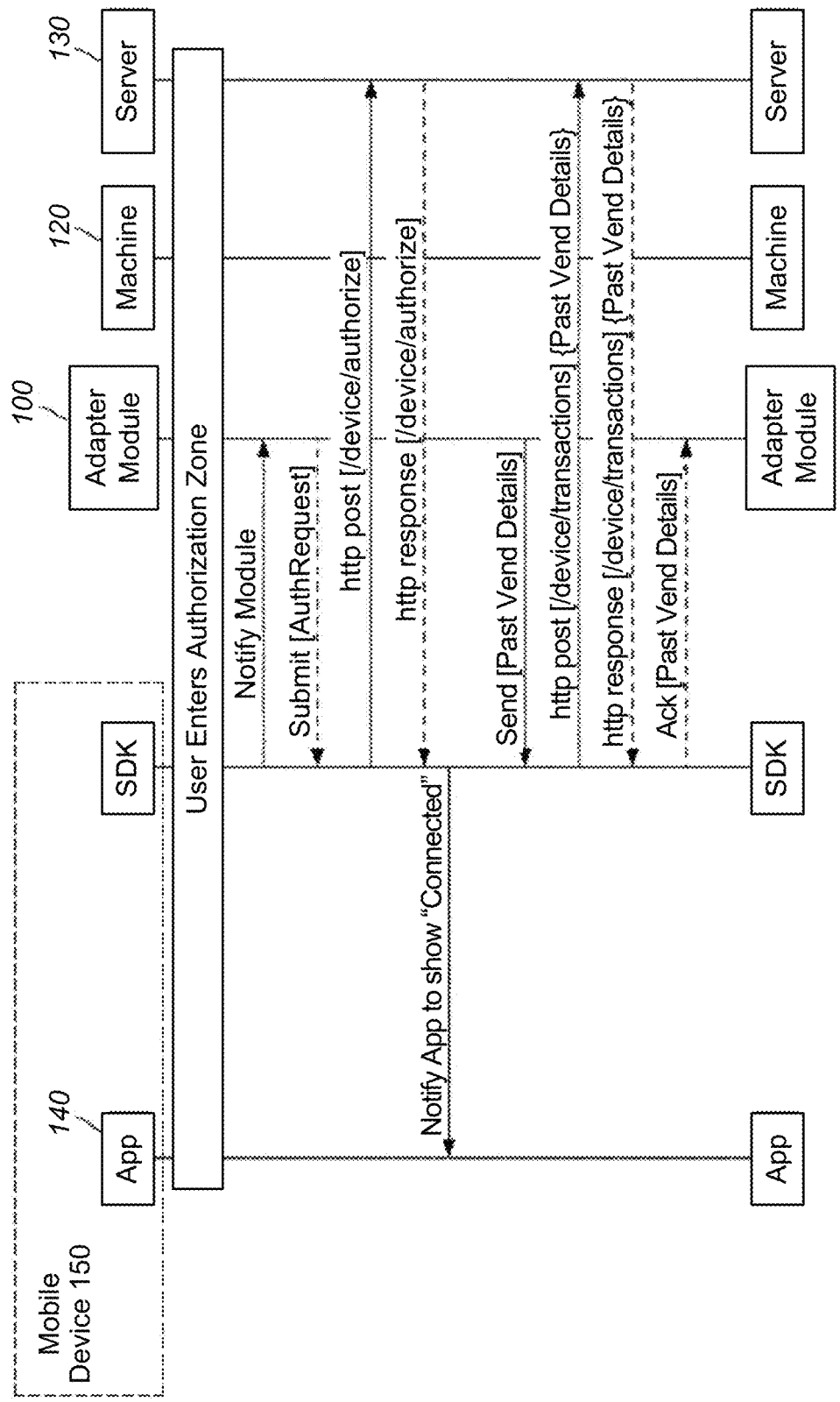
FIG. 8B is a schematic process flow diagram that shows additional elements and features of the payment processing system (e.g., communications, messaging, vending sequence, and purchase flow) when the user enters the "authorization zone" in accordance with some implementations.
Figure 9A:
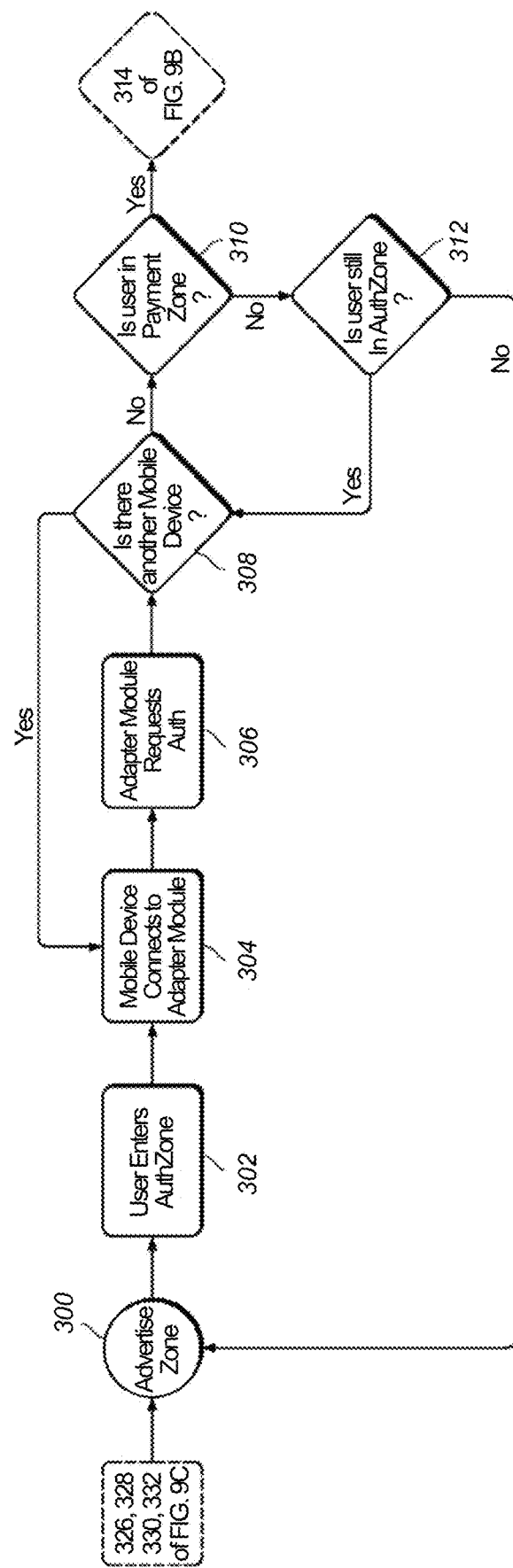
FIGS. 9A-9E are flow charts that show example steps and features of the payment processing system (e.g., communications, messaging, vending sequence, and purchase flow) in accordance with some implementations.

FIGS. 8B and 9A generally show that when the authorization zone threshold is reached, the mobile device 150 enters the authorization zone (block 302) and registers the adapter module 100. The mobile device 150 connects to the server 130 (block 304). The application 140 on the mobile device 150 creates a request for authorization (AuthRequest) and passes the AuthRequest to the server 130 using appropriate communication technology (e.g., GSM, CDMA, Wi-Fi, or the like) (block 306). The server 130 responds with an authorization grant (AuthGrant) encrypted with the specific adapter module's private key (block 306). This authorization token may minimally include the User identifier (ID), Apparatus ID (for the adapter module 100), authorization amount, and expiration time. The mobile device 150 receives the AuthGrant from the server 130, and retains it until the mobile device 150 is ready to issue payment to an adapter module 100. The mobile device 150 collects all pending AuthGrants that may be one or more depending on how many adapter modules 100 are in-range. Unused AuthGrants that expire are purged from the mobile device 150 and the server 130. It is important to note that the mobile device 150 is unable to read the AuthGrant because it is encrypted with the adapter module's unique private key that is only known to server 130 and adapter module 100. This provides a preferred key element of security in the system as the adapter module 100 only trusts AuthGrants that are issued by the server 130, and the AuthGrants cannot be read or modified by the mobile device 150 or any other party in between the server and the adapter module 100. Additional mobile devices 150 may enter the authorization zone 104 (block 308).

As the user approaches a specific adapter module 100, the user enters the payment zone 102 and an event threshold is triggered based on heuristics performed by the mobile device 150. Blocks 310 and 312 show the loop steps of waiting for a mobile device 150 from the authorization zone 104 to enter the payment zone 102. If the user leaves the authorization zone 104 without entering the payment zone 102, the adapter module 100 returns to advertising its presence (block 300).

Figure 8C:
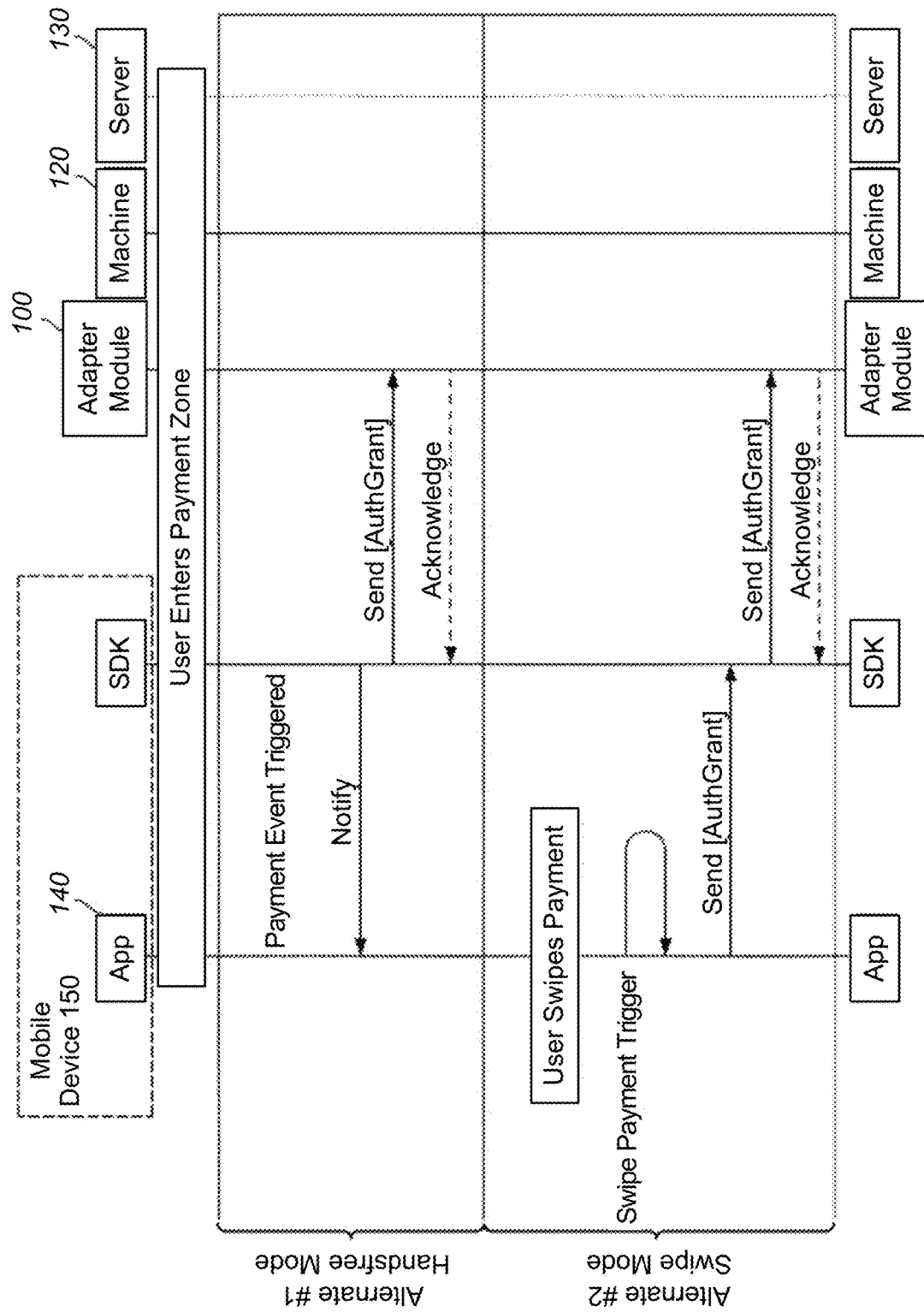
FIG. 8C is a schematic process flow diagram that shows additional elements and features of the payment processing system (e.g., communications, messaging, vending sequence, and purchase flow) when the user enters the "payment zone" and, in particular, detailing a hands-free mode embodiment and a swipe mode embodiment in accordance with some implementations.
Figure 9B:
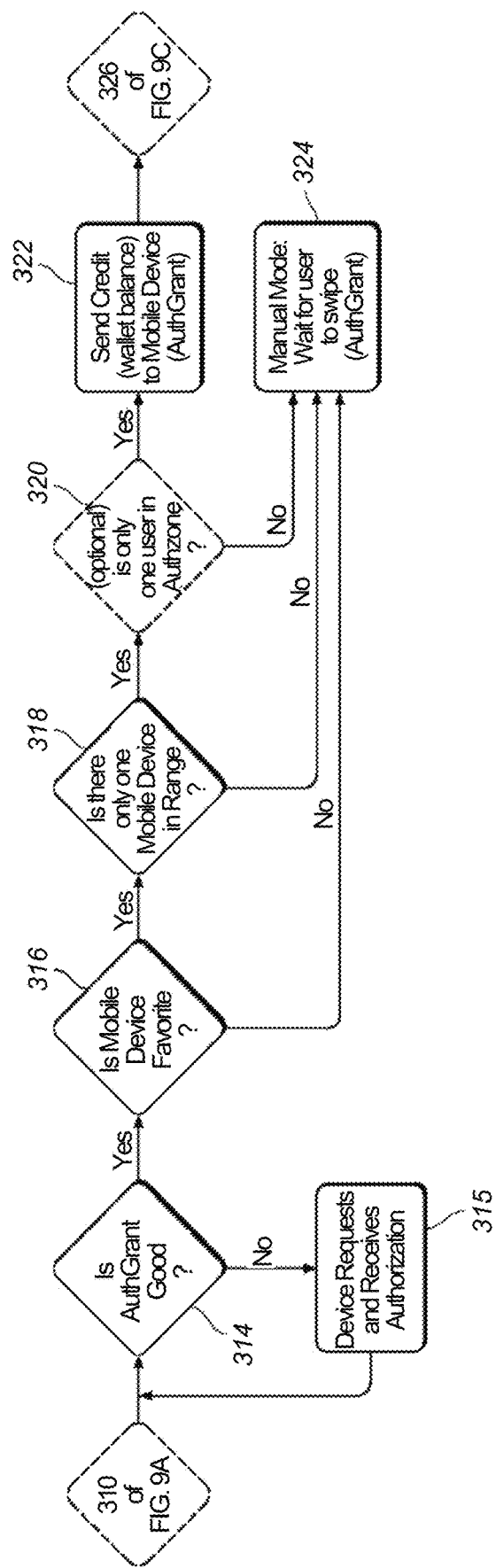

FIGS. 8C and 9B generally show the user entering the payment zone. The mobile device 150 verifies that it has an unexpired and valid AuthGrant. If the AuthGrant is not good, it may be requested again, repeating the Authorization Request process (block 315). If the AuthGrant is good, the mobile device 150 sends the valid AuthGrant (including the wallet balance (block 322)) to the adapter module 100 to initiate a transaction. The mobile device 150 may issue the AuthGrant automatically without specific user interaction if the hands-free mode is supported (and the device is a favorite (block 318), there is only one device in the payment zone 102 (block 318), and (optionally) there is only one user in the authorization zone 104 (block 320). If any of these factors are not present, the mobile device 150 will prompt and/or wait for the user to begin the transaction manually (block 324).

Figure 8D:
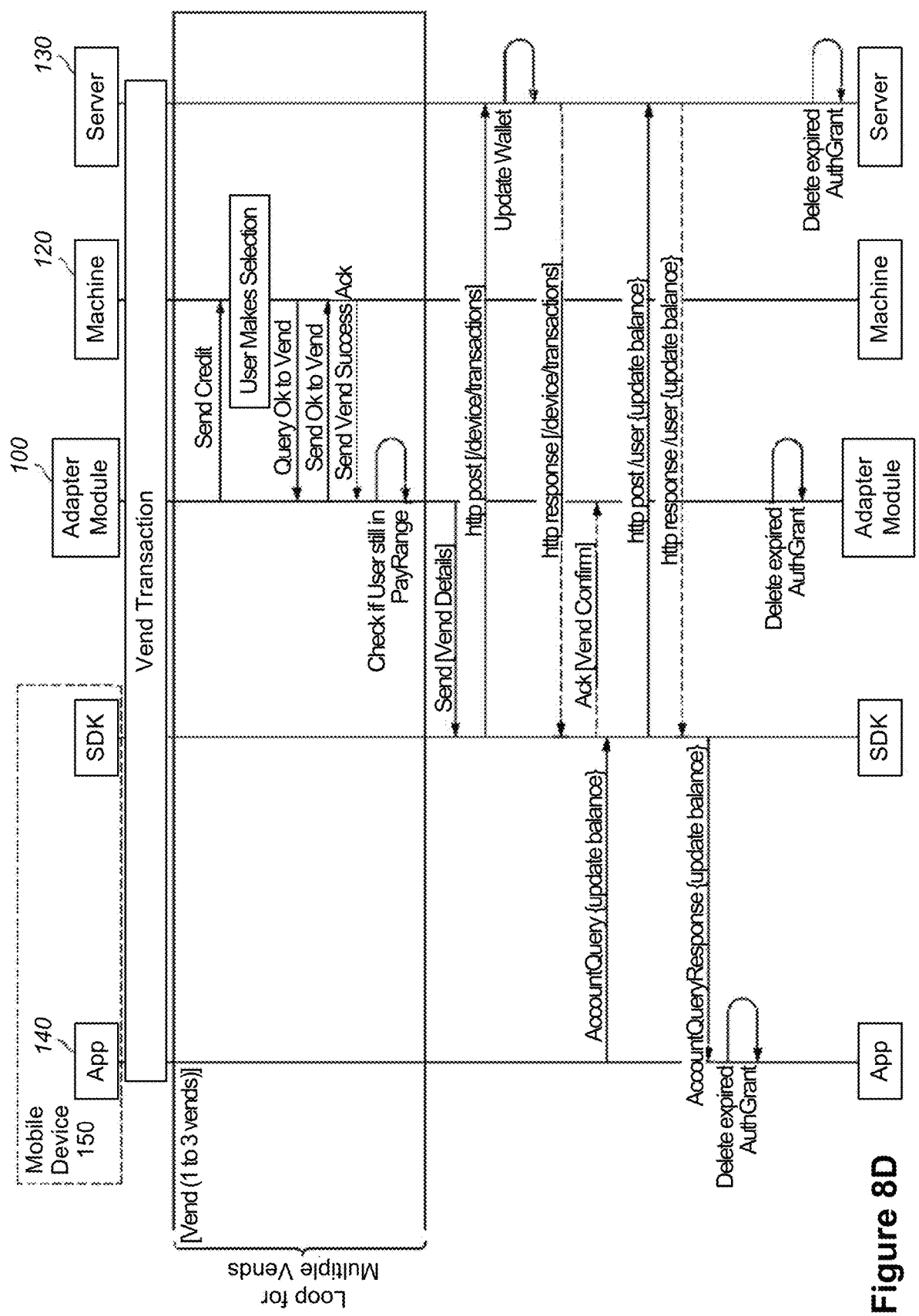
FIG. 8D is a schematic process flow diagram that shows additional elements and features of the payment processing system (e.g., communications, messaging, vending sequence, and purchase flow) in a vending transaction including a loop for multiple transactions in accordance with some implementations.
Figure 9C:
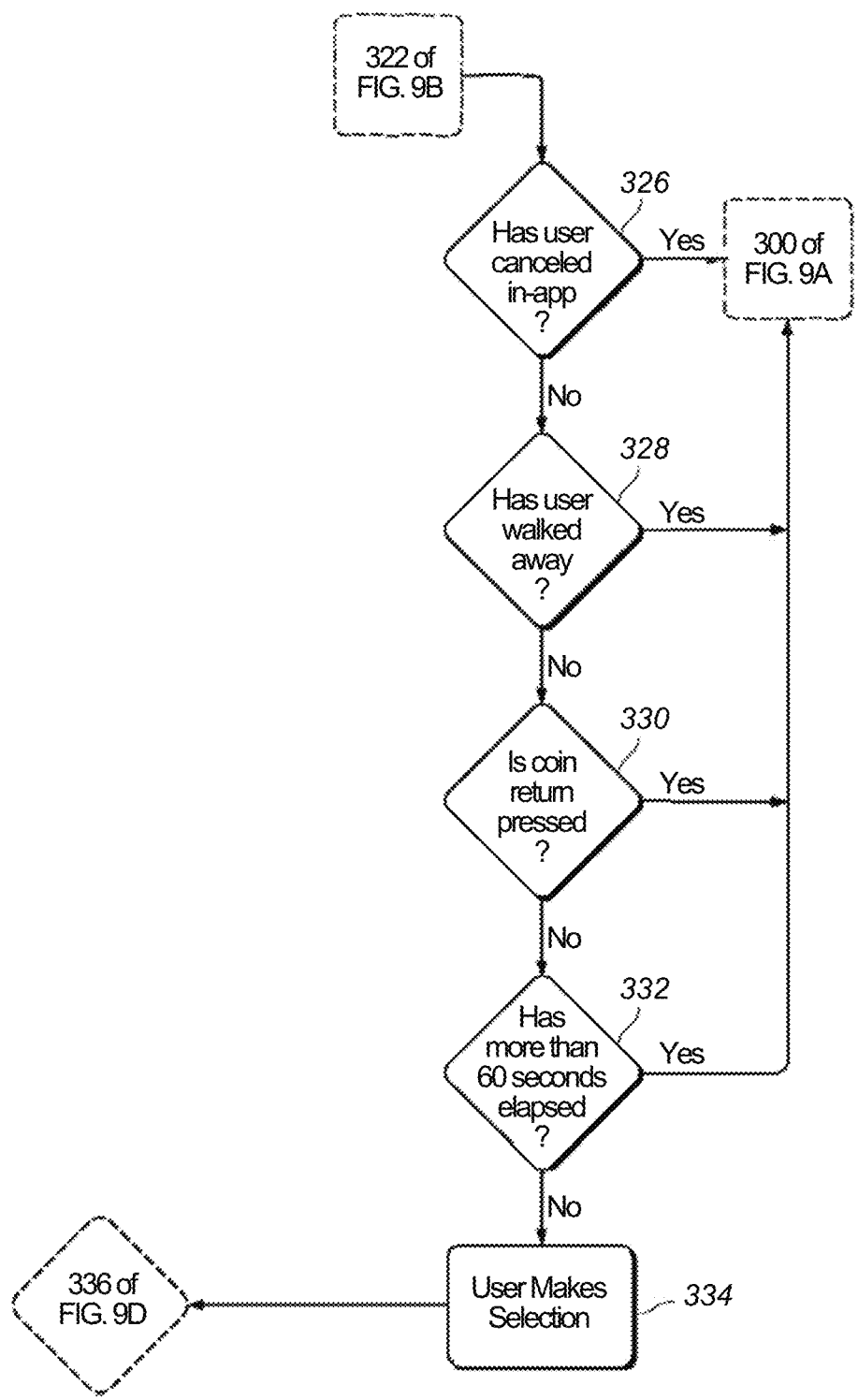
Figure 9D:
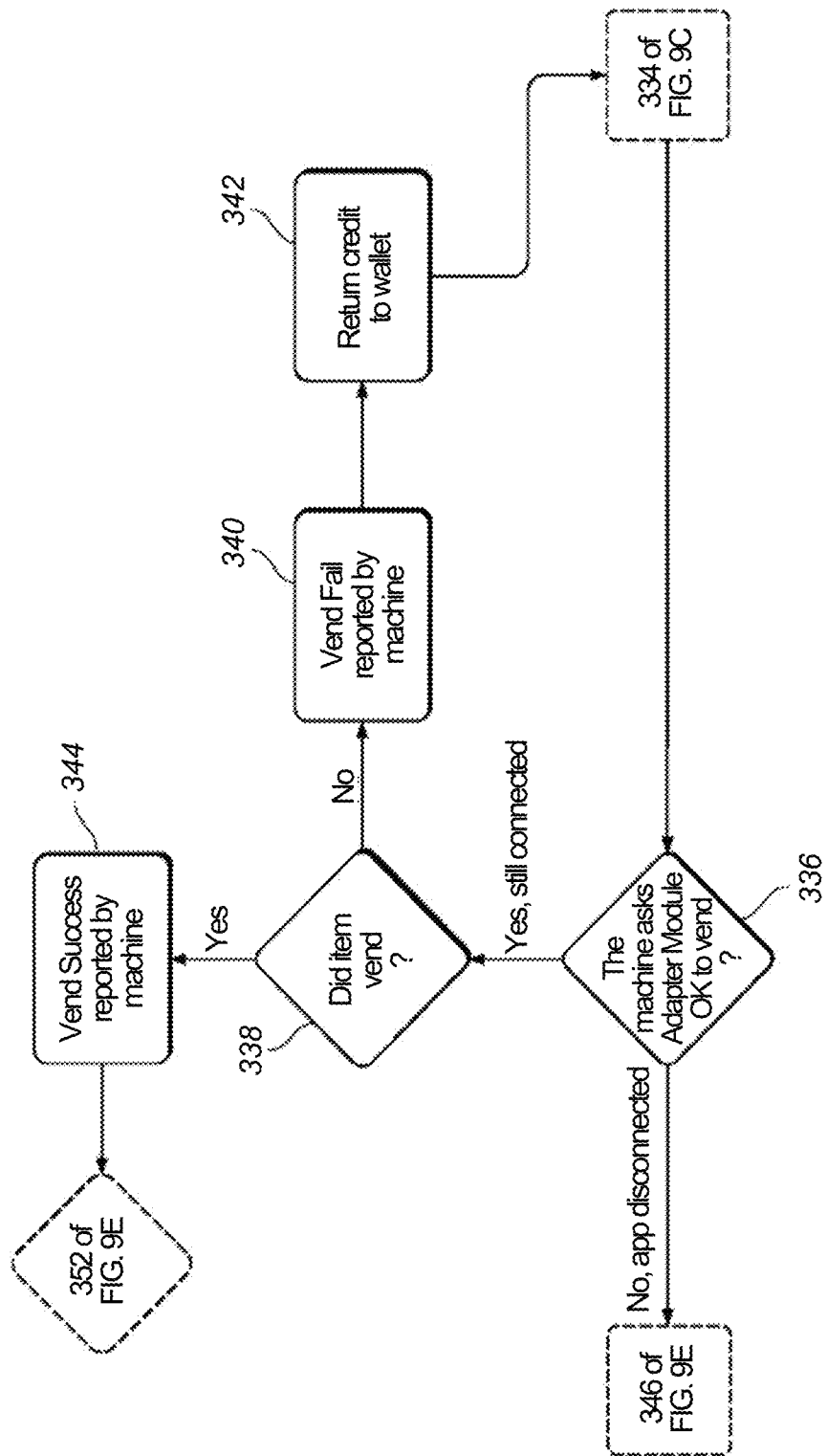

FIGS. 8D, 9C, and 9D generally show the transaction process. As shown in FIG. 9C, the adapter module 100 runs through a series of questions to determine if there are any issues that would prevent vending including: has the user canceled in-app? (block 326), has the user walked away? (block 328), is the coin return pressed? (block 330), has more than a predetermined period of time elapsed? (block 332). If the answer to any of these questions is "yes," the transaction does not proceed. If the answers to all of these questions is "no," the user makes a selection (block 334) on the payment accepting unit 120 in the same or similar manner as compared to if cash or credit were presented to the payment accepting unit 120. If the machine 120 is able to vend (block 336), it attempts to release the product. If the vend fails (block 338) it is reported by the machine (block 340) and a credit is returned to the virtual wallet (block 342). If the vend is successful (block 338) it is reported by the machine (block 344). Put another way, after the transaction is complete, the adapter module 100 returns to the mobile device 150 the details of the transaction as well as an encrypted packet containing the vend details to be sent to the server 130 via the mobile device 150. Optionally, the adapter module 100 can pass additional information not directly related to the transaction such as payment accepting unit health, sales data, error codes, etc.

Figure 9E:
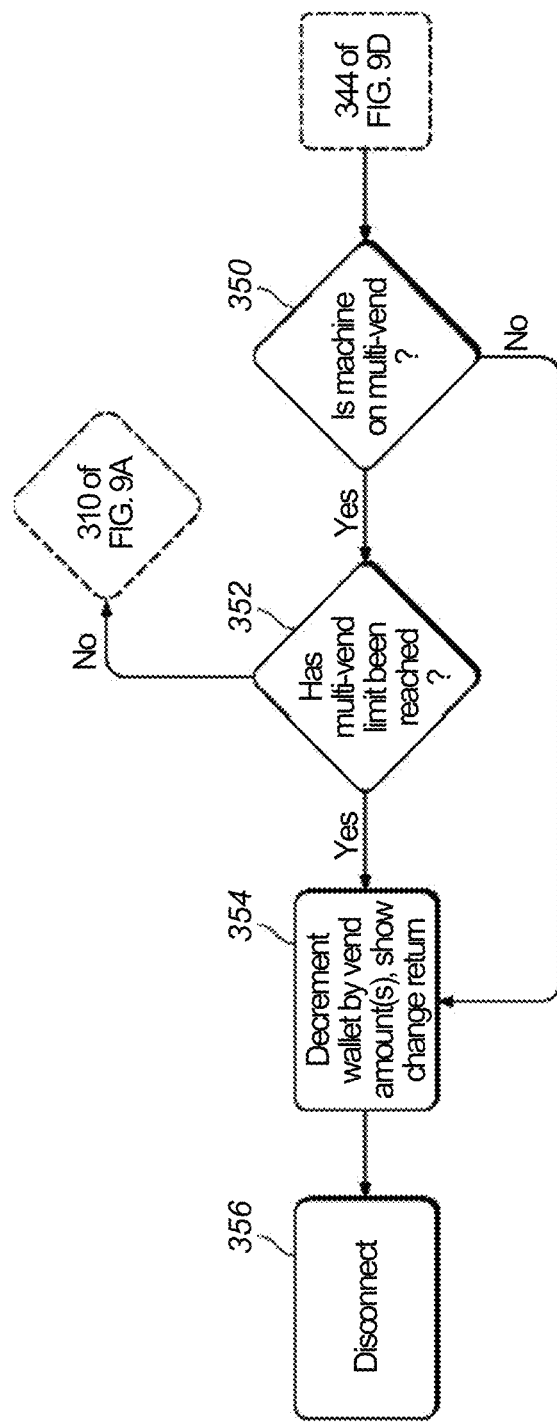
Figure 10B:
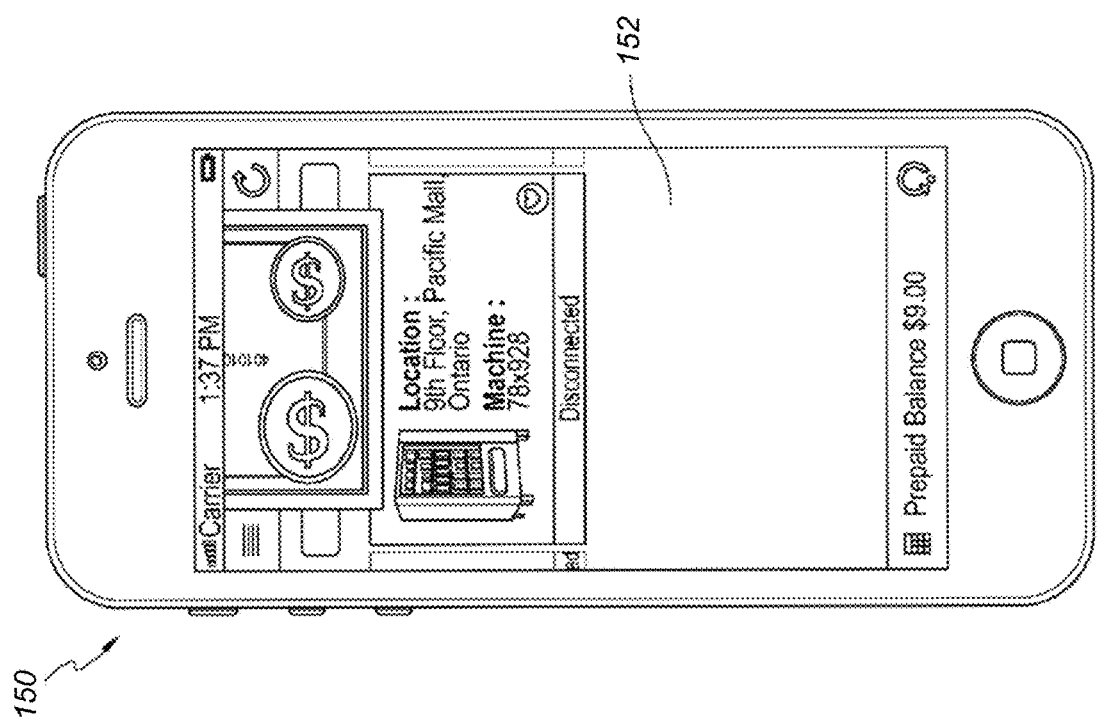
FIGS. 10A-10D show a mobile device with a graphical representation of a mobile application shown thereon, the mobile application being used as part of the mobile-device-to-machine payment processing system in accordance with some implementations.
Figure 10A:
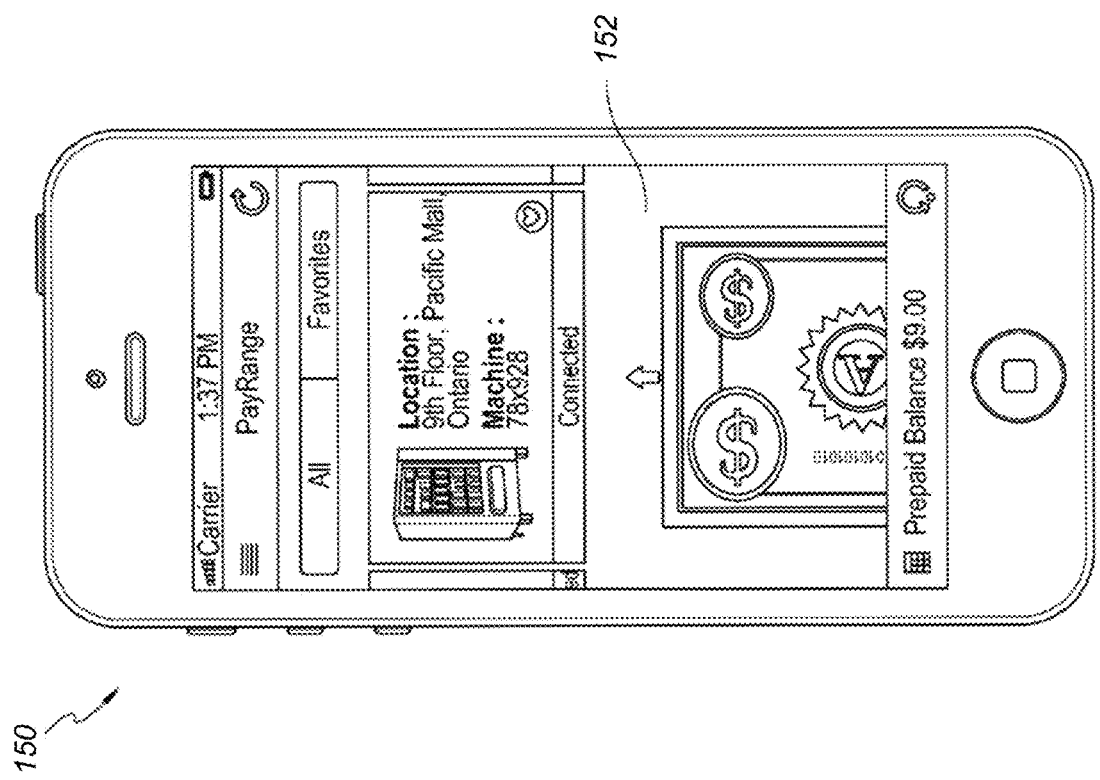
Figure 10D:
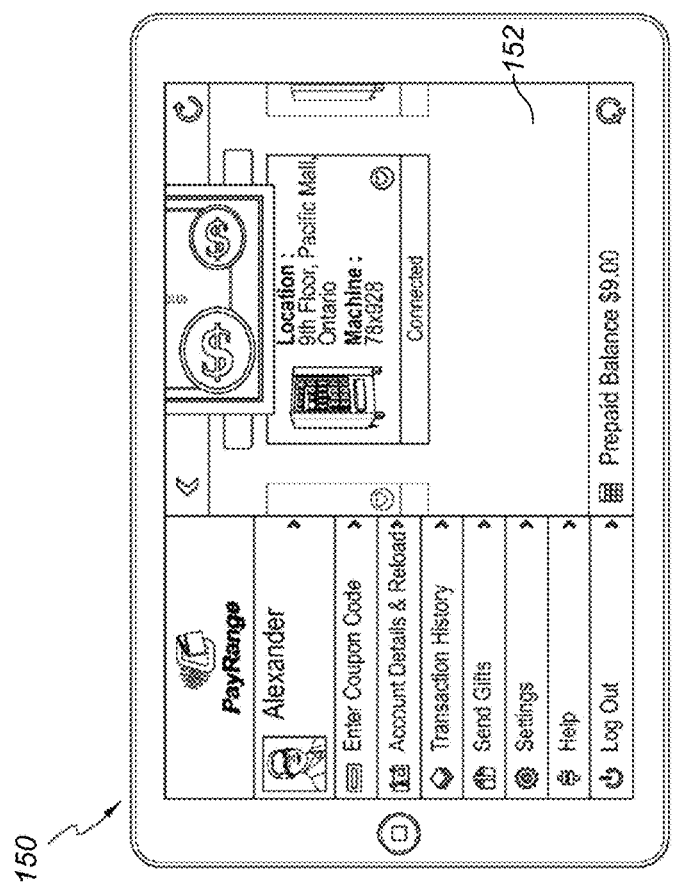
Figure 10C:
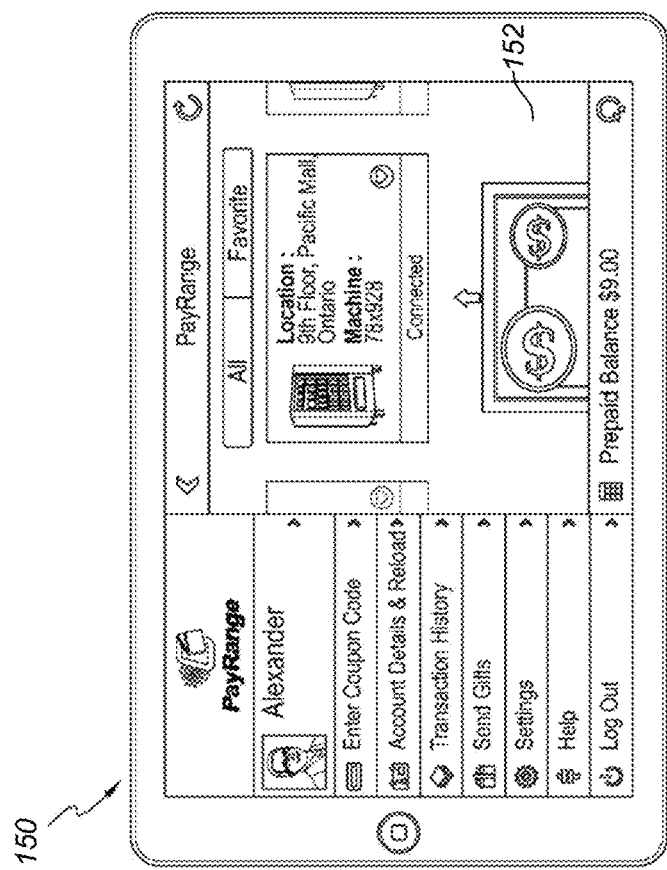
Figure 12:
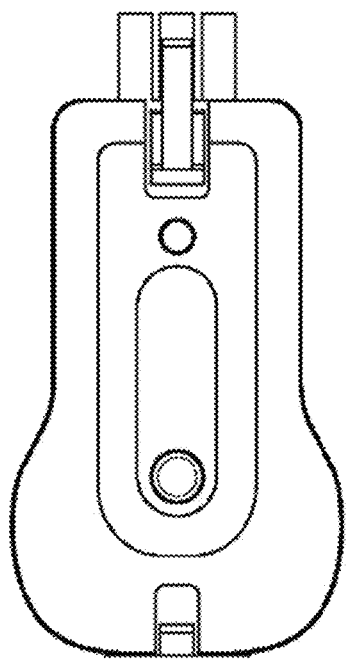
FIG. 12 is a front plan view of the in-line dongle adapter module of FIG. 11 in accordance with some implementations.
Figure 13:
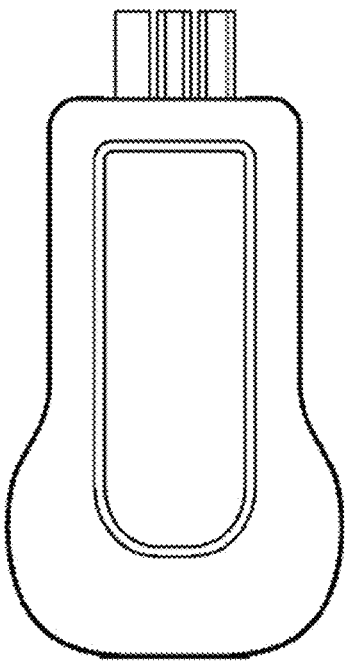
FIG. 13 is a back plan view of the in-line dongle adapter module of FIG. 11 in accordance with some implementations.
Figure 11:
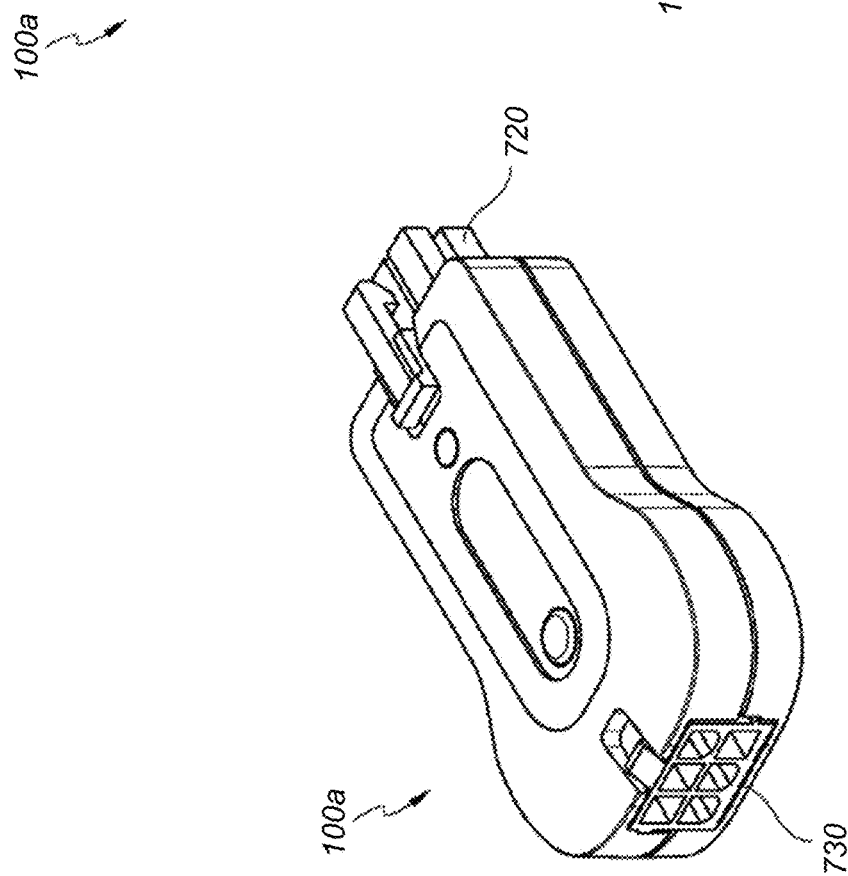
FIG. 11 is a perspective view of the in-line dongle adapter module in accordance with some implementations.

FIGS. 8D and 9E generally show the multi-vend function. If the machine has enabled multi-vend capabilities (block 350) and the multi-vend limit has not been reached, the process returns to the question of whether the user is in the payment zone (block 310 of FIG. 9A). If the machine does not have enabled multi-vend capabilities (block 350) or the multi-vend limit has been reached, the wallet is decremented by the vend amount(s) and "change" is returned to the virtual wallet (block 354) and the process ends (block 356).

Figure 8E:
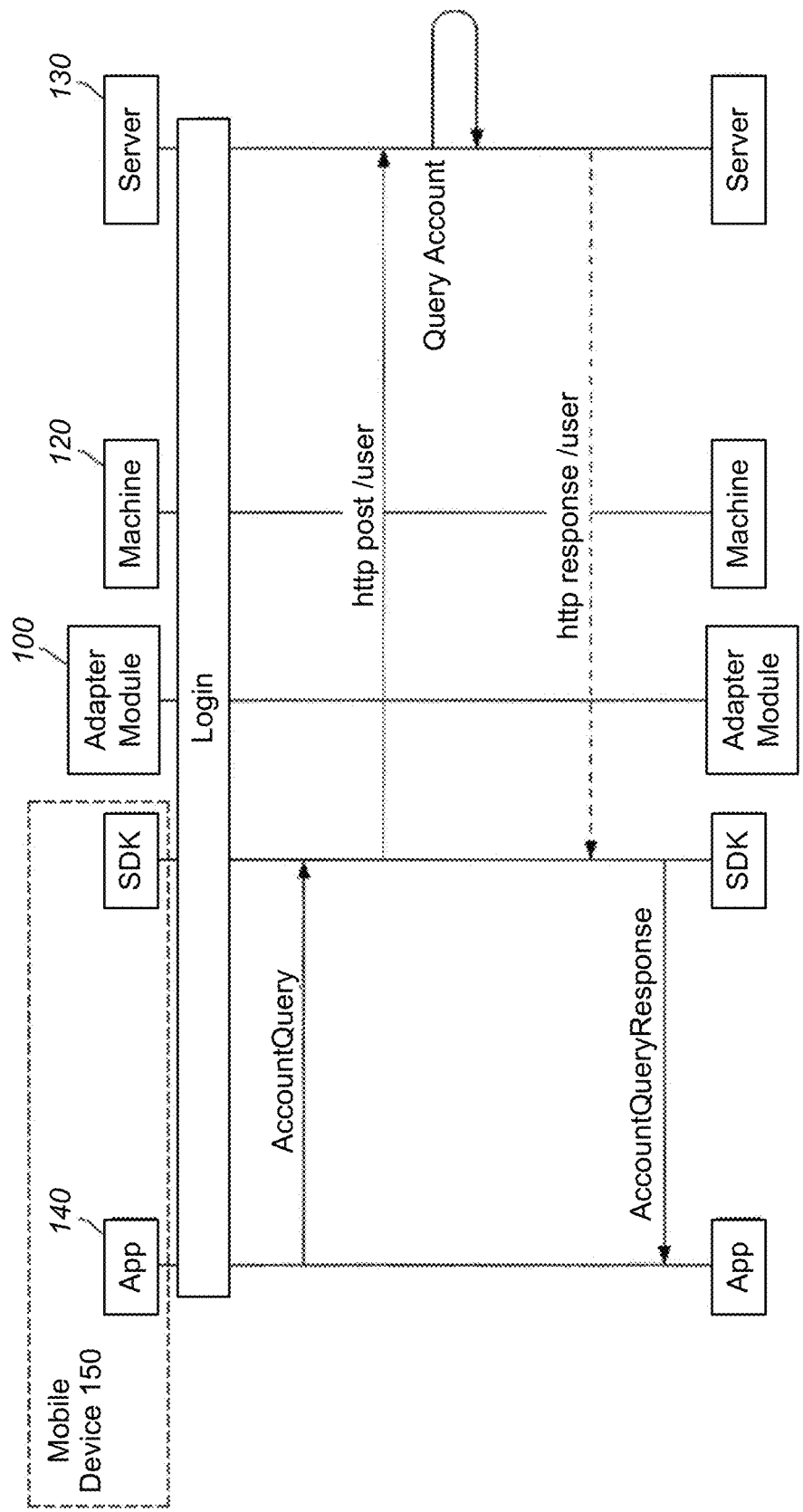
FIG. 8E is a schematic process flow diagram that shows additional elements and features of the payment processing system (e.g., communications, messaging, vending sequence, and purchase flow) in the login mode in accordance with some implementations.
Figure 8F:
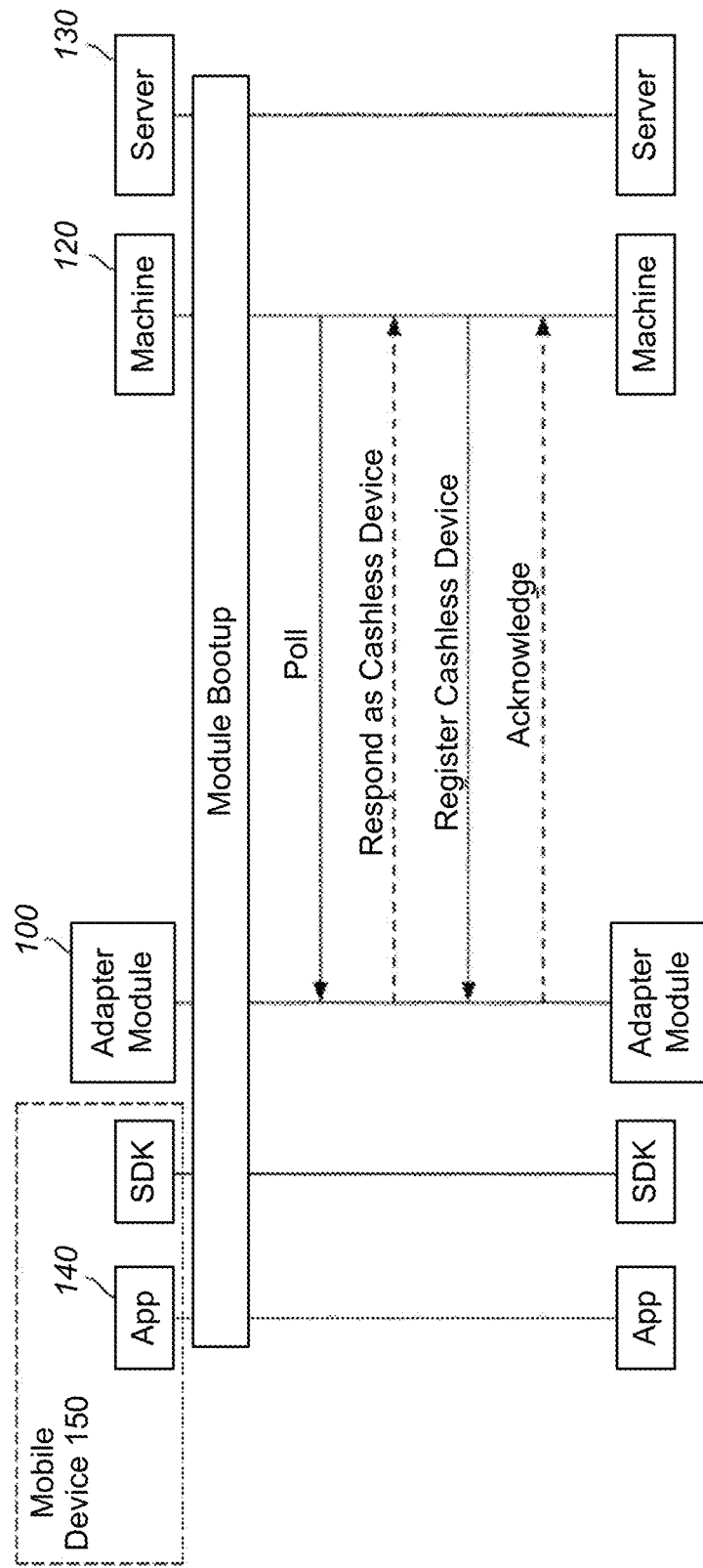
FIG. 8F is a schematic process flow diagram that shows additional elements and features of the payment processing system (e.g., communications, messaging, vending sequence, and purchase flow) during boot-up of the adapter module in accordance with some implementations.
Figure 8G:
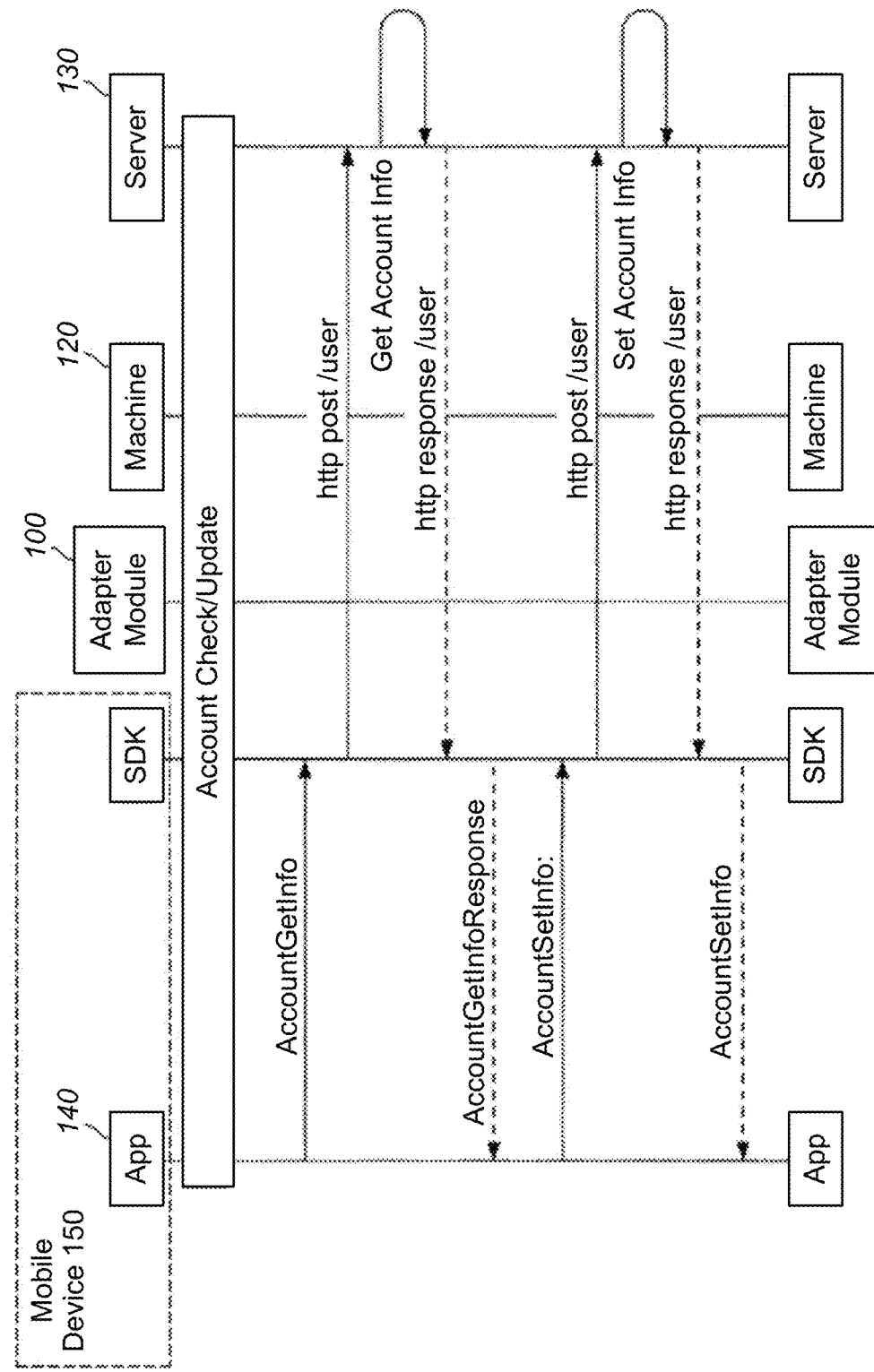
FIG. 8G is a schematic process flow diagram that shows additional elements and features of the payment processing system (e.g., communications, messaging, vending sequence, and purchase flow) during an account check/update process in accordance with some implementations.

FIG. 8E is a schematic flow diagram of an example login process. FIG. 8F is a schematic flow diagram of an example boot-up process. FIG. 8G is a schematic flow diagram of an example account check/update process.

Several of the figures are flow charts (e.g., FIGS. 9A-9E) illustrating methods and systems. It will be understood that each block of these flow charts, components of all or some of the blocks of these flow charts, and/or combinations of blocks in these flow charts, may be implemented by software (e.g., coding, software, computer program instructions, software programs, subprograms, or other series of computer-executable or processor-executable instructions), by hardware (e.g., processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the flow chart block or blocks. These computer program instructions may also be stored in a memory that can direct a computer to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention. This may result, for example, in computer-readable program code being stored in whole on a single memory, or various components of computer-readable program code being stored on more than one memory.

Additional Implementations

Figure 23:
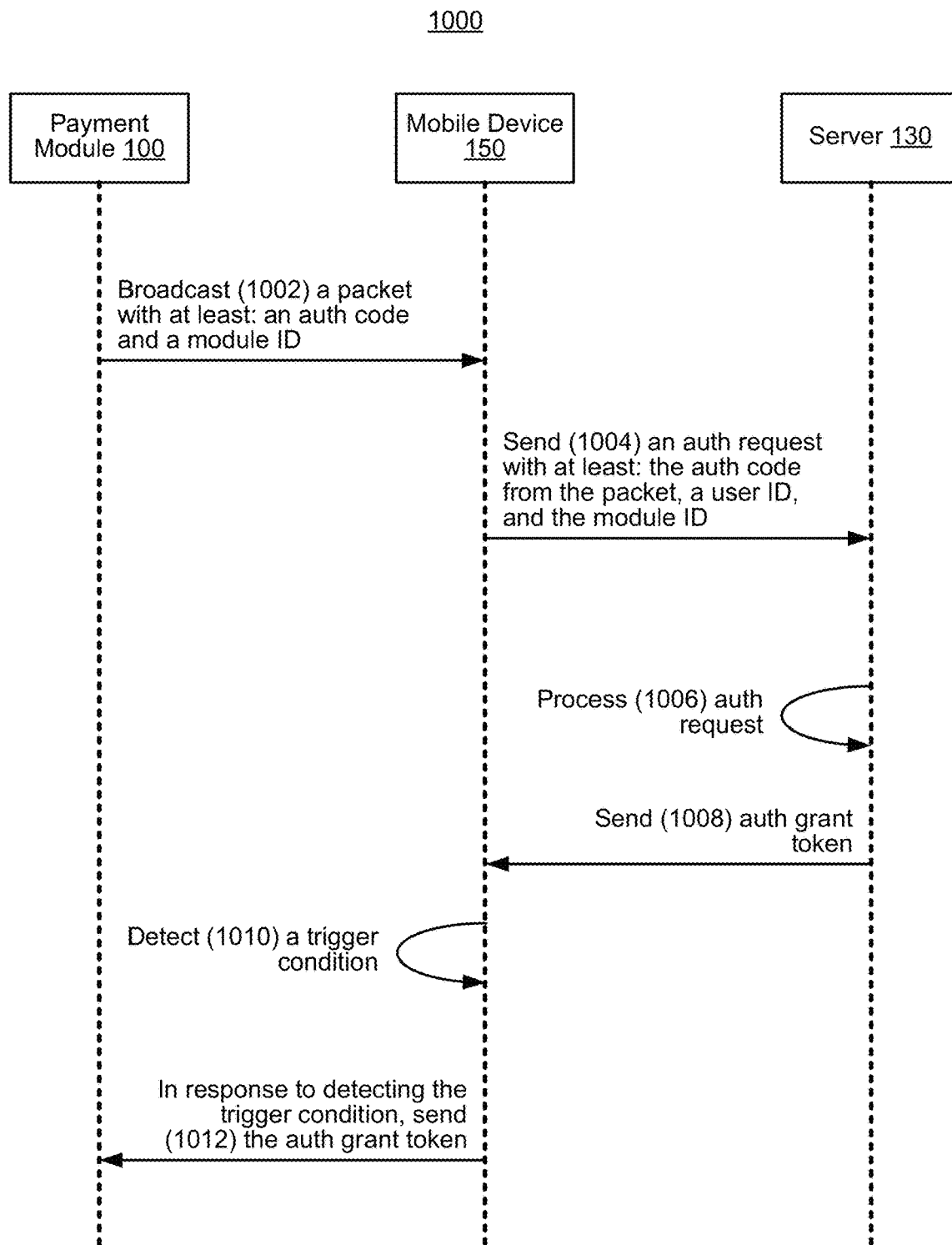
FIG. 23 is a schematic flow diagram of a process for authenticating a user to perform a transaction in the payment processing system in accordance with some implementations.

FIG. 23 illustrates a schematic flow diagram of a process 1000 of authenticating a user to perform a transaction in the payment processing system in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, is associated with an entity that supplies, operates, and/or manufactures the one or more payment modules 100. For brevity, the process 1000 will be described with respect to a respective payment module 100 and a respective mobile device 150 in the payment processing system.

The payment module 100 broadcasts (1002), via a short-range communication capability (e.g., BLE), a packet of information (sometimes also herein called "advertised information"). The packet of information at least includes an authorization code and an identifier associated with the payment module 100 (module ID). In some implementations, the packet of information further includes a firmware version of the payment module 100 and one or more status flags corresponding to one or more states of the payment module 100 and/or the payment accepting unit 120. The information included in the packet broadcast by the payment module 100 is further discussed below with reference to FIG. 24A.

In some implementations, the payment module 100 sends out a unique authorization code every X seconds (e.g., 100 ms, 200 ms, 500 ms, etc.). In some implementations, the unique authorization codes are randomly or pseudo-randomly generated numbers. In some implementations, the payment module 100 stores broadcasted authorization codes until a received authorization grant token matches one of the stored authorization codes. In some implementations, the payment module 100 stores broadcasted authorization codes for a predetermined amount of time (e.g., Y minutes) after which time an authorization code expires and is deleted. In some implementations, the authorization code is encrypted with a shared secret key known by the server 130 but unique to the payment module 100. In some implementations, the payment module 100 initializes a random number and then the authorization codes are sequential counts from this random number. In such implementations, the payment module 100 stores the earliest valid (unexpired) counter without a need to store every valid authorization code. In some implementations, the authentication code included in the broadcast packet of information is a hash value of the randomly or pseudo-randomly generated number or the sequential number.

The mobile device 150 receives the broadcasted packet of information, and the mobile device 150 sends (1004), via a long-range communication capability (e.g., GSM, CDMA, Wi-Fi, or the like), an authorization request to the server 130. For example, an application 140 that is associated with the payment processing system is executing as a foreground or background process on the mobile device 150. In this example, the application 140 receives the broadcasted packet of information when the mobile device 150 is within the communication zone of the payment module 100 (i.e., BLE range) and either automatically sends the authorization request to the server 130 or sends the authorization request to the server 130 when the mobile device 150 is within the authorization zone of the payment module 100. In some implementations, the broadcasted packet of information includes a baseline authorization zone threshold (i.e., an authorization zone criterion) indicating a baseline RSSI that the mobile device 150 (or the application 140) is required to observe before being within the authorization zone of the payment module 100. In some implementations, the mobile device 150 (or the application 140) offsets the baseline authorization zone threshold based on the strength and/or reception of the short-range communication capability (e.g., BLE radio/transceiver) of the mobile device 150. In some implementations, the authorization request at least includes the authorization code which was included in the broadcasted packet of information, an identifier associated with the user of the mobile device 150 or the user account under which the user of the mobile device 150 is logged into the application 140 (user ID), and the identifier associated with the payment module 100 (module ID). In some implementations, the authentication code included in authorization request is the hash value in cleartext. The authorization request is further discussed below with reference to FIG. 24B.

After receiving the authorization request, the server 130 processes (1006) the authorization request. In some implementations, the server 130 decrypts the authorization code included in the authorization request with the shared secret key corresponding to the payment module 100. In some implementations, the server 130 determines whether the user associated with the user ID in the authorization request has sufficient funds in his/her account for the payment processing system to perform a transaction at the machine 120 that is associated with the payment module 100 corresponding to the module ID in the authorization request.

The server 130 sends (1008), via a long-range communication capability (e.g., GSM, CDMA, Wi-Fi, or the like), an authorization grant token to the mobile device 150. In some implementations, the server 130 does not send the authorization grant token if the authorization code in the authorization request cannot be decrypted with the shared secret key corresponding to the payment module 100 (e.g., the authorization code is corrupted or hacked). In some implementations, the server 130 does not send the authorization grant token if the user associated with the user ID in the authorization request does not have sufficient funds in his/her account. In some implementations, in addition to the authorization grant token, the server 130 sends a message directly to the mobile device 150 which is not encrypted with the shared secret key corresponding to the payment module 100. After receiving the message, the mobile device 150 displays an appropriate message to the user such as insufficient balance or declined authorization. In some implementations, the server 130 sends an authorization grant token for an amount equal to zero: in which case, the payment module 100 interprets this as a declined or failed authorization which can result for any number of reasons including, but not limited to, insufficient balance or credit.

The mobile device 150 receives the authorization grant token, and, subsequently, the mobile device 150 detects (1010) a trigger condition. In some implementations, the mobile device 150 (or the application 140) detects the trigger condition via the hand-free mode (e.g., upon entrance into the payment zone of the payment module 100) or manual mode (e.g., interacting with the user interface of the application 140 to initiate a transaction with the payment accepting unit associated with the payment module 100).

In some implementations, unused authorization grants (e.g., if there was no trigger condition or it expired) are canceled by the mobile device 150 by sending a cancellation message to the server 130 corresponding to the unused authorization grant. In some implementations, the server 130 denies or limits the number of authorization grants sent to the mobile device 150 until it has received transaction information or cancellation of authorization outstanding authorization grants sent to the mobile device 150.

In response to detecting the trigger condition, the mobile device 150 sends (1012), via a short-range communication capability (e.g., BLE), the authorization grant token to the payment module 100. Subsequently, the machine 120 displays credit to the user (e.g., via one of the displays 122 or 124 shown in FIG. 19) and the user interacts with the input mechanisms of the machine 120 (e.g., via the buttons 126 or a touch screen display 124 shown in FIG. 19) to purchase products and/or services.

Figure 24A:
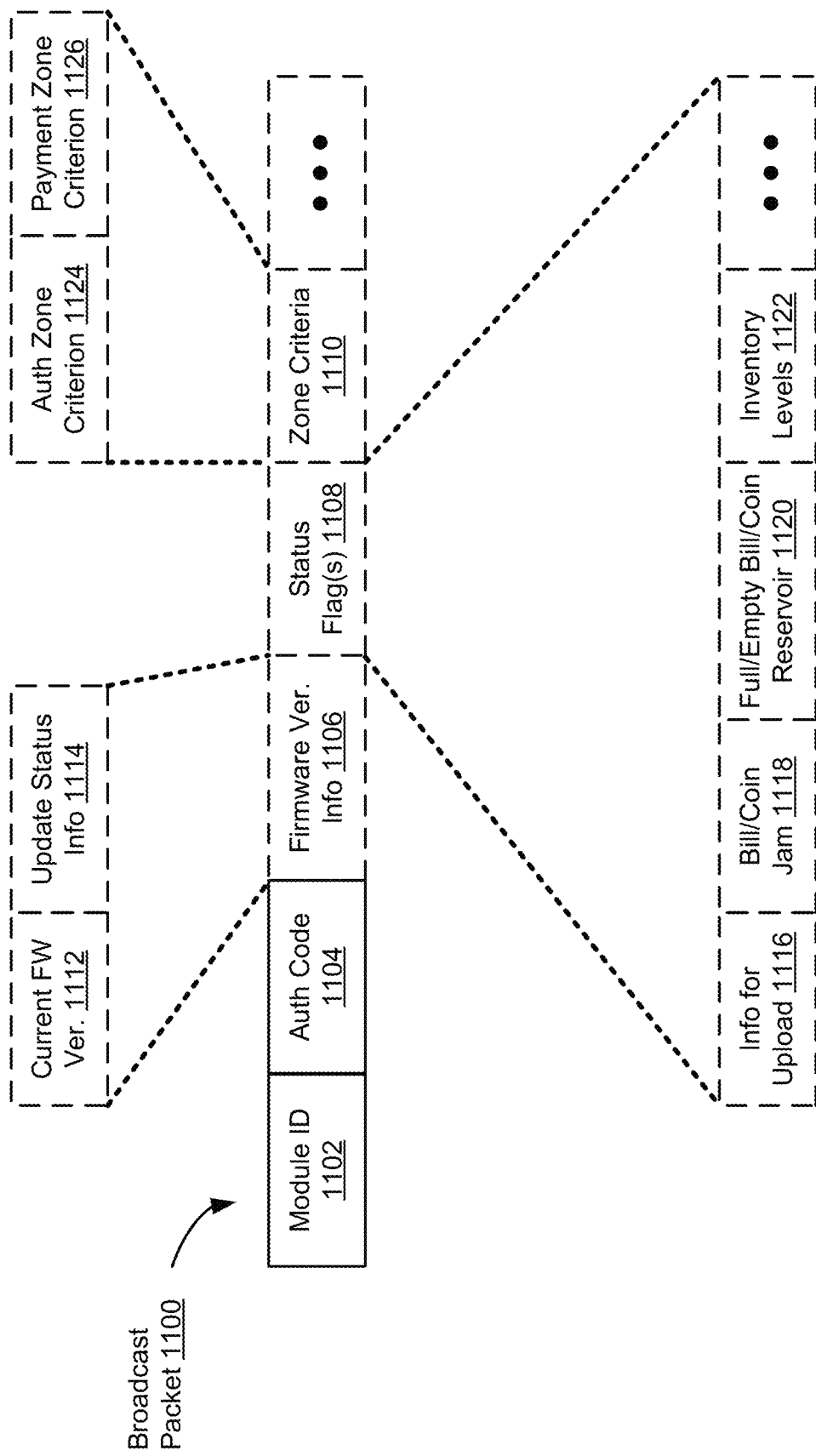
FIG. 24A is a block diagram of a packet of information broadcast by the payment module (sometimes also herein called the "adapter module") in accordance with some implementations.

FIG. 24A illustrates a block diagram of a packet 1100 of information broadcast by the payment module 100 (e.g., in step 1002 of the process 1000 in FIG. 23) in accordance with some implementations. In some implementations, the packet 1100 at least includes: module ID 1102 and authorization code 1104. In some implementations, the packet 110 additional includes: a firmware version 1106 and one or more status flags 1108.

In some implementations, the module ID 1102 is a unique identifier corresponding to the payment module 100 (sometimes also herein called the "adapter module 100") that broadcast the packet 1100.

In some implementations, the authorization code 1104 is a hash value in cleartext. In some implementations, the payment module 100 randomly or pseudo-randomly generates a number or determines a sequential number (See step 1002 of process 1000 in FIG. 23) and performs a predetermined hash function (e.g., SHA-256) on the number to produce the hash value as the authorization code 1104. In some implementations, the authorization code 1104 is a unique code that is encrypted with a secret encryption key corresponding to the payment module 100. The secret encryption key is shared with the server 130, which enables the server 130 to decrypt the authorization code 1104 and encrypt the authorization grant token but not the mobile device 150. In some implementations, the encryption between server 130 and payment module 100 is accomplished by two pairs of public/private keys.

In some implementations, the firmware version information 1106 identifies a current firmware version 1112 of the payment module 100. In some implementations, the firmware version information 1106 also includes update status information 1114 indicating one or more packets received by the payment module 100 to update the firmware or one or more packets needed by the payment module 100 to update the firmware. See FIGS. 26A-26B and 30A-30D and the accompanying text for further discussion regarding updating the firmware of the payment module 100.

In some implementations, the one or more status flags 1108 indicate a state of the payment module 100 and/or the payment accepting unit 120 associated with the payment module 100. In some implementations, the one or more status flags 1108 indicate a state of the payment module 100 such upload information indicator 1116 indicating that that the payment module 100 has information to be uploaded to the server 130 (e.g., transaction information for one or more interrupted transactions). In some implementations, upload information indicator 1116 triggers the mobile device 150 to connect to payment module 100 immediately (e.g., if it has interrupted transaction information to be uploaded to the server 130). See FIGS. 25A-25B and 29A-29C and the accompanying text for further discussion regarding interrupted transactions. In some implementations, the one or more status flags 1108 indicate a state of the payment accepting unit 120 including one or more of an error indicator 1118 (e.g., indicating that a bill and/or coin acceptor of the payment accepting unit 120 is experiencing a jam, error code, or malfunction), a currency level indicator 1120 (e.g., indicating that the level of the bill and/or coin acceptor reservoir of the payment accepting unit 120 is full or empty), and/or inventory level(s) indicator 1122 (e.g., indicating that one or more products of the payment accepting unit 120. In some implementations, the one or more status flags 1108 are error codes issued by payment accepting unit 120 over the MDB.

In some implementations, the zone criteria information 1110 specifies an authorization zone criterion 1124 (e.g., a baseline authorization zone threshold indicating a baseline RSSI that the mobile device 150 (or the application 140) is required to observe before being within the authorization zone of the payment module 100) and/or a payment zone criterion 1126 (e.g., a baseline payment zone threshold indicating a baseline RSSI that the mobile device 150 (or the application 140) is required to observe before being within the payment zone of the payment module 100). In some implementations, the baseline authorization zone threshold and the baseline payment zone threshold are default values determined by the server 130 or stored as variables by the application 140, in which case the authorization zone criterion 1124 and payment zone criterion 1126 are offsets to compensate for the strength and/or reception of the short-range communication capability (e.g., BLE radio/transceiver) of the payment module 100. Alternatively, zone criteria information 1110 includes a spread between the baseline authorization zone threshold and the baseline payment zone threshold. Thus, the mobile device 150 (or the application 140) determines the baseline authorization zone threshold and the baseline payment zone threshold based on the spread value and a default value for either the baseline authorization zone threshold or the baseline payment zone threshold. For example, the spread indicates −10 db and the default baseline payment zone threshold is −90 db: thus, the baseline authorization zone threshold is −80 db. Continuing with this example, after determining the baseline authorization zone threshold and the baseline payment zone threshold, the mobile device 150 (or the application 140) may further adjust the authorization zone threshold and/or the payment zone threshold based on the strength and/or reception of its short-range communication capability (i.e., BLE radio/transceiver).

Figure 24B:
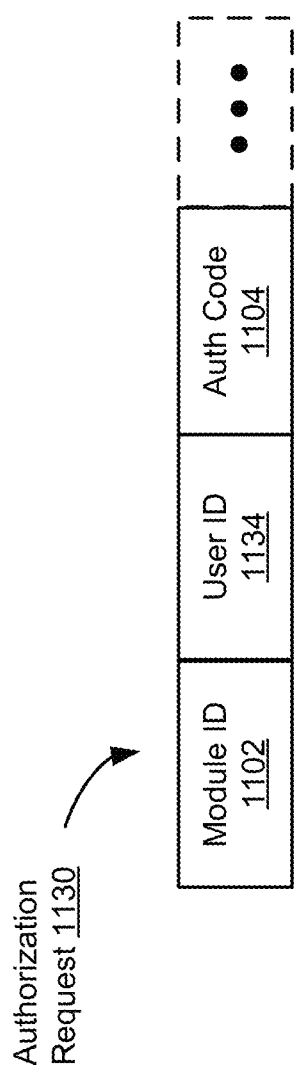
FIG. 24B is a block diagram of an authorization request in accordance with some implementations.

FIG. 24B is a block diagram of an authorization request 1130 sent by the mobile device 150 to the server 130 (e.g., in step 1004 of the process 1000 in FIG. 23) in accordance with some implementations. In some implementations, the authorization request 1130 at least includes: a module ID 1102, a user ID 1134, and an authorization code 1104.

In some implementations, the module ID 1102 is a unique identifier corresponding to the payment module 100 that broadcast the 1100 that included the authorization code 1104.

In some implementations, the user ID 1134 is an identifier associated with the user of the mobile device 150 sending the authorization request 1130 to the server 130. In some implementations, the user ID 1134 is associated with the user account under which the user of the mobile device 150 is logged into the application 140.

In some implementations, the authorization code 1130 includes the authorization code 1104 included in the packet 1100 of information that was broadcast by the payment module 100.

Figure 24C:
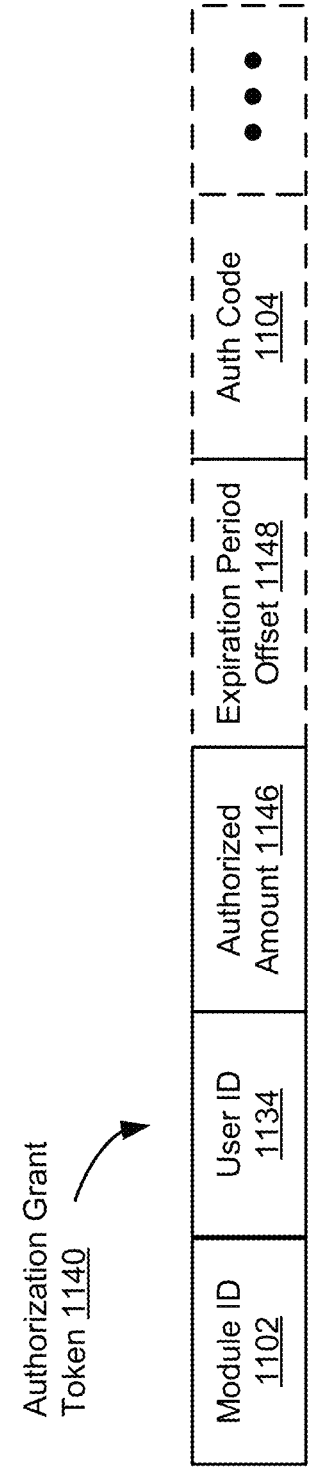
FIG. 24C is a block diagram of an authorization grant token in accordance with some implementations.

FIG. 24C is a block diagram of an authorization grant token 1140 sent by the server 130 to the mobile device 150 (e.g., in step 1008 of the process 1000 in FIG. 23) in accordance with some implementations. In some implementations, in accordance with a determination that the authorization code 1136 included in the authorization request 1130 from the mobile device 150 is valid and that the user associated with the mobile device 150 has sufficient funds in his/her account for the payment processing system, the server 130 generates the authorization grant token 1140. In some implementations, the authorization grant token 1140 at least includes: a module ID 1102, a user ID 1134, an authorized amount 1146, (optionally) an expiration period offset 1148, and (optionally) the authorization code 1104.

In some implementations, the module ID 1102 is a unique identifier corresponding to the payment module 100 that broadcast the packet 1100 that included the authorization code 1104.

In some implementations, the user ID 1134 is an identifier associated with the user of the mobile device 150 that sent the authorization request 1130 to the server 130.

In some implementations, the authorized amount 1146 indicates a maximum amount for which the user of the mobile device 150 is authorized for a transaction using the authorization grant token 1140. For example, the authorized amount 1146 is predefined by the user of the mobile device 150 or by the server 130 based on a daily limit or based on the user's total account balance or based on a risk profile of the user correspond to the user ID 1134.

In some implementations, the expiration period 1148 offset indicates an offset to the amount of time that the payment module 100 holds the authorization grant token 1140 valid for initiation of a transaction with the machine 120 associated with the payment module 100. For example, the expiration period offset 1148 depends on the history and credit of the user of mobile device 150 or a period predefined by the user of mobile device 150.

In some implementations, the authorization grant token 1140 further includes the authorization code 1104 that was included in the authorization request 1130. In some implementations, when the authorization code 1104 is the hash value, the server 130 encrypts the authorization grant token 1140 including the hashed value with the shared secret encryption key associated with payment module 100. Subsequently, when mobile device 150 sends the authorization grant token 1140 to payment module 100 after detecting a trigger condition, the payment module 100 decrypts the authorization grant token 1140 using the secret key known only to server 130 and payment module 100 (which authenticates the message and the authorization grant), and then matches the hash value included in the decrypted authorization grant token 1140 to previously broadcast valid (unexpired) hash values (i.e., auth codes) to determine validity of the (which was known only by payment module 100).

Figure 24D:
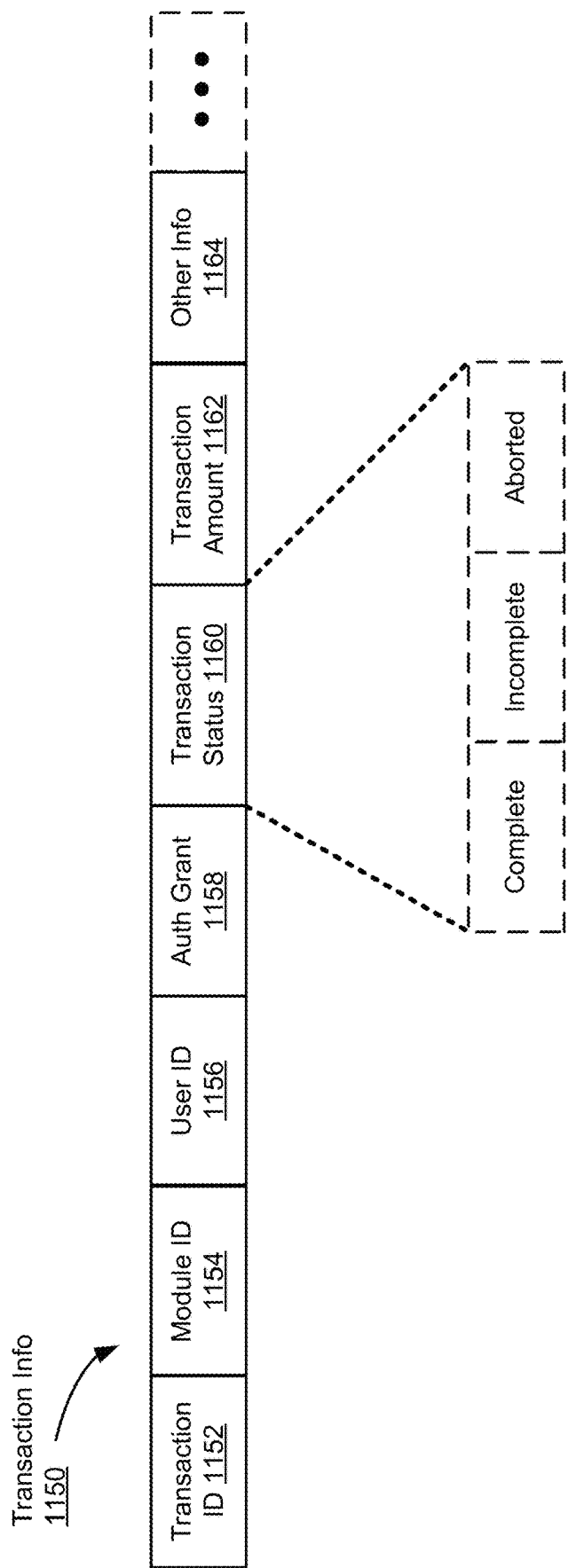
FIG. 24D is a block diagram of transaction information generated by the payment module in accordance with some implementations.

FIG. 24D illustrates a block diagram of transaction information 1150 generated by the payment module 100 (e.g., in step 1204 of the process 1200 in FIG. 25A) in accordance with some implementations. In some implementations, the transaction information 1150 includes: a transaction ID 1152 for the respective transaction, a module ID 1154, a user ID 1156, (optionally) the authorization code 1158, transaction status information 1160, the transaction amount 1162, and other information 1164.

In some implementations, the transaction ID 1152 is a unique identifier corresponding to the respective transaction. In some implementations, the transaction ID 1152 is encoded based on or associated with the time and/or date on which and the location at which the respective transaction took place.

In some implementations, the module ID 1154 is a unique identifier corresponding to the payment module 100 that performed the respective transaction.

In some implementations, the user ID 1156 is an identifier associated with the user of the mobile device 150 that initiated the respective transaction.

In some implementations, the authorization code 1158 corresponds to the original authorization code (e.g., auth code 1104, FIGS. 24A-24C) and/or authorization grant token (e.g., auth grant token 1140, FIG. 24C) that was used to initiate the respective transaction. In some implementations, the authorization code 1156 is encrypted with a unique encryption key corresponding to the payment module 100.

In some implementations, the transaction status information 1160 includes an indication whether the respective transaction was completed, not-completed, or aborted. For example, the respective transaction is incomplete if a jam occurred at the payment accepting unit 120 and the user did not receive the product associated with the respective transaction. For example, if the user walks away from the payment accepting unit 120 after money was credited for the respective transaction, the respective transaction is aborted. In another example, if respective transaction times out after a predetermined time period because the user failed to select a product at the payment accepting unit 120, the respective transaction is aborted. In another example, if the user actuates a bill or coin return mechanism of the payment accepting unit 120, the respective transaction is aborted.

In some implementations, the transaction amount 1162 indicates the amount of the respective transaction or the amount of each of multiple transactions (e.g., in a multi-vend scenario). In some implementations, the transaction amount 1162 is encrypted with a unique encryption key corresponding to the payment module 100.

In some implementations, the other information 1164 includes other information related to the respective transaction such as the items dispensed by the payment accepting unit 120 and the type of transaction (e.g., coins, bills, credit card, manual mode, hands-free mode, etc.). In some implementations, the other information 1164 includes other information related to the payment module 100 and/or the payment accepting unit 120 associated with the payment module 100. For example, the other information 1164 includes a verification request to the server 130 in order to implement new firmware. See FIGS. 26A-26B and the accompanying text for further discussion of the verification request. In another example, the other information 1164 includes transaction information from one or more previous interrupted transactions. In another example, the other information 1164 includes transaction information for one or more transactions paid via bills and/or coins. In another example, the other information 1164 includes inventory information as to one or more products of the payment accepting unit 120.

Figure 25A:
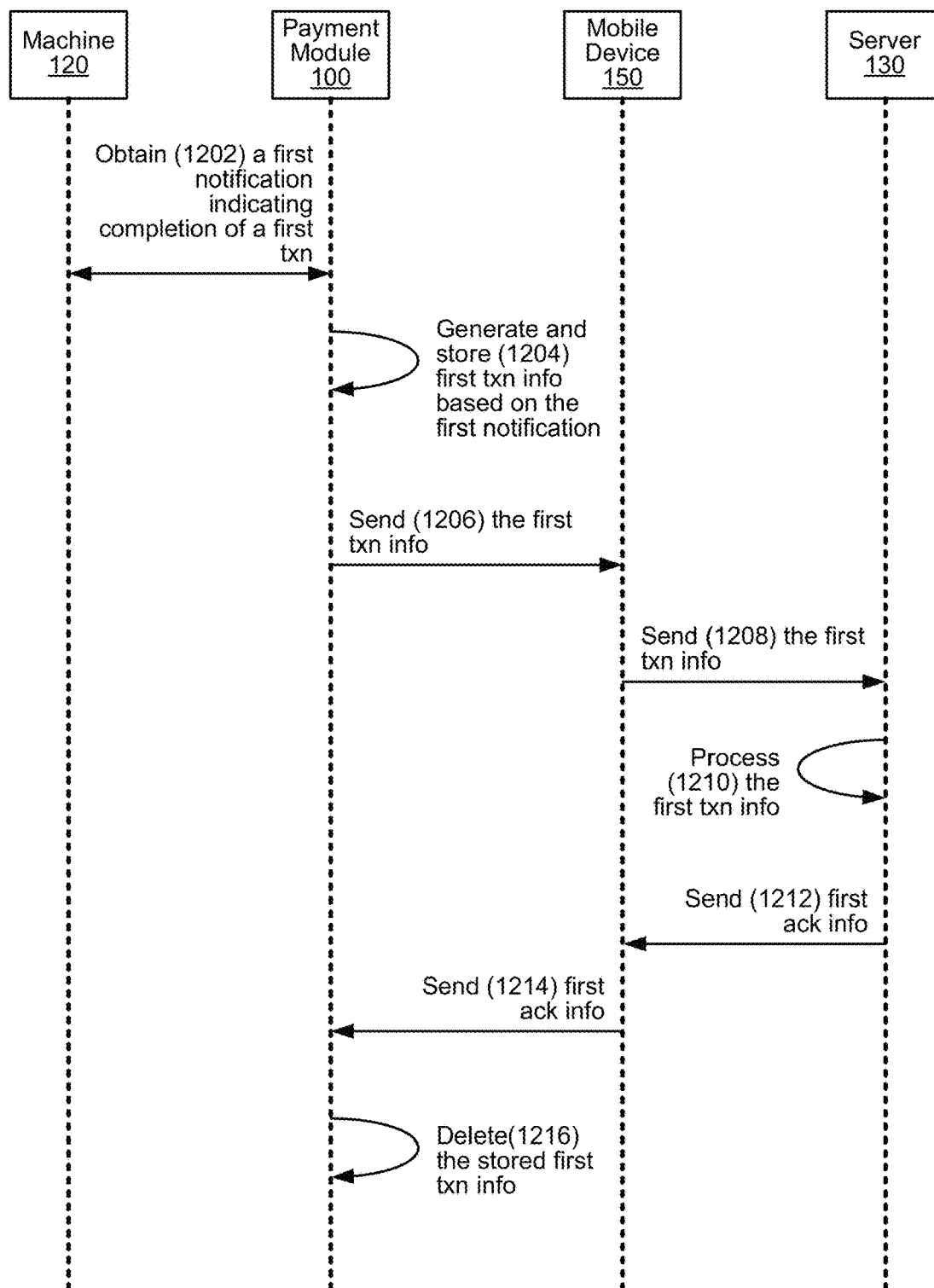
FIG. 25A is a schematic flow diagram of a process for processing acknowledgment information in the payment processing system in accordance with some implementations.

FIG. 25A illustrates a schematic flow diagram of a process 1200 of processing acknowledgement information in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, supplies, operates, and/or manufactures the one or more payment modules 100. For brevity, the process 1200 will be described with respect to a respective payment module 100 associated with a respective payment accepting unit 120 (machine 120) and a respective mobile device 150 in the payment processing system. In the process 1200, the payment module 100 receives first acknowledgment information for a first transaction via the mobile device 150 that initiated the first transaction.

The payment module 100 obtains (1202) a first notification indicating completion of a first transaction from the machine 120. For example, after the process 1000 in FIG. 23, the user of the mobile device 150 selects a product to purchase from the machine 120 by interacting with one or more input mechanisms of the machine 120 (e.g., buttons 126 or a touch screen display 124 shown in FIG. 19), and the machine 120) dispenses the selected product. Continuing with this example, after the product is dispensed, the transaction is complete and the payment module 100 obtains a notification from the machine of the completed transaction. In some implementations, the notification includes the amount of the transaction and (optionally) machine status information associated with the machine 120 such as inventory information as to one or more products of the payment accepting unit 120 and/or the like.

After obtaining the first notification, the payment module 100 generates (1204) first transaction information based on the first notification, and the payment module 100 stores the first transaction information. In some implementations, the transaction information includes a transaction ID for the first transaction, a module ID corresponding to payment module 100, a user ID corresponding to the mobile device 150, transaction status information indicating that the first transaction is complete, and the transaction amount indicated by the first notification. In some implementations, the payment module 100 retains the authorization code included in the original broadcasted packet and/or the authorization grant token and includes the authorization code in the first transaction information. In some implementations, the authorization code is encrypted with a secret key corresponding to the payment module 100, which is shared with the server 130 but not the mobile device 150. In some implementations, the first transaction information further includes other information such as the machine status information included in the first notification or transaction information corresponding to previous interrupted transaction(s). See FIG. 24D and the accompanying text for further discussion regarding transaction information 1150.

The payment module 100 sends (1206), via a short-range communication capability (e.g., BLE), the first transaction information to the mobile device 150.

The mobile device 150 sends (1208), via a long-range communication capability (e.g., GSM, CDMA, Wi-Fi, or the like), the first transaction information to the server 130.

The server 130 processes (1210) the first transaction information. For example, the server 130 debits the account of the user associated with the user ID in the first transaction information in the amount indicated by the first transaction information.

The server 130 sends (1212), via a long-range communication capability (e.g., GSM, CDMA, Wi-Fi, or the like), first acknowledgment information to the mobile device 150. In some implementations, the first acknowledgment information acknowledges that the server 130 received the first transaction information. In some implementations, the first acknowledgment information includes the user ID, the module ID, the transaction ID, and (optionally) the authorization grant included in the transaction information (e.g., auth grant 1158, FIG. 24D).

After receiving the first acknowledgement information, the mobile device 150 sends (1214), via a short-range communication capability (e.g., BLE), the first acknowledgment information to the payment module 100.

After receiving the first acknowledgment information, the payment module 100 deletes (1216) the stored first transaction information.

Figure 25B:
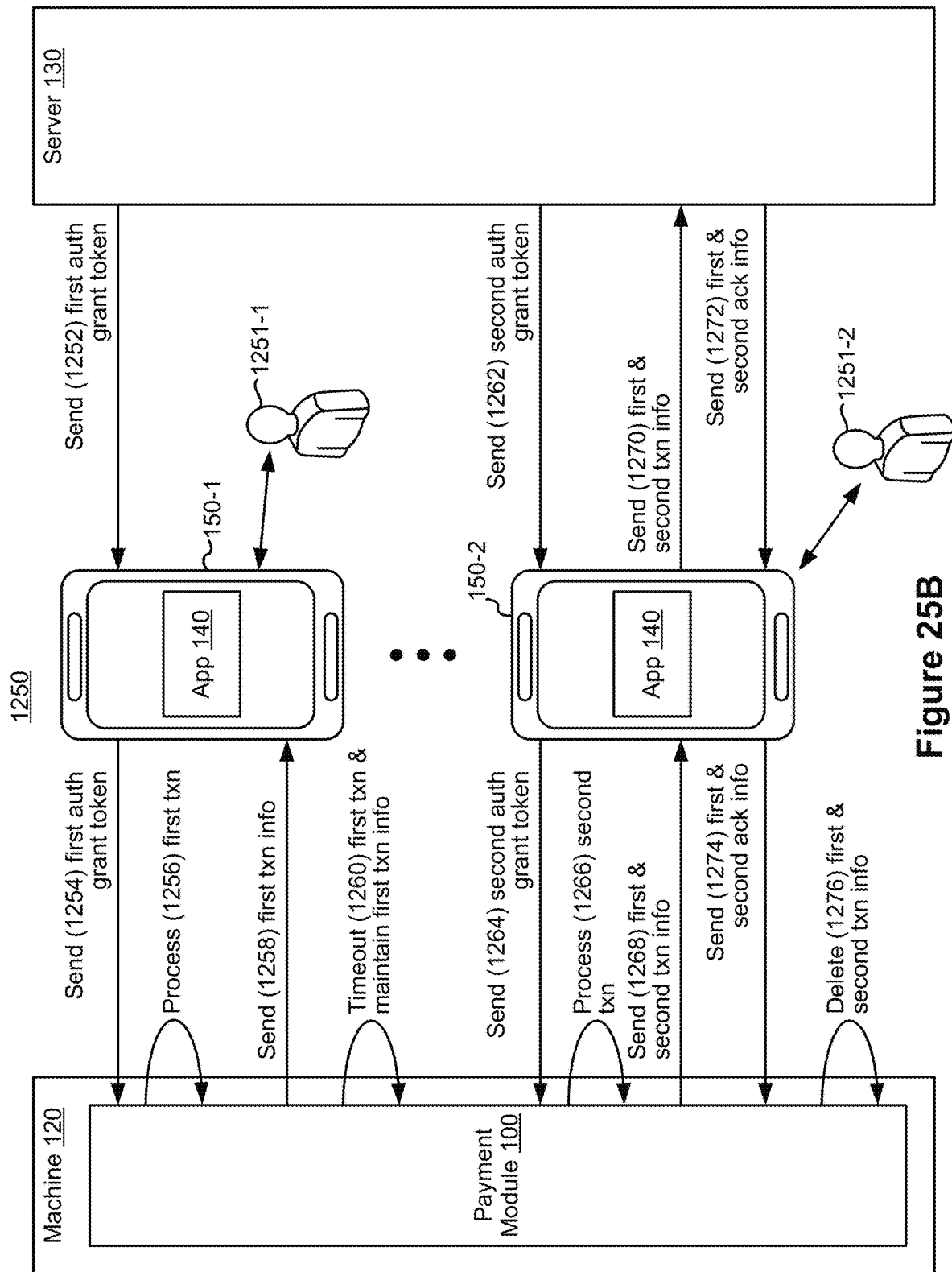
FIG. 25B is a schematic flow diagram of a process for processing interrupted transactions in the payment processing system in accordance with some implementations.

FIG. 25B illustrates a schematic flow diagram of a process 1250 of processing interrupted transactions in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, supplies, operates, and/or manufactures the one or more payment modules 100. For brevity, the process 1250 will be described with respect to a respective payment module 100 associated with a respective payment accepting unit 120 (machine 120) and a respective mobile device 150 in the payment processing system. In the process 1250, the payment module 100 receives first acknowledgment information for a first transaction via a second mobile device 150-2 that did not initiate the first transaction.

After receiving a first authorization request associated with a first authorization code from a first mobile device 150-1, the server 130 sends (1252), via a long-range communication capability (e.g., GSM, CDMA, Wi-Fi, or the like), a first authorization grant token to the first mobile device 150-1 associated with a first user 1251-1.

After receiving the first authorization grant token and in response to detecting a trigger condition (e.g., via the hand-free mode or the manual mode), the first mobile device 150-1 sends (1254), via a short-range communication capability (e.g., BLE), the first authorization grant token to the payment module 100 associated with the machine 120 in order to initiate a first transaction.

The payment module 100 processes (1256) the first transaction associated with the first authorization grant token and generates first transaction information when the first transaction is completed. In some implementations, the first transaction information includes a transaction ID for the first transaction, a module ID corresponding to payment module 100, a user ID corresponding to the first mobile device 150-1, transaction status information indicating that the first transaction is complete, and the transaction amount for the first transaction. The payment module 100 stores the first transaction information with a timestamp indicating the time and date that the first transaction information was generated.

The payment module 100 sends (1258), via a short-range communication capability (e.g., BLE), the first transaction information to the first mobile device 150-1 to send to the server 130 in order to acknowledge the first transaction.

In accordance with a determination that first acknowledgement information is not received for the first transaction within a predefined time period, the payment module 100 times-out (1260)) the first transaction and maintains the first transaction information. In some implementations, a transaction times-out when the connection between the mobile device and the payment module is interrupted and transaction information is not acknowledged within a predefined time period.

For example, the connection between the first mobile device 150-1 and the payment module 100 is interrupted when the first user 1251-1 turns off the first mobile device 150-1, the first user 1251-1 turns the first mobile device 150-1 into airplane mode, the first user 1251-1 walks away out of the communication zone (i.e., BLE range) of the payment module 100, the first mobile device 150-1 otherwise loses its long-range communication connection, or the first mobile device 150-1 otherwise loses power. In this example, either the first user 1251-1 maliciously interrupted the connection to prevent the acknowledgement information from being received by the payment module 100 by powering down the first mobile device 150-1, or the connection was involuntarily or unintentionally interrupted by the first mobile device 150-1's battery running out or a losing cellular signal.

In some implementations, the first user 1251-1 is be blocked by the payment module 100 from performing any additional transactions until the payment module 100 receives an acknowledgement from the server 130 via any connection (e.g., from the second user 1251-2). In some implementations, unused authorization grants (e.g., if there was no trigger condition or it expired) are canceled by the first mobile device 150-1 by sending a cancellation message to the server 130 corresponding to the unused authorization grant. In some implementations, the server 130 denies or limits the number of authorization grants sent to the first mobile device 150-1 until it has received transaction information or cancellation of authorization outstanding authorization grants sent to the first mobile device 150-1. In some implementations, server 130 denies approval of, or limit the number of, additional authorization grants from user 1251-1 for transacting with a second payment module (not shown) until the server 130 receives transaction information, cancellation of authorization, or a predefined time period has expired for outstanding authorization grants sent to the first mobile device 150-1 for transacting with a first payment module. In this example, a user may be limited to only 1 authorization grant for the first payment module 100 and no more than 3 outstanding authorization grants in a predetermined number of hours regardless of the number of payment modules the user may be attempting to use.

After receiving a second authorization request associated with a second authorization code from a second mobile device 150-2 subsequent to receiving the first authorization request from the first mobile device 150-1, the server 130 sends (1262), via a long-range communication capability (e.g., GSM, CDMA, Wi-Fi, or the like), a second authorization grant token to the second mobile device 150-2 associated with a second user 1251-2.

After receiving the second authorization grant token and in response to detecting a trigger condition (e.g., via the hand-free mode or the manual mode), the second mobile device 150-2 sends (1264), via a short-range communication capability (e.g., BLE), the second authorization grant token to the payment module 100 associated with the machine 120 in order to initiate a second transaction.

The payment module 100 processes (1266) the second transaction associated with the second authorization grant token and generates second transaction information when the second transaction is completed. In some implementations, the second transaction information includes a transaction ID for the second transaction, a module ID corresponding to payment module 100, a user ID corresponding to the second mobile device 150-2, transaction status information indicating that the second transaction is complete, and the transaction amount for the second transaction. The payment module 100 stores the second transaction information with a timestamp indicating the time and date that the second transaction information was generated.

The payment module 100 sends (1268), via a short-range communication capability (e.g., BLE), the first transaction information associated with the interrupted first transaction and the second transaction information associated with the second transaction to the second mobile device 150-1 to send to the server 130 in order to acknowledge the first and second transactions. In this way, the first transaction information associated with the previous, interrupted first transaction initiated by the first mobile device 150-1 is appended to the second transaction information for the second transaction initiated by the second mobile device 150-2.

The second mobile device 150 sends (1270), via a long-range communication capability (e.g., GSM, CDMA, Wi-Fi, or the like), the first transaction information and the second transaction information to the server 130.

After receiving the first transaction information and the second transaction information, the server 130 processes the first transaction information and the second transaction information. For example, the server 130 debits the account of the first user 1251-1 associated with the user ID for first mobile device 150-1 in the first transaction information in the amount indicated by the first transaction information. Continuing with this example, the server 130 also debits the account of the second user 1251-2 associated with the user ID for second mobile device 150-2 in the second transaction information in the amount indicated in the second transaction information.

The server 130 sends (1272), via a long-range communication capability (e.g., GSM, CDMA, Wi-Fi, or the like), first and second acknowledgment information to the second mobile device 150-2 acknowledging the first and second transactions. In some implementations, the first acknowledgment information includes the user ID of the first mobile device 150-1 that imitated the first transaction, the module ID of the payment module 100 that processed the first transaction, the transaction ID of the first transaction, and (optionally) the authorization code associated with the first transaction. In some implementations, the second acknowledgment information includes the user ID of the second mobile device 150-2 that imitated the second transaction, the module ID of the payment module 100 that processed the second transaction, the transaction ID of the second transaction, and (optionally) the authorization code associated with the second transaction.

After receiving the first and second acknowledgment information, the mobile device 150 sends (1274), via a short-range communication capability (e.g., BLE), the first acknowledgment information to the payment module 100.

After receiving the first and second acknowledgment information, the payment module 100 deletes (1276) the stored first transaction information and also the stored second transaction information. In some implementations, the payment module 100 marks the first and second transaction as complete.

Figure 26A:
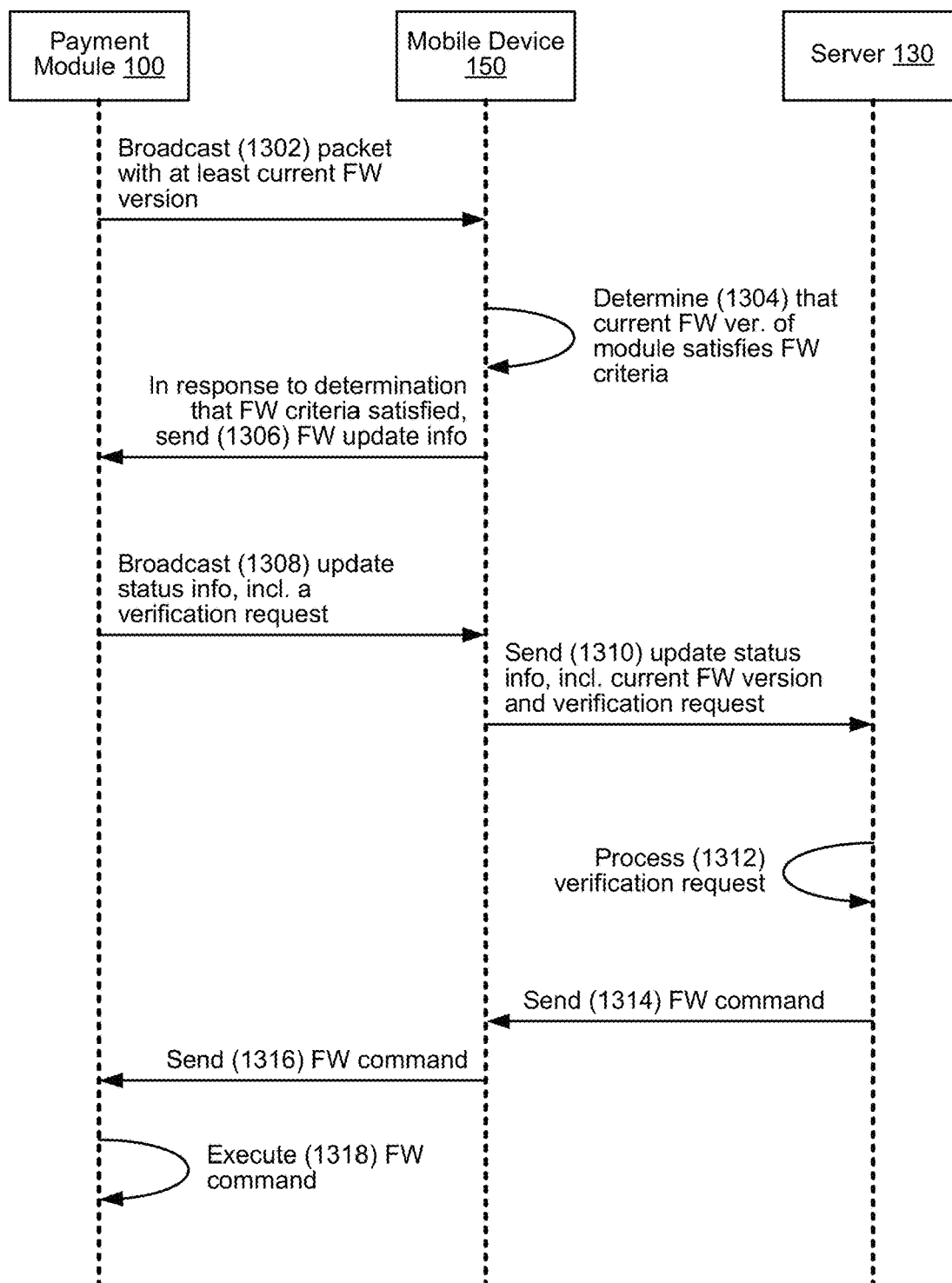
FIGS. 26A-26C show schematic flow diagrams of processes for updating firmware of the payment module in the payment processing system in accordance with some implementations.

FIG. 26A is a schematic flow diagram of a process 1300 of updating firmware of the payment module 100 in the payment processing system in accordance with some implementations. In some implementations, the payment processing system includes one or more payment modules 100 (e.g., each associated with a respective payment accepting unit 120), one or more mobile devices 150 (e.g., each executing the app 140 for the payment processing system either as a foreground or background process), and the server 130. The server 130 manages the payment processing system and, in some cases, supplies, operates, and/or manufactures the one or more payment modules 100. For brevity, the process 1300 will be described with respect to a respective payment module 100 and a respective mobile device 150 in the payment processing system.

The payment module 100 broadcasts (1302), via a short-range communication capability (e.g., BLE), a packet of information (e.g., broadcast packet 1100, FIG. 24A). The packet of information at least includes a firmware version (e.g., current firmware version 1112, FIG. 24A) of the payment module 100. The information included in the packet broadcasted by the payment module 100 is further discussed herein with reference to FIG. 24A.

The mobile device 150 determines (1304) that the current firmware version of the payment module 100 satisfies firmware criteria (e.g., predates a firmware version stored by the mobile device 150). Various other firmware criteria are further discussed below with reference to the method 1700 in FIGS. 30A-30D.

In accordance with a determination that the firmware criteria are satisfied, the mobile device 150 sends (1306) firmware update information (e.g., data packets corresponding to the firmware of the mobile device 150) to the payment module 100.

The payment module 100 broadcasts (1308) update status information (e.g., update status information 1114 in FIG. 24A, identifying remaining data packets needed for the firmware update) included in the advertised information to the one or more mobile devices in the payment processing system (e.g., at least including the respective mobile device 150). Although not illustrated, the process 1300 sometimes includes a second mobile device, which sends firmware update information that includes additional data packets distinct from the data packets sent by the respective mobile device 150.

When all needed data packets have been received by the payment module 100, the update status information includes a verification request, which the mobile device 150 then sends (1310) to the server 130 via a long-range communication capability (e.g., GSM).

The server 130 processes (1312) the verification request. For example, the server 130 processes the verification request by verifying that the received data packets are not corrupt, form a complete set, and correspond to a latest firmware version.

After processing the verification request, the server 130 sends (1314) to the mobile device 150 a firmware command (e.g., implement the firmware update at the payment module 100) via the long-range communication capability, which the mobile device 150 then sends (1316) to the payment module 100 via the short-range communication capability.

The payment module 100 then executes (1318) the firmware command. For example, the payment module implements the firmware update using the received data packets corresponding to a latest firmware version.

Figure 26B:
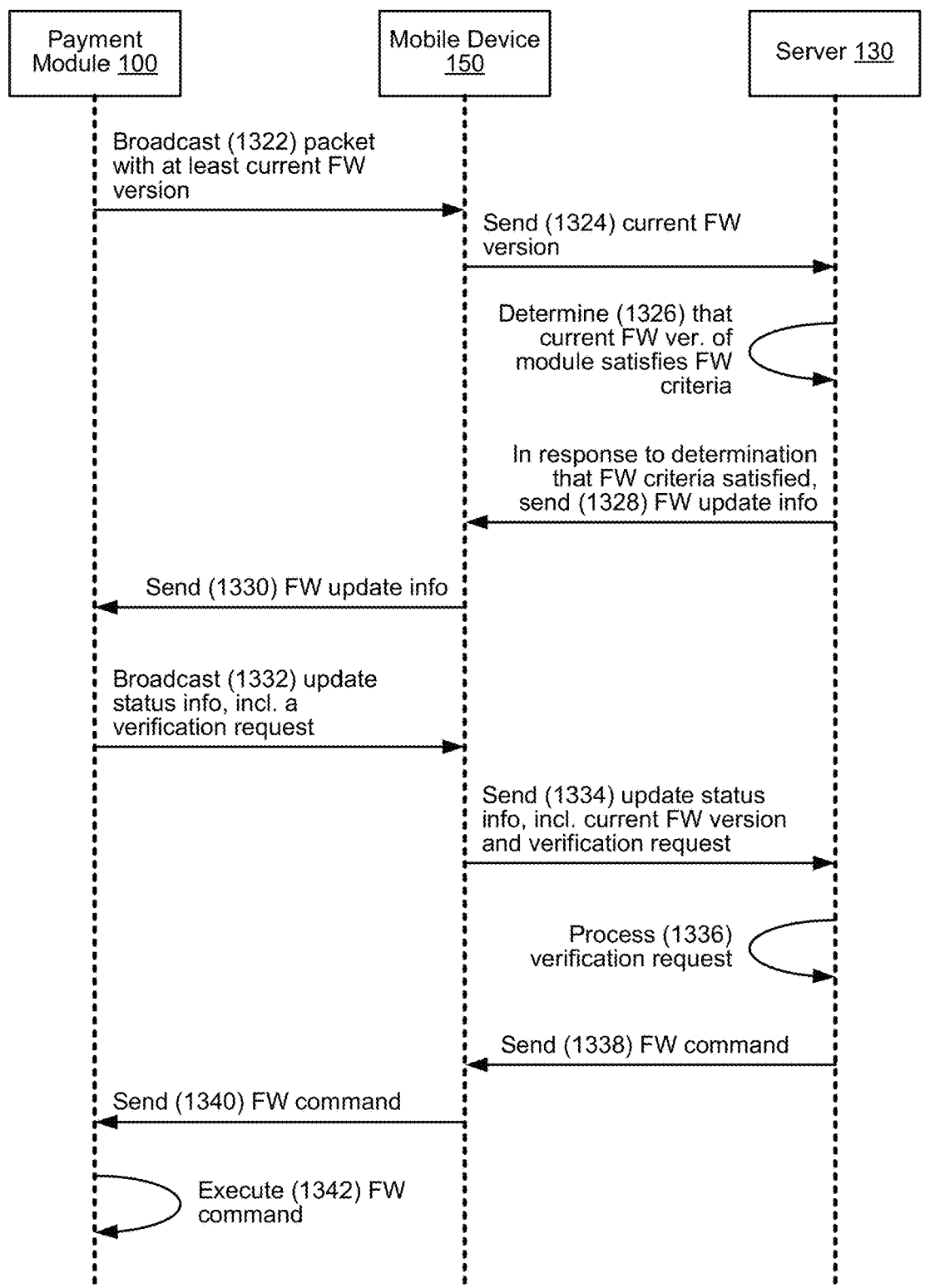

FIG. 26B is a schematic flow diagram of a process 1320 of updating firmware of the payment module 100 in the payment processing system in accordance with some implementations. In some implementations, the payment processing system includes one or more payment modules 100 (e.g., each associated with a respective payment accepting unit 120), one or more mobile devices 150 (e.g., each executing the app 140 for the payment processing system either as a foreground or background process), and the server 130. The server 130 manages the payment processing system and, in some cases, supplies, operates, and/or manufactures the one or more payment modules 100. For brevity, the process 1320 will be described with respect to a respective payment module 100 and a respective mobile device 150 in the payment processing system.

The payment module 100 broadcasts (1322), via a short-range communication capability (e.g., BLE), a packet of information (e.g., broadcast packet 1100, FIG. 24A). The packet of information at least includes a firmware version (e.g., current firmware version 1112, FIG. 24A) of the payment module 100. The information included in the packet broadcasted by the payment module 100 is further discussed herein with reference to FIG. 24A.

The mobile device 150 then sends (1324) to the server 130, via a long-range communication capability (e.g., GSM), the packet of information that at least includes the firmware version of the payment module 100.

The server 130 determines (1326) that current firmware version of the payment module 100 satisfies firmware criteria (e.g., predates a firmware version stored by the mobile device 150). Various other firmware criteria are further discussed below with reference to the method 1700 in FIGS. 30A-30D.

In accordance with a determination that the firmware criteria are satisfied, the server 130 sends (1328) to the mobile device 150 firmware update information (e.g., data packets corresponding to the firmware of the mobile device 150), which the mobile device 150 then sends (1330) to the payment module 100.

The payment module 100 broadcasts (1332) update status information (e.g., identification of remaining data packets needed for the firmware update) included in the advertised information to the one or more mobile devices in the payment processing system (e.g., at least including the respective mobile device 150), which the one or more mobile devices 150 then send (1334) to the server 130. When all needed data packets have been received by the payment module 100, the update status information includes a verification request.

The server 130 processes (1336) the verification request. For example, the server 130 processes the verification request by verifying that the received data packets are not corrupt, form a complete set, and correspond to a latest firmware version.

After processing the verification request, the server 130 sends (1338) to the mobile device 150 a firmware command (e.g., implement the firmware update at the payment module 100) via the long-range communication capability, which the mobile device 150 then sends (1340) to the payment module 100 via the short-range communication capability.

The payment module then executes (1342) the firmware command. For example, the payment module implements the firmware update using the received data packets corresponding to a latest firmware version.

Figure 26C:
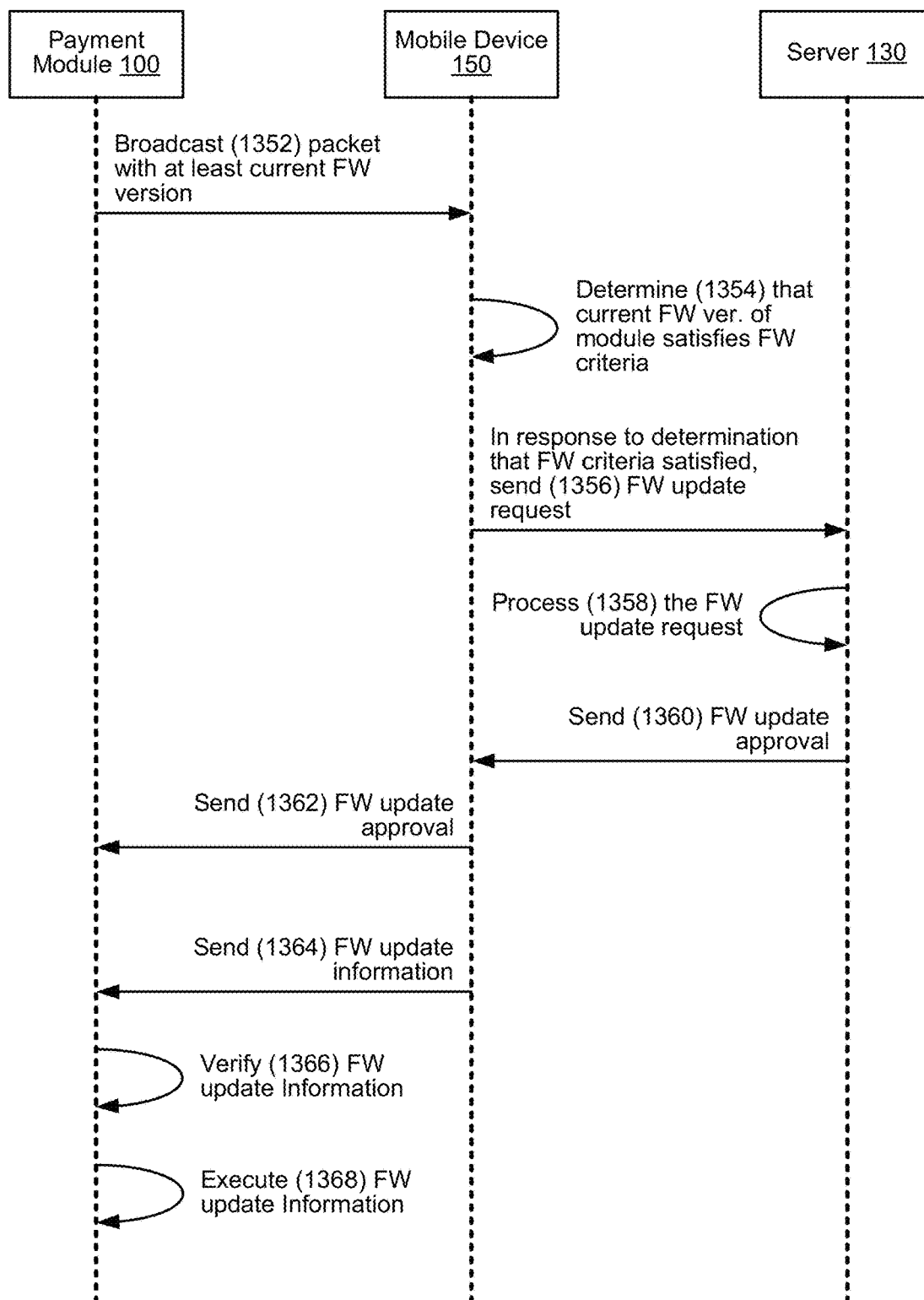

FIG. 26C is a schematic flow diagram of a process 1350 of updating firmware of the payment module 100 in the payment processing system in accordance with some implementations. In some implementations, the payment processing system includes one or more payment modules 100 (e.g., each associated with a respective payment accepting unit 120), one or more mobile devices 150 (e.g., each executing the app 140 for the payment processing system either as a foreground or background process), and the server 130. The server 130 manages the payment processing system and, in some cases, supplies, operates, and/or manufactures the one or more payment modules 100. For brevity, the process 1350 will be described with respect to a respective payment module 100 and a respective mobile device 150 in the payment processing system.

The payment module 100 broadcasts (1352), via a short-range communication capability (e.g., BLE), a packet of information (e.g., broadcast packet 1100, FIG. 24A). The packet of information at least includes a firmware version (e.g., current firmware version 1112. FIG. 24A) of the payment module 100. The information included in the packet broadcast by the payment module 100 is further discussed herein with reference to FIG. 24A.

The mobile device 150 determines (1354) that the current firmware version of the payment module 100 satisfies firmware criteria (e.g., predates a firmware version stored by the mobile device 150). Various other firmware criteria are further discussed below with reference to the method 1700 in FIGS. 30A-30D. In some implementations, the mobile device 150 stores a firmware image for the payment module 100. For example, the firmware image was previously downloaded by the mobile device 150 from the server 130 as part of an update for application 140. In some implementations, the firmware image downloaded by the mobile device 150 is encrypted with a common encryption key known to all payment modules 100 in the payment processing system (as opposed to the unique encryption key corresponding to each payment module 100 in the payment processing system). In some implementations, the firmware image downloaded by the mobile device 150 is encrypted with an encryption key that is later sent as part of the firmware approval message in steps 1360 and 1362, where the firmware approval message is encrypted with a unique encryption key corresponding to the payment module 100.

In accordance with a determination that the firmware criteria are satisfied, the mobile device 150 sends (1356), via a second communication capability (e.g., GSM, CDMA, Wi-Fi, or the like), a firmware update request (e.g., a request for permission to update the firmware of the payment module 100) to the server 130. In some embodiments, the firmware update request includes a module ID corresponding to the payment module 100, a user ID associated with a user of the mobile device 150, the current firmware version 1112 of the payment module 100, and the firmware version stored by the mobile device 150.

The server 130 processes (1358) the firmware update request. The server 130 determines whether to permit or decline the firmware update request. If the server 130 permits the firmware update request, the mobile device 150 updates the firmware version of the payment module 100 with the firmware version stored by the mobile device. For example, the server 130 declines the firmware update request if the firmware version stored by the mobile device 150 is out of date (i.e., a firmware version C, distinct from a firmware version A of the payment module 100 and a firmware version B stored by the mobile device 150, is the latest firmware image). In another example, the server 130 declines the firmware update request if the firmware version stored by the mobile device 150 (e.g., firmware version B) is determined to be faulty and/or blacklisted, even if a latest firmware (e.g., firmware version C, distinct from firmware version A and firmware version B) is not yet available.

In accordance with a determination that the firmware version stored by the mobile device 150 is approved by the server 130, the server 130 sends (1360) to the mobile device 150, via the second communication capability, a firmware update approval message (e.g., permission to update the firmware of the payment module 100), which the mobile device 150 then sends (1362) to the payment module 100 via the short-range communication capability. In some implementations, in accordance with a determination that the server 130 permits the firmware update request, the server 130 responds to the application 140 of the mobile device 150 with an affirmative firmware update approval message (e.g., approval to update firmware of payment module 100) to be sent to the payment module 100. In some implementations, the firmware update approval message contains one or more verification values (e.g., a list of checksum values for each 4 KB block of encrypted firmware image stored by the mobile device 150) and a hash value (e.g., SHA-256 hash of the complete, decrypted firmware image) for data packets corresponding to the approved firmware update version. Furthermore, in some implementations, the firmware update approval message includes a firmware decryption key (e.g., for decrypting received data packets corresponding to the approved firmware update version). In some implementations, the firmware update approval message is encrypted using a unique encryption key corresponding to the payment module 100.

In some implementations, if the payment module 100 is already updating its firmware when it receives the firmware update approval message (e.g., a process which may have been started by a different mobile device 150 at an earlier time), then the payment module 100 simply verifies the validity of the firmware update approval message and resumes the firmware update. However, if the payment module 100 was not already updating its firmware, it will verify the validity of the firmware update approval message, store to the memory 760 (FIG. 20) (e.g., EEPROM) the one or more verification values and the hash value (e.g., list of checksums and a SHA-256 hash), and erase the firmware-update area of the memory 760 (e.g., where the one or data packets for the firmware update will be stored). In these cases, the payment module 100 subsequently receives firmware update formation (e.g., one or more data packets) from the mobile device 150 which are stored in the firmware-update area of the memory 760. Furthermore, in some implementations, if the payment module 100 already has a stored firmware update to the specified firmware version ready to be processed, but it has not yet rebooted to install it, the firmware update request is ignored.

After the server 130 approves the firmware update request, the mobile device 150 sends (1364) to the payment module 100, via the short-range communication capability, firmware update information (e.g., data packets corresponding to the firmware stored by the mobile device 150). As long as the payment module 100 is connected to the mobile device 150, the payment module 100 will identify one or more data blocks (i.e., corresponding to the approved firmware update version) that are still needed, which are sent by the mobile device 150 as the one or more data packets. In some implementations, after receiving the firmware update approval message, the payment module 100 sends to the mobile device 150 update status information identifying and requesting one or more data blocks still needed for the firmware update (e.g., a specific 256 B block/chunk of firmware). Additionally and/or alternatively, the packet of information (e.g., broadcast packet 1100, FIG. 24A) broadcast by the payment module 100 includes information identifying one or more data blocks still needed by the payment module 100 for the firmware update or one or more data blocks already received by the payment module 100. After receipt of the one or more data packets, the firmware update information is stored by the payment module 100 into memory (e.g., the memory 760, FIG. 20).

The payment module 100 verifies (1366) the firmware update information. In some implementations, each time a data packet is received from the mobile device 150 corresponding to a complete data block (e.g., a 4 KB block) of the firmware update, the payment module 100 will compare a generated verification value (e.g., a checksum of the 4 KB block) against a corresponding verification value for the block that was included in the update approval message (e.g., a checksum from the list included in the firmware update approval message). If the verification values do not match, the corresponding data block is erased, and the update process resumes from that point (e.g., the particular 4 KB block that did not pass verification).

After verifying the firmware update information, the payment module 100 executes (1368) the firmware update information. After all data blocks have been received by the payment module 100, and their verification values (e.g., checksums) have been successfully verified, in some implementations, the payment module 100 sets an internal flag indicating that it should reboot itself when it determines it is a safe time to do so. In some implementations, a safe time for rebooting is based on the current time of day (e.g., 2:00 AM), or observed activity of the payment accepting unit 120 (e.g., when no user has connected in the past 10 minutes).

In some implementations, when the payment module 100 decides to reboot, it sets an install-firmware flag in memory (e.g., EEPROM) and resets itself. Upon reboot of the payment module 100, a bootloader observes the set install-firmware flag and executes an associated firmware installation handler. In some implementations, the firmware installation handler double checks all of the block checksums of the firmware update information (e.g., a firmware update image). If the checksums do not match, an error has occurred (e.g., corrupted data) and the update is aborted, with the currently installed firmware then booting up. If the checksums do match, however, the bootloader erases the currently installed firmware and then decrypts the firmware update information (e.g., a firmware update image) into the installed firmware area of memory (e.g., memory 760, FIG. 20).

After the firmware update information has been decrypted, the bootloader computes a hash value (e.g., a SHA-256 hash) of the firmware update information (e.g., of a firmware update image) and compares it to the hash value received from the server 130 that was included in the update approval message. If the hash values do not match, an error has occurred, causing the bootloader to erase the installed firmware and re-install a default (i.e., gold master) firmware image, as that is the only image available to install at that point. Finally, the bootloader loads and runs the installed firmware (either the updated firmware version or the gold master).

Figure 27A:
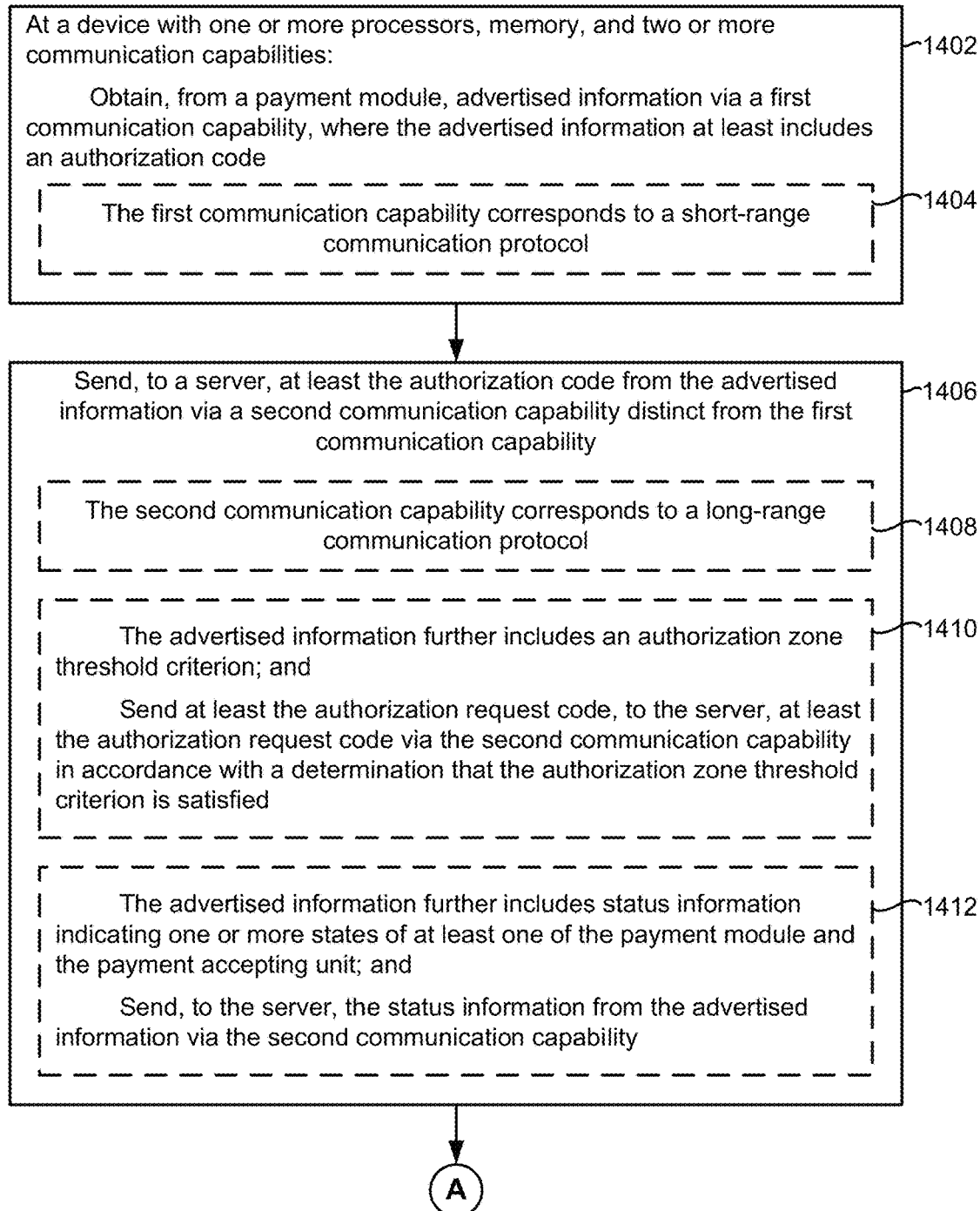
FIGS. 27A-27C illustrate a flowchart diagram of a method of payment processing in accordance with some implementations.
Figure 27B:
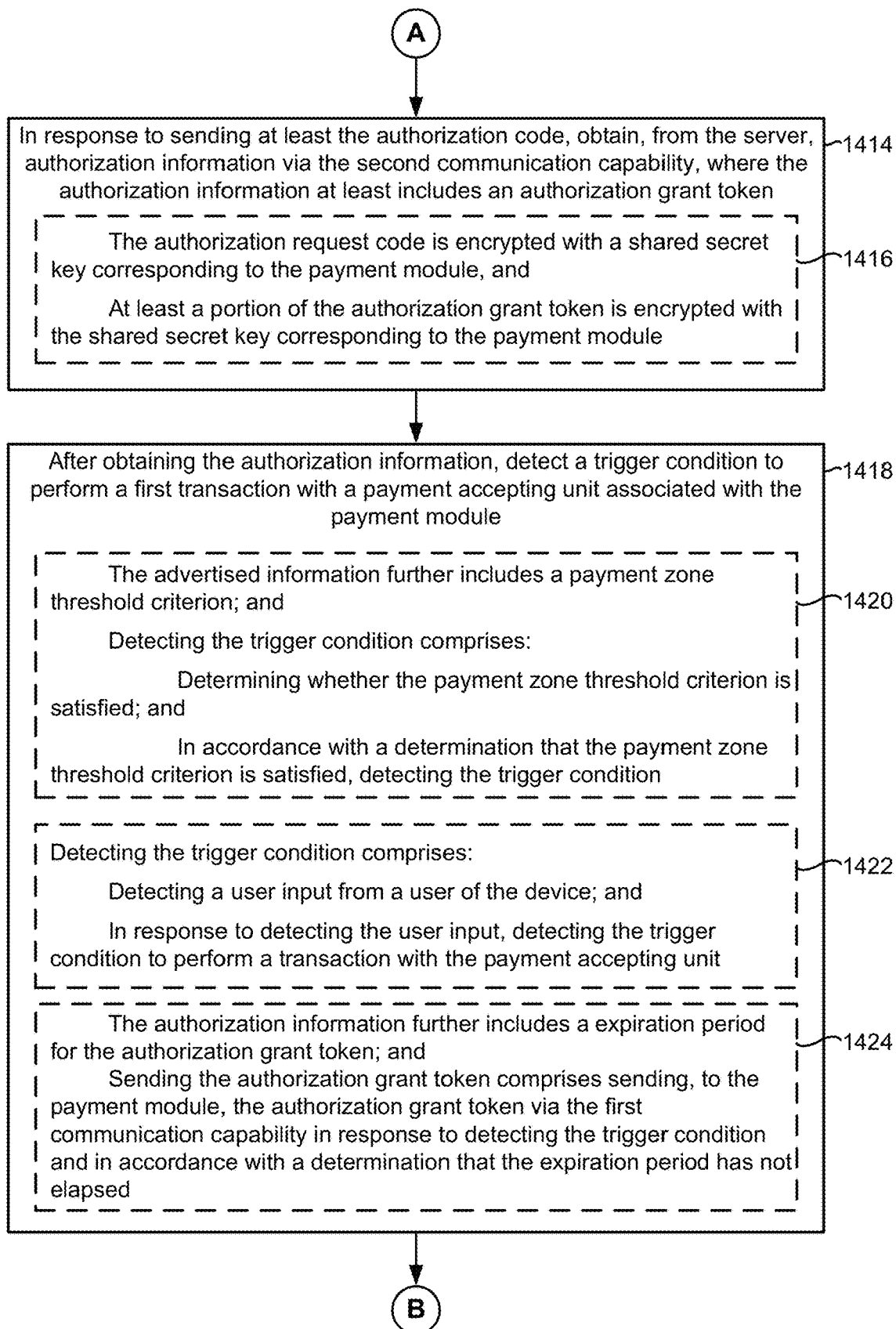
Figure 27C:
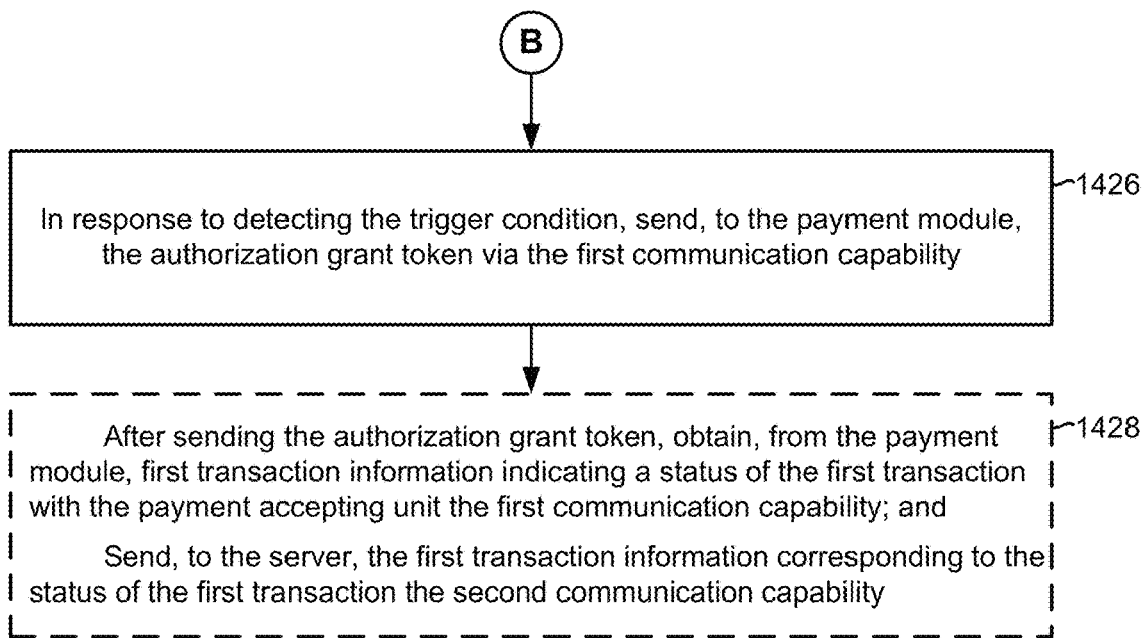

FIGS. 27A-27C illustrate a flowchart diagram of a method 1400 of payment processing in accordance with some implementations. In some implementations, the method 1400 is performed by a device with one or more processors, memory, and two or more communication capabilities. For example, in some implementations, the method 1400 is performed by the mobile device 150 (FIGS. 5 and 21) or a component thereof (e.g., application 140). In some implementations, the method 1400 is governed by instructions that are stored in a non-transitory computer readable storage medium (e.g., the memory 860, FIG. 21) and the instructions are executed by one or more processors (e.g., the processing unit 840, FIG. 21) of the device. Optional operations are indicated by dashed lines (e.g., boxes with dashed-line borders).

The device obtains (1402), from a payment module, advertised information via a first communication capability, where the advertised information at least includes an authorization code. In some implementations, the payment module 100 broadcasts/advertises a packet of information (i.e., the advertised information such as the packet 1100, FIG. 24A) via one or more short-range communication protocols such as BLE, NFC, and/or the like (i.e., a non-persistent communication channel). As such, the payment module 100 is not tied up in handshakes with each mobile device 150 within its communication zone. In some implementations, the application 140 associated with the payment processing system, which is executed on the mobile device 150 (e.g., a mobile phone), receives the packet when the mobile device 150 is within the communication zone (i.e., BLE range) of the payment module 100.

In some implementations, the advertised information is a packet with a module identifier (ID) associated with the payment module 100, an authorization code, the payment module 100's current firmware version, and a plurality of status flags associated with a state of the payment accepting unit 120 and/or the payment module 100. For example, FIG. 24A illustrates the packet 1100 of information that is broadcast by the payment module 100. In some implementations, the authorization code is a cleartext hash value. In some implementations, the authorization code is encrypted with a unique encryption key corresponding to the payment module 100. In some implementations, the packet also includes customized or baseline thresholds for the authorization and payment zones (e.g., RSSI values such as -80 db and -90 db, respectively). In some implementations, the packet also includes a request (e.g., a status flag) for mobile device 150 to connect to it immediately so as to upload information to the server 130 (e.g., transaction information for one or more interrupted transaction). In some implementations, the payment module 100 broadcasts the advertised information every X second with a unique authorization code.

In some implementations, the first communication capability corresponds (1404) to a short-range communication protocol. For example, the first communication capability of the mobile device 150 is a radio/transceiver means for communicating via one or more short-range communication protocols such as BLE, NFC, and/or the like (i.e., a non-persistent communication channel).

The device sends (1406), to a server, at least the authorization code from the advertised information via a second communication capability distinct from the first communication capability. In some implementations, the mobile device 150 sends an authorization request to the server 130 that at least includes the authorization code from the obtained advertised information, the user ID corresponding to the user of the mobile device 150, and the module ID corresponding to the payment module 100. For example, see authorization request 1130 in FIG. 24B.

In some implementations, the second communication capability corresponds (1408) to a long-range communication protocol. For example, the second communication capability of the mobile device 150 is a radio/transceiver means for communicating via one or more long-range communication protocols such as Wi-Fi, CDMA, GSM, and/or the like (i.e., a non-persistent communication channel).

In some implementations, the advertised information further includes (1410) an authorization zone threshold criterion, and the device sends at least the authorization request code comprises sending, to the server, at least the authorization request code via the second communication capability in accordance with a determination that the authorization zone threshold criterion is satisfied. In some implementations, the advertised information includes a baseline authorization zone threshold (i.e., an authorization zone criterion) indicating a baseline RSSI that the mobile device 150 (or the application 140) is required to observe before being within the authorization zone of the payment module 100. In some implementations, the mobile device 150 (or the application 140) offsets the baseline authorization zone threshold based on the strength and/or reception of the short-range communication capability (e.g., BLE radio/transceiver) of the mobile device 150. In some implementations, the mobile device 150 forwards the authorization code to the server 130 when the authorization zone criterion is satisfied (i.e., the mobile device 150) observes an RSSI equal to or exceeding the baseline authorization zone threshold). For example, baseline authorization zone threshold for a payment module associated with module ID 0xA23 is −70 db. Continuing with this example, the mobile device 150 (or the application 140) offsets the baseline authorization zone threshold by −5 db because the mobile device 150's BLE radio/transceiver is weak. Continuing with this example, when the mobile device 150 observes an RSSI equal to or exceeding −75 db from payment module 100 associated with module ID 0xA23, the mobile device 150 forwards the authorization code to the server 130.

In some implementations, the advertised information further includes status information indicating one or more states of at least one of the payment module and the payment accepting unit, and the device sends (1412), to the server, the status information from the advertised information via the second communication capability. FIG. 24A, for example, shows the packet 1100 with one or more status flags 1108. For example, the one or more status flags 1108 included in the packet 1100 are encoded with a predetermined code known by the server 130. In some implementations, the status information indicates that the payment module 100 has information to be uploaded to the server (e.g., transaction information for one or more interrupted transactions). In some implementations, the status information indicates information for the attention of the payment accepting machine 120's operator. For example, when the payment accepting unit 120 is a vending machine, the status information indicates that a particular item is low or out of stock. In another example, the status information indicates that the payment accepting unit 120 is experiencing a bill and/or coin jam. In another example, the status information indicates that the payment accepting unit 120's bill and/or coin reservoir is empty, nearly empty, full, or nearly full.

In response to sending at least the authorization code, the device obtains (1414), from the server, authorization information via the second communication capability, where the authorization information at least includes an authorization grant token. FIG. 24B, for example, shows the authorization grant token 1140. In some implementations, the mobile device 150 receives the authorization grant token when the authorization code is valid and the first user has sufficient funds in his/her account for the payment processing system to perform a transaction at the payment accepting unit 120. In some implementations, the authorization grant token or a portion thereof is encrypted with the encryption key corresponding to the payment module 100. In some implementations, the authorization grant token includes an authorized amount, an expiration offset period, a user ID associated with the user of the mobile device 150, and a module ID associated with the payment module 100. For example, the expiration offset period depends on the first user's history and credit or a period predefined by the first user. For example, the authorized amount is predefined by the first user, based on a daily limit, based on the first user's total balance, or based on a risk profile associated with the user identified by the user ID. In some implementations, the authorization grant token or a portion thereof (e.g., the authorized amount or the auth code) is encrypted with an encryption key corresponding to the payment module 100 identified by the module ID.

In some implementations, the authorization request code is (1416) encrypted with a shared secret key corresponding to the payment module, and at least a portion of the authorization grant token is encrypted with the shared secret key corresponding to the payment module. For example, at least the authorized amount or the authorization code included in the authorization grant token is encrypted with the shared secret key. In some implementations, the shared secret key is known by the payment module 100 and the server 130. For example, the server 130 manages transactions for a plurality of payment modules and the server 130 stores a table of encryption keys for each of the payment modules. In this example, the server 130 selects an encryption key that corresponds to the respective payment module 100 and encrypts the authorized amount with the selected encryption key. In some implementations, the shared secret key is one of a public or private key in an asymmetrical cryptography scheme. Thus, in the above example, the mobile device 150 is an un-trusted party in the payment processing system: thus, the mobile device 150 cannot decrypt the authorization code or at least a portion of the authorization grant token.

After obtaining the authorization information, the device detects (1418) a trigger condition to perform a first transaction with a payment accepting unit (e.g., an automatic retailing machine such as a vending machine for dispensing goods and/or services) associated with the payment module. In the hands-free mode, the trigger condition is detected when the mobile device 150 enters the payment zone of the payment module 100 which occurs upon satisfaction of a payment zone criterion. In the manual mode, trigger condition is detected when the user of the mobile device 150 interacts with the user interface of the application 140 for the payment processing system while the application 140 is executed in as a foreground process on the mobile device 150.

In some implementations, the advertised information further includes (1420) a payment zone threshold criterion, and the device the trigger condition by: determining whether the payment zone threshold criterion is satisfied; and, in accordance with a determination that the payment zone threshold criterion is satisfied, detecting the trigger condition. In some implementations, the advertised information includes payment zone threshold criterion indicating a baseline RSSI that the mobile device 150 (or the application 140) is required to observe before being within the payment zone of payment module 100. In some implementations, the payment zone threshold criterion is a default RSSI value (e.g., −80) db) and the advertised information includes an offset (e.g., −5 db) to account for the strength and/or reception quality of the short-range radio/transceiver (e.g., BLE) of the payment module 100. In some implementations, the trigger condition is detected when the mobile device 150 enters the payment zone of the payment module 100 which occurs upon satisfaction of a payment zone criterion. For example, when the RSSI observed by the mobile device 150 from the payment module 100 exceeds a predetermined payment zone threshold the payment zone threshold criterion is satisfied. In some implementations, the mobile device 150 provides an indication on the user interface of the application 140 for the payment processing system indicating whether the user is within the payment zone of payment module 100 and/or how close he/she is to the payment zone of payment module 100.

In some implementations, the device detects (1422) the trigger condition by: detecting a user input from a user of the device; and, in response to detecting the user input, detecting the trigger condition to perform a transaction with the payment accepting unit. For example, while the application 140 associated with the payment processing system is executed as a foreground process on the mobile device 150, the user of the mobile device interacts with the user interface of the application 140 to initiate a transaction with the payment accepting unit 120. In this example, the user performs a touch gesture with the touch screen of the mobile device 150, vocally commands the application 150 to initiate the transaction, or the like. Continuing with this example, after detecting the user interaction, the mobile device 150 (or the application 140) sends the payment module 100 the authorization grant token and the user is credited with the amount authorized in the authorization grant token in order to select goods and/or services provided by payment accepting unit 120 for purchase with the credit.

In some implementations, the authorization information further includes (1424) an expiration period for the authorization grant token, and the device sends, to the payment module, the authorization grant token via the first communication capability in response to detecting the trigger condition and in accordance with a determination that the expiration period has not elapsed. In some implementations, after detecting the trigger condition, the mobile device (or the application 140) determines whether an expiration period indicated by the authorization grant token has elapsed before sending the authorization grant token to the payment module 100. In some implementations, after determining that an expired authorization grant token is expired, the mobile device (or the application 140) determines automatically deletes the expired authorization grant token and requests a replacement authorization grant token by sending, to the server 130, the authorization request code included in current advertised information broadcasted by the payment module 100.

In response to detecting the trigger condition, the device sends (1426), to the payment module, the authorization grant token via the first communication capability. Continuing with the example in operation 1422, after detecting the user interaction, the mobile device 150 (or the application 140) sends the payment module 100 the authorization grant token and the user is credited with the amount authorized in the authorization grant token in order to select goods and/or services provided by payment accepting unit 120 for purchase with the credit.

For example, when the payment module 100 broadcasts the packet of information, if authorization code 12345 was issued in the packet (e.g., a new authorization code is issued every 100 ms), and a user uses that code to make a payment (when it comes back to the payment module 100 in the authorization grant token), the payment module 100 knows that authorization code 12345 has been used. Continuing with this example, if another subsequent user attempts to make a payment using the same authorization code 12345, the payment module 100 does not allow the subsequent user to use authorization code 12345 in order to prevent replay attacks. Additionally, in some implementations, the advertised authorization code expires after M minutes (e.g., 3, 5, 10, etc. minutes). In some implementations, the authorization code is a unique randomly or pseudo-randomly generated number that is stored by the payment module for M minutes after the authorization code is advertised, at which time it expires. In some implementations, the advertised authorization codes are unique incremental numbers that are advertised every X seconds. In this embodiment, the payment module 100 determines whether an authorization code in an authorization grant token is valid by identifying a current advertised authorization code and determining whether the advertised authorization is newer than the oldest valid authorization code based on the current advertised authorization code, the advertisement frequency (e.g., every X seconds), and the expiration period (e.g., M minutes).

In some implementations, after sending the authorization grant token, the device obtains (1428), from the payment module, first transaction information indicating a status of the first transaction with the payment accepting unit the first communication capability, and the device sends, to the server, the first transaction information corresponding to the status of the first transaction the second communication capability. In some implementations, the first transaction information indicates the status of the transaction initiated with an authorization grant token such as a complete, incomplete, or aborted transaction. For example, the first transaction is incomplete when the payment accepting unit 120 experiences a malfunction (e.g., a vending mechanism jams and the user of the mobile device 150 fails to receive a selected product) or the first transaction times-out by the user of the mobile device 150 waiting Z seconds without selecting goods and/or services from the payment accepting unit 120. For example, the first transaction is aborted when the user of the mobile device 150 actuates the coin return of the payment accepting unit 120 or walks away from the payment accepting unit 120 without selecting goods and/or service. In some implementations, the first transaction information includes the amount of the first transaction, current inventory state of products in payment accepting unit 120, other machine status information, and the like.

It should be understood that the particular order in which the operations in FIGS. 27A-27C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 1500 in FIGS. 28A-28B, the method 1600 in FIGS. 29A-29C, the and method 1700 in FIGS. 30A-30D) are also applicable in an analogous manner to the method 1400 described above with respect to FIGS. 27A-27C.

Figure 28A:
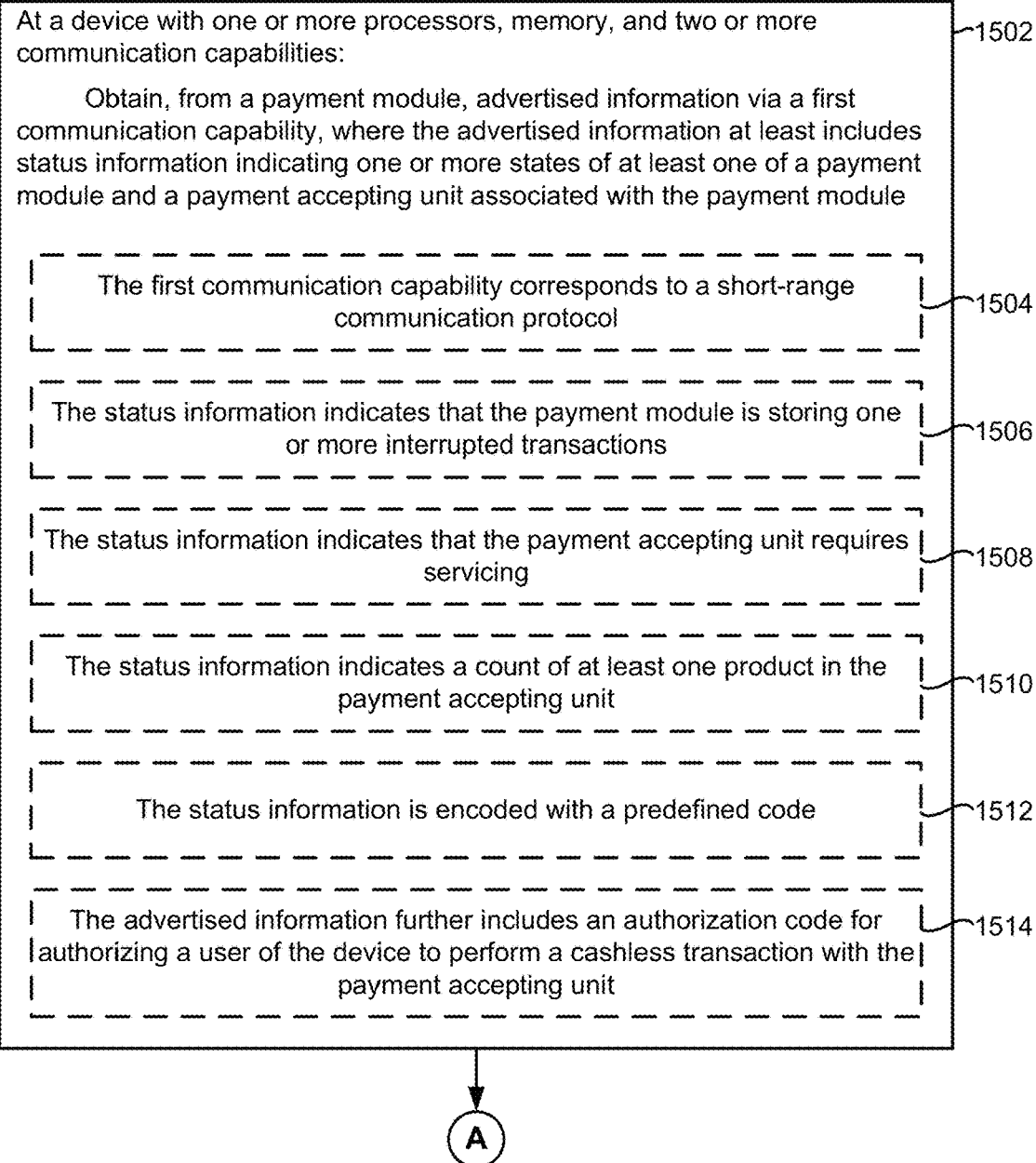
FIGS. 28A-28B illustrate a flowchart diagram of a method of transmitting machine status information in accordance with some implementations.
Figure 28B:
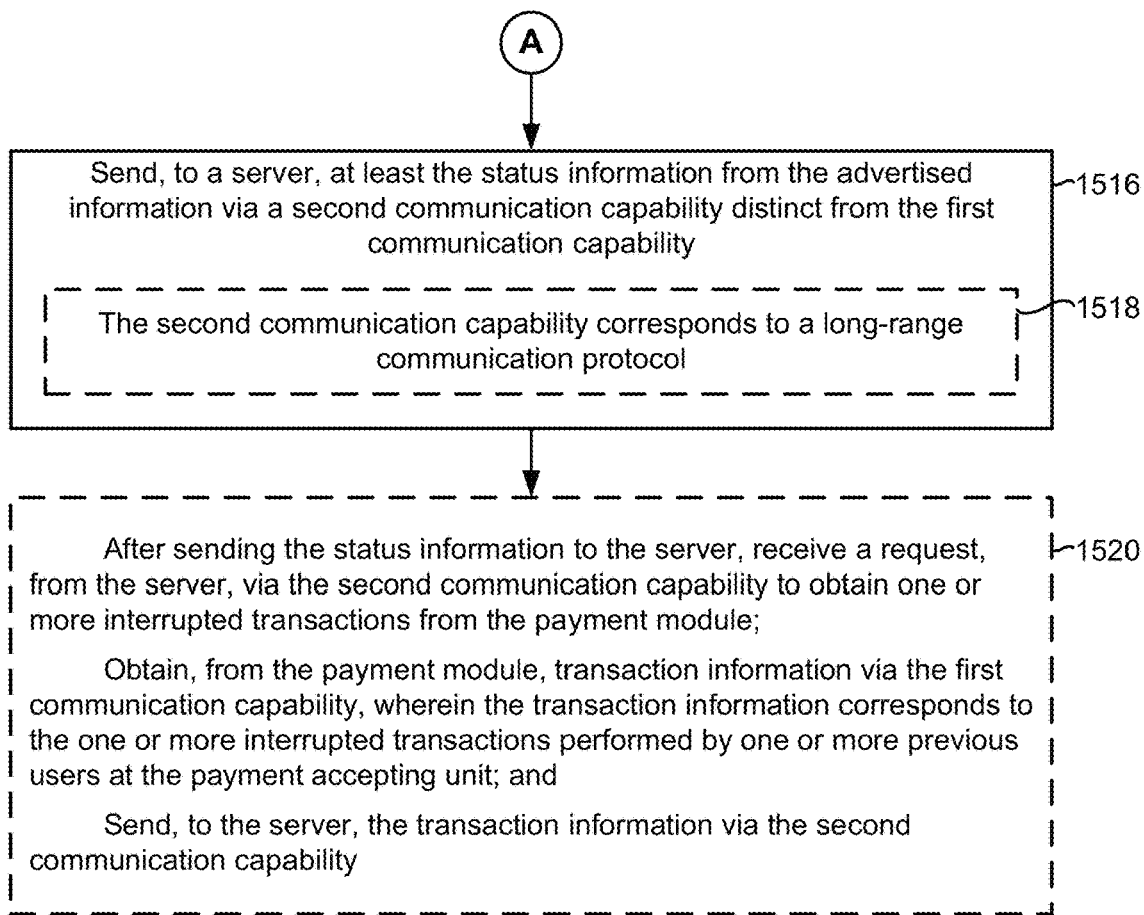

FIGS. 28A-28B illustrate a flowchart diagram of a method 1500 of transmitting machine status information in accordance with some implementations. In some implementations, the method 1500 is performed by a device with one or more processors, memory, and two or more communication capabilities. For example, in some implementations, the method 1500 is performed by the mobile device 150 (FIGS. 5 and 21) or a component thereof (e.g., application 140). In some implementations, the method 1500 is governed by instructions that are stored in a non-transitory computer readable storage medium (e.g., the memory 860, FIG. 21) and the instructions are executed by one or more processors (e.g., the processing unit 840, FIG. 21) of the device. Optional operations are indicated by dashed lines (e.g., boxes with dashed-line borders).

The device obtains (1502), from a payment module, advertised information via a first communication capability, where the advertised information at least includes status information indicating one or more states of at least one of a payment module and a payment accepting unit associated with the payment module. For example, in some implementations, the payment module 100 broadcasts the packet 1100 (FIG. 24A) which includes the one or more status flags 1108.

In some implementations, the first communication capability corresponds (1504) to a short-range communication protocol. As described above, short-range communication protocols include BLE, NFC, and/or other protocols utilizing non-persistent communication channels.

In some implementations, the status information indicates (1506) that the payment module is storing one or more interrupted transactions. As described in greater detail below with respect to FIGS. 29A-29C, in some implementations, interrupted transactions (sometimes referred to as "incomplete transactions") arise from the loss of a connection (e.g., the mobile device 150 has no cellular reception) or power. In some implementations, for example, the status flags 1108 (e.g., in packet 1100, FIG. 24A) include upload information indicator 1116, which indicates that the payment module is storing one or more interrupted transactions, and/or also includes transaction information (e.g., transaction information 1150, FIG. 24D) corresponding to the one or more incomplete transactions (e.g., an amount of the first transaction, a user ID, etc.). In some implementations, upload information indicator 1116 triggers the mobile device 150 to connect to payment module 100 immediately (e.g., if it has interrupted transaction information to be uploaded to the server 130). Alternatively, as described in greater detail below, the transaction information 1150 is generated and sent separately from the status flags 1108.

In some implementations, the status information indicates (1508) that the payment accepting unit requires servicing. For example, the status flags 1108 (e.g., in packet 1100, FIG. 24A) include the bill/coin jam indicator 1118, which indicates that a blockage is detected in the payment feeding mechanism (e.g., bill or coin jam). Furthermore, in some implementations, the status flags 1108 (e.g., in packet 1100, FIG. 24A) include the full bill/coin reservoir indicator 1120, which indicates that currency stored in the payment accepting unit requires collection by an operator of the machine. In some implementations, the status information indicates that the payment accepting unit requires servicing after a predefined period of time has elapsed since a prior servicing. In an example, the payment module 100 is configured to send status information indicating that the payment accepting unit 120 requires servicing after one month has elapsed since a last servicing.

In some implementations, the status information indicates (1510) a count of at least one product in the payment accepting unit. For example, the status flags 1108 (e.g., in packet 1100, FIG. 24A) includes the inventory levels indicator 1122, which indicates that the remaining inventory of an item (e.g., an inventory levels indicator 1122 having a value of 1 indicates one corresponding item remaining for a particular product).

In some implementations, the status information is (1512) encoded with a predefined code. In some implementations, the status information is encrypted and/or encoded with a predefined code and/or key. For example, the status flags 1108 (e.g., in packet 1100, FIG. 24A) include 4 Bytes of information which is encoded according to a predefined encoding scheme known by the server 130 which indicates a plurality of states of the payment module and/or the payment accepting unit 120 associated with the payment module 100.

In some implementations, the advertised information further includes (1514) an authorization code for authorizing a user of the device to perform a cashless transaction with the payment accepting unit. Authorization codes are described in greater detail above with respect to FIGS. 24C and 27A-27C and the accompanying text.

The device sends (1516), to a server, at least the status information from the advertised information via a second communication capability distinct from the first communication capability. For example, in step 1004 of method 1000 in FIG. 23, the mobile device 150 sends an authorization request to the server 130 that includes the authorization code included in the broadcasted packet, the user ID associated with the mobile device 150, the module ID associated with the payment module 100, and also the status information.

In some implementations, the second communication capability corresponds (1518) to a long-range communication protocol. For example, in some implementations, the long-range communication protocol is one of GSM, Wi-Fi, CDMA, LTE, and/or the like.

In some implementations, after sending the status information to the server, the device receives (1520) a request, from the server, via the second communication capability to obtain one or more interrupted transactions from the payment module: obtains, from the payment module, transaction information via the first communication capability, where the transaction information corresponds to the one or more interrupted transactions performed by one or more previous users at the payment accepting unit; and sends, to the server, the transaction information via the second communication capability. In some implementations, in response to the status flags indicating one or more interrupted transactions, the server 130 requests that the mobile device 150 connect to the payment module 100 to upload the one or more interrupted transactions. This may occur even when the user of the mobile device 150 does not initiate a transaction with the payment module 100. In some implementations, the mobile device 150 obtains the transaction information upon entering an authorization zone (e.g., the authorization zone 104). See FIGS. 29A-29C and the accompanying text for further discussion of interrupted transactions. For example, interrupted transactions arise from the loss of a network connection (e.g., the mobile device 150 has no cellular reception) or power.

It should be understood that the particular order in which the operations in FIGS. 28A-28B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 1400 in FIGS. 27A-27C, the method 1600 in FIGS. 29A-29C, and the method 1700 in FIGS. 30A-30D) are also applicable in an analogous manner to the method 1500 described above with respect to FIGS. 28A-28B.

Figure 29B:
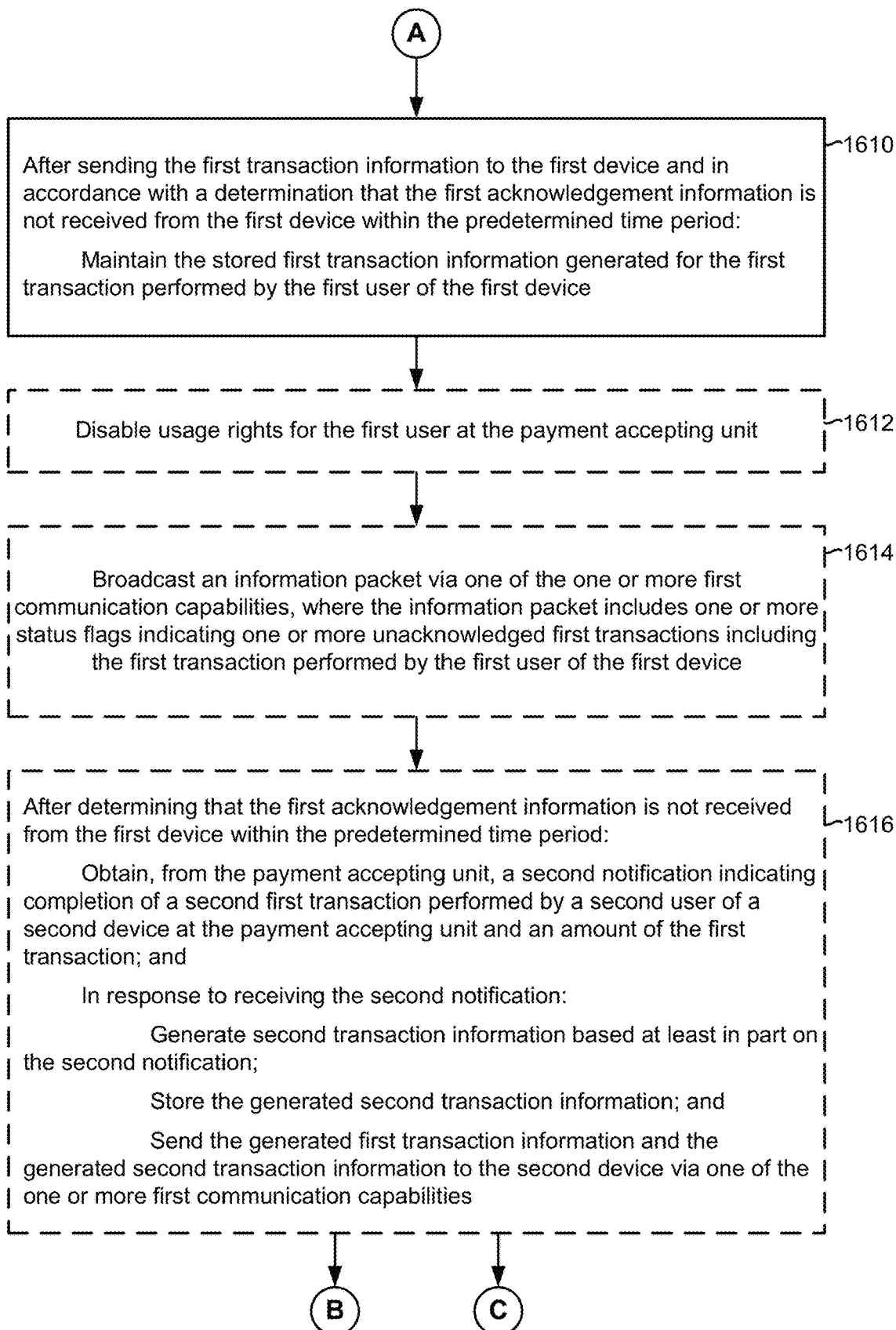
Figure 30A:
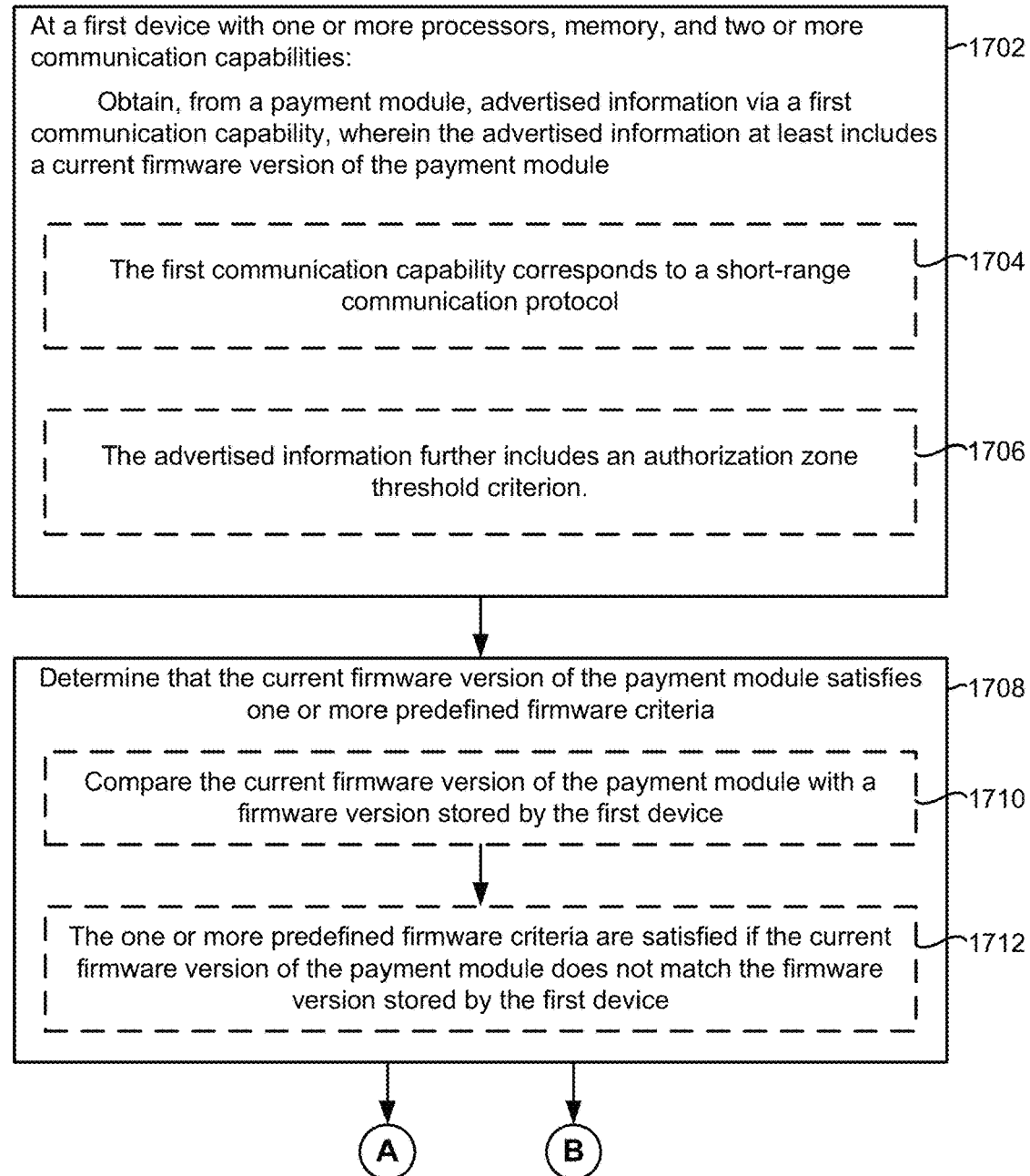
Figure 30B:
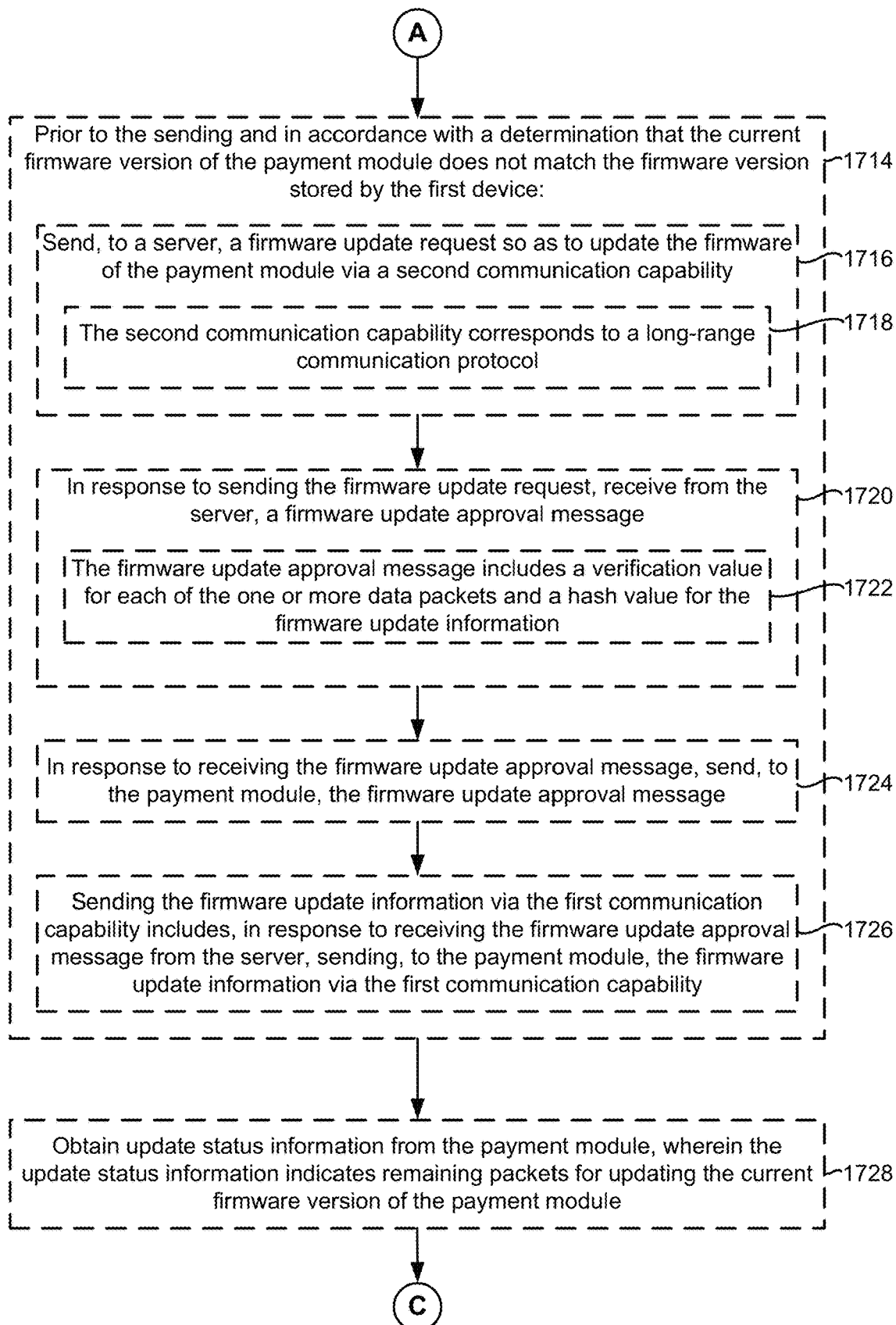
Figure 30C:
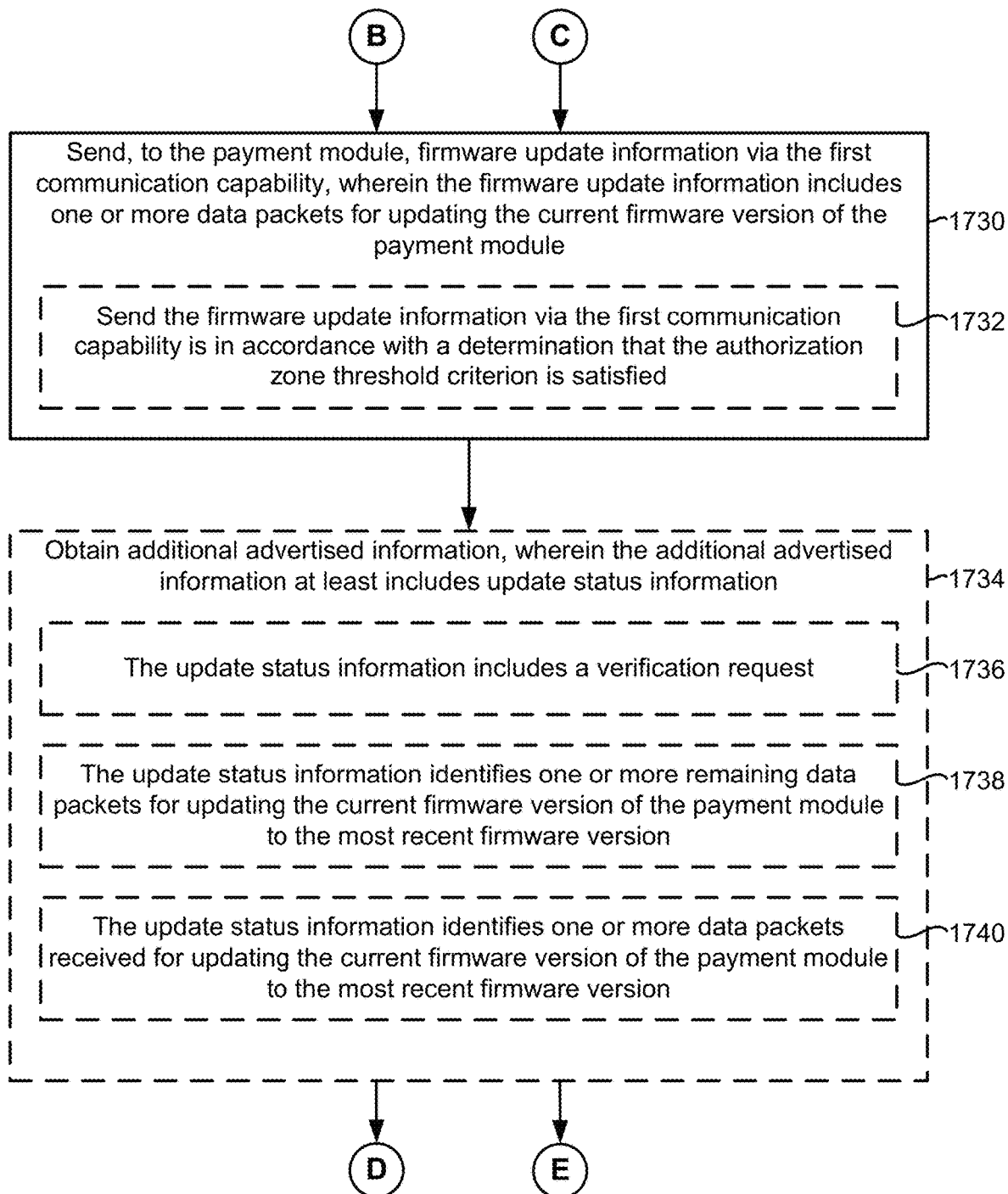

FIGS. 29A-29C illustrate a flowchart diagram of a method 1600 of pay payment processing acknowledgment in accordance with some implementations. In some implementations, the method 1600 is performed by a payment module with one or more processors, memory, and one or more first communication capabilities, which is coupled with a payment accepting unit (e.g., the payment accepting unit 120 (sometimes also herein called "machine 120") (FIGS. 5 and 19) such as a vending machine or kiosk for dispensing goods and/or services). For example, in some implementations, the method 1600 is performed by the adapter module 100, (FIGS. 5 and 20). In some implementations, the method 1600 is governed by instructions that are stored in a non-transitory computer readable storage medium (e.g., the memory 760, FIG. 20) and the instructions are executed by one or more processors (e.g., the processing unit 750, FIG. 20) of the payment module. Optional operations are indicated by dashed lines (e.g., boxes with dashed-line borders).

The payment module obtains (1602), from the payment accepting unit, a first notification indicating completion of a first transaction performed by a first user of a first device at the payment accepting unit and an amount of the first transaction. For example, in step 1202 of the process 1200 in FIG. 25A, the payment module 100 obtains a first notification from the payment accepting unit 120 after a first transaction is completed at the payment accepting unit 120.

In response to receiving the notification, the payment module (1604): generates first transaction information based at least in part on the first notification: stores the generated first transaction information; and sends the generated first transaction information to the first device via one of the one or more first communication capabilities. In some implementations, the payment module 100 generates the transaction information 1150 (FIG. 24D) which includes the transaction ID 1152 (e.g., which sequentially increases after each completed transaction), the module ID 1154 (e.g., a unique ID for the payment module 100), the user ID 1156 (e.g., a unique user ID of the mobile device 150 such as a MAC address), the authorization grant 1158, the transaction status 1160 (e.g., complete, incomplete, or aborted), the transaction amount 1162 (e.g., $1.00), and/or other information 1164. The other information 1164 includes, in some implementations, information included in the packet 1100 (FIG. 24A), such as one or more status flags 1108 indicating a state of the payment accepting unit, and/or other information pertaining to the payment accepting unit, the first device, the first transaction, and/or the first user. In some implementations, the first transaction information is also stored until reception of an acknowledgement from the first device (e.g., the mobile device 150). The transaction information 1150, for example, is stored in the memory 760 (FIG. 20) of the payment module 100.

In some implementations, the one or more first communication capabilities correspond to a short-range communication protocol. As described above, short-range communication protocols include BLE, NFC, and/or other protocols utilizing non-persistent communication channels.

In some implementations, the first device forwards the first transaction information to a server (e.g., the server 130) via a second communication capability (e.g., a long-range communication protocol such as CDMA, GSM, Wi-Fi, or the like), and the server 130 debits the account of the first user of the first device based on the amount of the first transaction, which is indicated in the first transaction information. In some implementations, the server 130 sends encrypted acknowledgment information via the second communication capability to the first device, and the first device forwards the encrypted acknowledgment information to the payment module via the first communication capability.

After sending the first transaction information to the first device and in accordance with a determination that first acknowledgement information is received from the first device within a predetermined time period, the payment module deletes (1606) the stored first transaction information generated for the first transaction performed by the first user of the first device. In some implementations, the payment module 100 marks the first and second transaction as complete (in addition to or instead of deleting the first and second transaction information). For example, when the predetermined time period is 30 seconds, the payment module 100 deletes the first transaction information stored in the memory 760 (FIG. 20) if the first acknowledgment information is received within 30 seconds of sending the first transaction information. For example, the payment module 100 determines whether the first acknowledgement information is received within a predetermined time period by comparing a timestamp of the stored first transaction information and the current time when (or if) the first acknowledgement is received.

In some implementations, the payment module encrypts (1608) the generated first transaction information, and the first acknowledgement information is encrypted. For example, the first transaction information is encrypted with a key corresponding to the payment module 100, and the first acknowledgement information is encrypted with a key selected by the server 130 that corresponds to the payment module 100. In this example, the keys are distinct, the same, or mutually known.

After sending the first transaction information to the first device and in accordance with a determination that the first acknowledgement information is not received from the first device within the predetermined time period, the payment module maintains (1610) the stored first transaction information generated for the first transaction performed by the first user of the first device. In one example, an acknowledgement is not received because the first device (e.g., the mobile device 150) loses power. In another example, the first device loses its long-range communication connection to the server 130, and is therefore unable to forward the first transaction information to a server for debiting the first user's account, or receiving an acknowledgement from the server 130. In another example, the user of the first device maliciously severs the long-range communication connection to interrupt the transaction information from being sent to the server 130, or to interrupt the acknowledgement information from being received by the payment module 100. In some implementations, if the payment module 100 does not receive the acknowledgment information within the predetermined time period, or if the acknowledgment information cannot be decrypted (e.g., it has been fraudulently modified or accessed), the payment module 100 maintains the first transaction information (e.g., keeps transactions information 1150 stored in the memory 760, FIG. 20) and attempts to send the first transaction information to the server 130 via another device (e.g., a second mobile device 150). For example, as discussed in greater detail below; the payment module leverages a subsequent second transaction involving a second device, and the first transaction information is sent to the second device with second transaction information that corresponds to a second transaction initiated by the user of the second device.

In some implementations, in accordance with the determination that the first acknowledgement information is not received from the first device within a predetermined time period, the payment module disables (1612) usage rights for the first user at the payment accepting unit. For example, the first user or user ID associated with the first device is suspended from performing cashless transactions, and further authorization grant tokens received from the first user or user ID are ignored by the payment module 100. Thus, for example, the first user cannot initiate another transaction cashless transaction with the payment module 100. In some implementations, the server 130 and/or payment module 100 records a history of incomplete transactions. In some implementations, the server 130 and/or payment module 100 blacklists the user only after a predefined number of incomplete transactions (e.g., 20 incomplete transactions), accounting for incomplete transactions that arise from non-malicious actions, such as a loss of cellular connection or power.

In some implementations, in accordance with the determination that the first acknowledgement information is not received from the first device within the predetermined time period, the payment module broadcasts (1614) an information packet via one of the one or more first communication capabilities, where the information packet includes one or more status flags indicating one or more unacknowledged first transactions including the first transaction performed by the first user of the first device. For example, the payment module 100 broadcasts packets (e.g., the packet 1100, FIG. 24A) which include the status flags 1108 that indicate (e.g., upload information indicator 1116) that the payment module 100 has information that needs to be uploaded to the server 130 (e.g., transaction information for the interrupted/unacknowledged first transaction). Alternatively, in some implementations, the transaction information 1150 (FIG. 24D) corresponding to an incomplete transaction is appended to the advertised information instead of merely setting the upload information indicator 1116 in the broadcast advertised information.

In some implementations, after determining that the first acknowledgement information is not received from the first device within the predetermined time period, the payment module obtains (1616), from the payment accepting unit, a second notification indicating completion of a second first transaction performed by a second user of a second device at the payment accepting unit and an amount of the first transaction. In response to receiving the second notification, the payment module 100 generates second transaction information based at least in part on the second notification, stores the generated second transaction information, and sends the generated first transaction information and the generated second transaction information to the second device via one of the one or more first communication capabilities. Thus, the payment module 100 leverages the subsequent second transaction by sending the first transaction information with the second transaction information. In some implementations, when the second user enters an authorization zone (e.g., authorization zone 104, FIG. 1), transaction information corresponding to the first user's incomplete first transaction is transmitted to the second device.

In some implementations, in accordance with a determination that second acknowledgement information is received from the second device within the predetermined time period, the payment modules deletes (1618) the stored first transaction information generated for the first transaction performed by the first user of the first device and the stored second transaction information generated for the second transaction performed by the second user of the second device. For example, in step 1272 of the process 1250 in FIG. 25B, after receiving the first transaction information and the second transaction information, the server 130 sends acknowledgement information to the payment module 100 via the second device 150-2, which acknowledges reception of the first transaction information and the second transaction information. Continuing with this example, in step 1276 of the process 1250 in FIG. 25B, after receiving the acknowledgement information, the payment module 100 deletes the first transaction information and the second transaction information.

In some implementations, in accordance with a determination that the second acknowledgement information is not received from the second device within a predetermined time period, the payment module maintains (1620) the stored first transaction information generated for the first transaction performed by the first user of the first device and the stored second transaction information generated for the second transaction performed by the second user of the second device. In some further implementations, the payment module 100) leverages a subsequent transaction involving a third device, and both the first and second transaction information are sent to the third device with third transaction information that corresponds to a third transaction initiated by the user of the third device.

It should be understood that the particular order in which the operations in FIGS. 29A-29C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 1400 in FIGS. 27A-27C, the method 1500 in FIGS. 28A-28B, and the method 1700 in FIGS. 30A-30D) are also applicable in an analogous manner to the method 1600 described above with respect to FIGS. 29A-29C.

FIGS. 30A-30D illustrate a flowchart diagram of a method 1700 of updating firmware of the payment module in the payment processing system in accordance with some embodiments. In some implementations, the method 1700 is performed by a device (e.g., the mobile device 150) with one or more processors, memory, and two or more communication capabilities. In some implementations, the method 1700 is governed by instructions that are stored in a non-transitory computer readable storage medium (e.g., the memory 860, FIG. 21) and the instructions are executed by one or more processors of the mobile device 150 (e.g., the processing unit 850, FIG. 21). Optional operations are indicated by dashed lines (e.g., boxes with dashed-line borders).

As noted above, in some circumstances, a payment module (e.g., the payment module 100, FIG. 26A) in a payment processing system cannot establish a direct communications channel to a server (e.g., the server 130, FIG. 26A), and is therefore unable to directly receive firmware updates from the server. In these cases, as described below; if the firmware of the payment module is determined to satisfy certain criteria (e.g., firmware version is out-of-date), one or more devices (e.g., the mobile device 150) will send data packets to the payment module for updating the payment module's firmware. The device serves as a communications bridge between the payment module and the server, whereby the device obtains a verification request from the payment module, which the device then sends to the server for processing (e.g., the server 130 verifies that the data packets are non-corrupted and complete). After processing the verification request, the server sends a firmware command to the device, which the device then sends to the payment module for execution.

A device (e.g., the mobile device 150) obtains (1702), from a payment module (e.g., the payment module 100), advertised information via a first communication capability, where the advertised information at least includes a current firmware version of the payment module. In some implementations, the current firmware version corresponds to a timestamp (e.g., Feb. 5, 2014), while in other implementations, the current firmware version is denoted by a version number (e.g., v1.4). Advertised information is described in greater detail herein with respect to FIG. 24A.

In some implementations, the first communication capability corresponds (1704) to a short-range communication protocol. As described above, short-range communication protocols include BLE, NFC, and/or other protocols utilizing non-persistent communication channels.

The device determines (1708) that the current firmware version of the payment module satisfies one or more predefined firmware criteria.

In some implementations, the current firmware version of the payment module is compared (1710) with a firmware version stored by the device, and the one or more predefined firmware criteria are satisfied (1712) if the current firmware version of the payment module does not match the firmware version stored by the device. In some implementations, the device obtains an indication (e.g., from the server 130, FIG. 26A) that the firmware version it stores is the latest firmware version. In some implementations, the latest firmware version is determined from a timestamp associated with the firmware. Alternatively, in some implementations, it is presumed that the firmware version stored by the device is the latest version.

In some implementations, the predefined firmware criteria are satisfied if the current firmware version of the payment module predates the firmware version stored by the device (e.g., the firmware of payment module 100 has a timestamp of Feb. 5, 2014, compared to the firmware of mobile device 150 which has a timestamp of Apr. 4, 2014), or has a version number less than the firmware version stored by the device (e.g., firmware v1.4 of the payment module 100 compared to firmware v1.5 of the mobile device 150, where the firmware version numbers are assigned in monotonically ascending order by the server 130). In other implementations, the predefined firmware criteria are satisfied if the current firmware version of the payment module is newer than the firmware version stored by the device. This arises, for example, if a firmware rollback procedure is initiated, where the newer firmware version of the payment module is overwritten with an older firmware version of the device.

Alternatively, in some implementations, the device receives, from a server, the determination that the current firmware version of the payment module satisfies one or more predefined firmware criteria. In these implementations, for example, the device sends the current firmware version of the payment module to the server (e.g., the server 130, FIG. 26A) via a second communication capability (e.g., GSM), where the server determines (e.g., by comparing the current firmware version of the payment module and a latest version of the firmware) if the current firmware version satisfies predefined firmware criteria (as described in greater detail above).

In some implementations, prior to sending firmware update information and in accordance with a determination that the current firmware version of the payment module does not match the firmware version stored by the first device (1714), the device sends (1716), to a server, a firmware update request so as to update the firmware of the payment module via a second communication capability. In some implementations, the second communication capability corresponds (1718) to a long-range communication protocol. For example, in some implementations, the long-range communication protocol is one of GSM, Wi-Fi, CDMA, LTE, and/or the like.

In some implementations, in response to sending the firmware update request, the device receives (1720) from the server, a firmware update approval message, and in response to receiving the firmware update approval message, the device sends (1724), to the payment module, the firmware update approval message. In some implementations, as described in greater detail with respect to FIG. 26C, the server (e.g., server 130) permits or declines the firmware update request for any of a number of reasons (e.g., firmware stored by the mobile device 150 is out of date).

Furthermore, in some implementations, firmware update approval message includes (1722) a verification value for each of the one or more data packets and a hash value for the firmware update information. A more in-depth discussion is provided in the corresponding description for FIG. 26C, with respect to the ways in which the payment module 100 uses the verification value and hash value for verifying and executing the firmware update information (e.g., one or more data packets corresponding to a latest firmware version).

In some implementations, sending the firmware update information via the first communication capability includes (1726), in response to receiving the firmware update approval message from the server, sending, to the payment module, the firmware update information via the first communication capability.

In some implementations, the device obtains (1728) update status information from the payment module, wherein the update status information indicates remaining packets for updating the current firmware version of the payment module. As described in greater detail with respect to FIG. 26C, in some implementations, the update status information indicating remaining packets (e.g., packets 50-100) for updating the current firmware version is sent by the payment module 100 after receiving a firmware update approval message, while in other implementations, the update status information is included in broadcasted packet 1100 that is broadcast by the payment module 100. Alternatively and/or additionally, the update status information indicates one or more data packets received for updating the current firmware version of the payment module to the most recent firmware version. Furthermore, in some implementations, the update status information identifies the firmware version to which the remaining and/or received data packets correspond. Furthermore, in some implementations, sending the firmware update information via the first communication capability is based on the update status information.

In accordance with a determination that the current firmware version of the payment module satisfies one or more predefined firmware criteria, the device sends (1730), to the payment module, firmware update information via the first communication capability, where the firmware update information includes one or more data packets for updating the current firmware version of the payment module. In some implementations, the firmware update information is stored by the device, and was included in a latest update to the application 140 associated with the payment processing system. In some implementations, the firmware update information is obtained from a server (e.g., the server 130, FIG. 26A) via a second communication capability (e.g., GSM), and sent to the payment module via the first communication capability.

In some implementations, advertised information further includes (1706) an authorization zone threshold criterion, and the device determines (1732) that the authorization zone threshold criterion is satisfied. For example, in some implementations, the device starts transmitting data packets to update the payment module firmware upon entering the authorization zone (e.g., the authorization zone 140, FIG. 1) of the payment module. In some implementations, once the device has started transmitting data packets, if the device later leaves the authorization zone, the device continues to transmit data packets as long as the device remains with the communication zone of the payment module (e.g., BLE range), or, alternatively, the device ceases transmission of data packets.

In some implementations, the device obtains (1734) additional advertised information, where the additional advertised information at least includes update status information. In some implementations, the additional advertised information further includes a new authorization code and/or status flags. In some implementations, the update status information identifies (1738) one or more remaining data packets (e.g., packets 50-100) for updating the current firmware version of the payment module to the most recent firmware version. Alternatively and/or additionally, the update status information identifies (1740)) one or more data packets received for updating the current firmware version of the payment module to the most recent firmware version. Furthermore, in some implementations, the update status information identifies the firmware version to which the remaining and/or received data packets correspond. Optionally, the update status information is included in transaction information (e.g., the transaction information 1150, after completing a transaction).

In some implementations, the update status information includes (1736) a verification request. For example, a verification request is generated and included in update status information when the payment module 100 has received all data packets necessary for completing the firmware update. A verification request is generally associated with a request to implement the received data packets in order to update the firmware of the payment module 100. In some implementations, a verification request is a request for a server (e.g., the server 130, FIG. 26A) to determine if any received data packets are corrupted, if the received data packets form a complete set sufficient to initiate a firmware update, and/or if the received data packets correspond to a latest firmware version. In some embodiments, a verification request is a checksum performed by the payment module on the received data packets for the firmware update according to a predefined checksum algorithm. Furthermore, in some implementations, the verification request is sent to the server with transaction status information (e.g., transaction information 1150, FIG. 24D) after a user completes a transaction (e.g., the step 1260 in process 1250 of FIG. 25B).

In some implementations in which the device obtains additional advertised information including a verification request, the device sends (1742), to a server, at least the current firmware version and a verification request via a second communication capability. In some implementations, the second communication capability corresponds (1744) to a long-range communication protocol (e.g., GSM, Wi-Fi, CDMA, LTE, and/or the like). In some implementations, the verification request is sent by the payment module directly to the server via a secure communications channel (e.g., an encrypted channel).

Furthermore, in some implementations, the device obtains (1746), from the server, a firmware command via the second communication capability, and sends (1748), to the payment module, the firmware command via the first communication capability. The server processes the verification request prior to issuing a firmware command to the device to send to the payment module. As described above, in some implementations, the server determines if any received data packets are corrupt (e.g., by using a checksum), if the received data packets form a complete set sufficient to initiate a firmware update, and/or if the received data packets correspond to a latest firmware version. In some implementations, unless some or all of these aforementioned conditions (e.g., corrupted data packets, complete set, etc.) are not satisfied, the server issues an approval code and/or a firmware command to initiate an update of the payment module's firmware. In some embodiments, the server determines whether a checksum included in the verification request matches a checksum value determined by the server for the firmware update indicated by the verification request (e.g., a version number). For example, if the checksum included in the verification request does not match the server's checksum, the server issues a firmware command to not implement the firmware update and to delete the data packets corresponding to the firmware update associated with the verification request was sent. In this example, the checksums may not match if one or more of the data packets for the firmware update are corrupted or have been altered.

In some implementations, the firmware command is a rollback command (e.g., ignore firmware update and keep current firmware version of the payment module 100), a delete command (e.g., deleting either all or a portion of the data packets for the firmware update), or an initialization command (e.g., initializing the firmware update in the payment module 100). If the server determines, in some implementations, that the received data packets do not correspond to a latest firmware version (e.g., the firmware update information stored by the device corresponds to firmware v1.4, compared to a latest firmware v1.5), the server will send, to the device or directly to the payment module, firmware update information including one or more data packets corresponding to a latest firmware version. This may occur, for example, if the mobile device 150 itself is not storing the latest firmware. In some implementations, the firmware command is encrypted with an encryption key that corresponds to the payment module (e.g., a shared secret key or a public key in an asymmetric cryptography scheme).

In some implementations, a second device with one or more processors, memory, and two or more communication capabilities, obtain (1750), from the payment module, advertised information via the first communication capability, where the advertised information at least includes a current firmware version of the payment module and the update status information. The second device determines (1752) whether the current firmware version of the payment module predates a most recent firmware version. In accordance with a determination that the current firmware version of the payment module satisfies one or more predefined firmware criteria, the second device sends (1754), to the payment module, firmware update information via the first communication capability, where the firmware update information one or more additional data packets for updating the current firmware version based at least in part on the update status information. Thus, in some implementations, multiple devices send to the payment module portions of a complete set of data packets needed for a firmware update, where the data packets sent by one device are distinct from the data packets sent by another device. In one example, when a firmware update includes data packets 1 through 100, a first device (e.g. the mobile device 150) sends data packets 1 through 50 to the payment module 100, and a second device (a different mobile device 150, not shown) sends data packets 50 through 100.

It should be understood that the particular order in which the operations in FIGS. 30A-30D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 1400 in FIGS. 27A-27C, the method 1500 in FIGS. 28A-28B, and the method 1600 in FIGS. 29A-29C) are also applicable in an analogous manner to the method 1600 described above with respect to FIGS. 30A-30D.

Miscellaneous

It should be noted that relative terms are meant to help in the understanding of the technology and are not meant to limit the scope of the invention. Similarly, unless specifically stated otherwise, the terms used for labels (e.g., "first," "second," and "third") are meant solely for purposes of designation and not for order or limitation. The term "short" in the phrase "short-range" (in addition to having technology specific meanings) is relative to the term "long" in the phrase "long-range."

The terms "may," "might," "can," and "could" are used to indicate alternatives and optional features and only should be construed as a limitation if specifically included in the claims.

It should be noted that, unless otherwise specified, the term "or" is used in its nonexclusive form (e.g., "A or B" includes A, B, A and B, or any combination thereof, but it would not have to include all of these possibilities). It should be noted that, unless otherwise specified, "and/or" is used similarly (e.g., "A and/or B" includes A, B, A and B, or any combination thereof, but it would not have to include all of these possibilities). It should be noted that, unless otherwise specified, the terms "includes" and "has" mean "comprises" (e.g., a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

It is to be understood that the inventions, examples, and implementations described herein are not limited to particularly exemplified materials, methods, and/or structures. It is to be understood that the inventions, examples, and implementations described herein are to be considered preferred inventions, examples, and implementations whether specifically identified as such or not.

The terms and expressions that have been employed in the foregoing specification are used as terms of description and not of limitation, and are not intended to exclude equivalents of the features shown and described. While the above is a complete description of selected implementations of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A mobile device, comprising:
    a first transceiver;
    a second transceiver;
    one or more processors; and
    memory storing one or more programs, including an application, that when executed by the one or more processors cause the one or more processors to perform intermediary communications operations between an offline retail machine with a short-range communication capability and a remote server, the intermediary communications operations including:
        obtaining via the first transceiver a single-use request code from an information packet broadcast by the short-range communication capability of the offline retail machine;
        transmitting via the second transceiver the single-use request code to the remote server;
        obtaining via the second transceiver from the remote server a grant token including the single-use request code and an amount of authorized funds;
        detecting a trigger condition for obtaining a product or service from the offline retail machine; and
        in response to detecting the trigger condition, initiating provision of the product or service by transmitting the grant token to the offline retail machine via the first transceiver.

2. The mobile device of claim 1, wherein the information packet broadcast by the offline retail machine further includes machine status information indicating one or more states of a payment module of the offline retail machine; and wherein the intermediary communications operations further comprise:
    sending, to the remote server, the machine status information from the information packet via the second transceiver.

3. The mobile device of claim 1, wherein the information packet broadcast by the offline retail machine further includes a first zone threshold criterion; and
    wherein transmitting the single-use request code comprises transmitting, to the remote server, the single-use request code via the second transceiver in accordance with a determination that the first zone threshold criterion is satisfied.

4. The mobile device of claim 1, wherein the information packet broadcast by the offline retail machine further includes a payment zone threshold criterion; and
    wherein detecting the trigger condition comprises determining whether the payment zone threshold criterion is satisfied.

5. The mobile device of claim 1, wherein the intermediary communications operations further comprise:
    selecting a current mode of operation for the application that is executing on the mobile device, the current mode of operation selected from at least (i) a manual mode of operation for the application in which user input is provided at a user interface of the application to transmit the single-use request code, and (ii) a hands-free mode of operation in which no user input is required to transmit the single-use request code.

6. The mobile device of claim 5, wherein:
    when the current mode is the manual mode, detecting the trigger condition comprises detecting a predefined gesture at a user interface of the application; and
    when the current mode is the hands-free mode, detecting the trigger condition comprises detecting that the device is within a predefined distance of the offline retail machine.

7. A non-transitory computer readable storage medium storing one or more programs for execution by one or more processors of a mobile device with a first transceiver and a second transceiver, wherein the one or more programs, when executed by the one or more processors, cause the mobile device to perform intermediary communications operations between an offline retail machine with a short-range communication capability and a remote server, the intermediary communications operations comprising:

obtaining via the first transceiver a single-use request code from an information packet broadcast by the short-range communication capability of the offline retail machine;

transmitting via the second transceiver the single-use request code to the remote server;

obtaining via the second transceiver from the remote server a grant token including the single-use request code and an amount of authorized funds;

detecting a trigger condition for obtaining a product or service from the offline retail machine; and in response to detecting the trigger condition, initiating provision of the product or service by transmitting the grant token to the offline retail machine via the first transceiver.

8. The non-transitory computer readable storage medium of claim 7, wherein the information packet broadcast by the offline retail machine further includes machine status information indicating one or more states of a payment module of the offline retail machine; and wherein the intermediary communications operations further comprise:

sending, to the remote server, the machine status information from the information packet via the second transceiver.

9. The non-transitory computer readable storage medium of claim 7, wherein the information packet broadcast by the offline retail machine further includes a first zone threshold criterion; and wherein transmitting the single-use request code comprises transmitting, to the remote server, the single-use request code via the second transceiver in accordance with a determination that the first zone threshold criterion is satisfied.

10. The non-transitory computer readable storage medium of claim 7, wherein the information packet broadcast by the offline retail machine further includes a payment zone threshold criterion; and wherein detecting the trigger condition comprises determining whether the payment zone threshold criterion is satisfied.

11. The non-transitory computer readable storage medium of claim 7, wherein the intermediary communications operations further comprise:

selecting a current mode of operation for the application that is executing on the mobile device, the current mode of operation selected from at least (i) a manual mode of operation for the application in which user input is provided at a user interface of the application to transmit the single-use request code, and (ii) a hands-free mode of operation in which no user input is required to transmit the single-use request code.

12. The non-transitory computer readable storage medium of claim 11, wherein:

when the current mode is the manual mode, detecting the trigger condition comprises detecting a predefined gesture at a user interface of the application; and when the current mode is the hands-free mode, detecting the trigger condition comprises detecting that the device is within a predefined distance of the offline retail machine.

13. A method of bridging communications between an offline retail machine with a short-range communication capability and a remote server, the method comprising:

at an application executing on a mobile device with one or more processors, memory, a first transceiver and a second transceiver:

obtaining via the first transceiver a single-use request code from an information packet broadcast by the short-range communication capability of the offline retail machine;

transmitting via the second transceiver the single-use request code to the remote server;

obtaining via the second transceiver from the remote server a grant token including the single-use request code and an amount of authorized funds;

detecting a trigger condition for obtaining a product or service from the offline retail machine; and in response to detecting the trigger condition, initiating provision of the product or service by transmitting the grant token to the offline retail machine via the first transceiver.

14. The method of claim 13, wherein the information packet broadcast by the offline retail machine further includes machine status information indicating one or more states of a payment module of the offline retail machine; and wherein the method further comprises:

sending, to the remote server, the machine status information from the information packet via the second transceiver.

15. The method of claim 13, wherein the information packet broadcast by the offline retail machine further includes a first zone threshold criterion; and wherein transmitting the single-use request code comprises transmitting, to the remote server, the single-use request code via the second transceiver in accordance with a determination that the first zone threshold criterion is satisfied.

16. The method of claim 13, wherein the information packet broadcast by the offline retail machine further includes a payment zone threshold criterion; and wherein detecting the trigger condition comprises determining whether the payment zone threshold criterion is satisfied.

17. The method of claim 13, further comprising:

selecting a current mode of operation for the application that is executing on the mobile device, the current mode of operation selected from at least (i) a manual mode of operation for the application in which user input is provided at a user interface of the application to transmit the single-use request code, and (ii) a hands-free mode of operation in which no user input is required to transmit the single-use request code.

18. The method of claim 17, wherein:

when the current mode is the manual mode, detecting the trigger condition comprises detecting a predefined gesture at a user interface of the application; and when the current mode is the hands-free mode, detecting the trigger condition comprises detecting that the device is within a predefined distance of the offline retail machine.

* * * * *